(12) United States Patent
Rajam et al.

(10) Patent No.: US 11,899,895 B2
(45) Date of Patent: Feb. 13, 2024

(54) USER INTERFACES FOR SETTING UP AN ELECTRONIC DEVICE

(71) Applicant: Apple Inc., Cupertino, CA (US)

(72) Inventors: Pavan Rajam, Cupertino, CA (US); Patrick L. Coffman, San Francisco, CA (US); Dennis Sungwoo Park, San Francisco, CA (US); Richard Mondello, San Jose, CA (US); Vijay Sundaram, San Ramon, CA (US); Caleb Davenport, Sunnyvale, CA (US); Neil P. Cormican, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/353,527

(22) Filed: Jun. 21, 2021

(65) Prior Publication Data

US 2021/0397306 A1    Dec. 23, 2021

Related U.S. Application Data

(60) Provisional application No. 63/197,472, filed on Jun. 6, 2021, provisional application No. 63/041,981, filed on Jun. 21, 2020.

(51) Int. Cl.
| | | |
|---|---|---|
| G06F 3/048 | (2013.01) | |
| H04L 12/28 | (2006.01) | |
| G06F 3/0481 | (2022.01) | |
| G06F 3/14 | (2006.01) | |
| G06F 3/0484 | (2022.01) | |

(52) U.S. Cl.
CPC .......... *G06F 3/0481* (2013.01); *G06F 3/0484* (2013.01); *G06F 3/1423* (2013.01)

(58) Field of Classification Search
CPC .... G06F 3/0481; G06F 3/0484; G06F 3/1423; G06F 3/162; G06F 3/165; H04N 21/4306; H04N 21/43615; H04N 21/439; H04N 21/4852; H04L 12/2803; H04L 12/2816; H04L 12/282
USPC ...................................................... 710/8, 10
See application file for complete search history.

(56) References Cited

U.S. PATENT DOCUMENTS

| | | | |
|---|---|---|---|
| 2,718,550 | A | 9/1955 | Hoyt et al. |
| 4,672,677 | A | 6/1987 | Yamakawa |
| 5,029,223 | A | 7/1991 | Fujisaki |

(Continued)

FOREIGN PATENT DOCUMENTS

| | | |
|---|---|---|
| AU | 2009255409 B2 | 7/2012 |
| AU | 2016100476 A4 | 5/2016 |

(Continued)

OTHER PUBLICATIONS

Applicant Initiated Interview Summary received for U.S. Appl. No. 17/210,352, dated Feb. 28, 2022, 4 pages.

(Continued)

*Primary Examiner* — Mahelet Shiberou
(74) *Attorney, Agent, or Firm* — Kubota & Basol LLP

(57) ABSTRACT

In some embodiments a second electronic device with which an output device is associated facilitates associating the output device with a first electronic device. In some embodiments, a second electronic device that is associated with an additional user facilitates associating the additional user with a first electronic device.

24 Claims, 28 Drawing Sheets

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,585,866 A | 12/1996 | Miller et al. |
| 5,596,373 A | 1/1997 | White et al. |
| 5,621,456 A | 4/1997 | Florin et al. |
| 5,818,439 A | 10/1998 | Nagasaka et al. |
| 5,825,352 A | 10/1998 | Bisset et al. |
| 5,835,079 A | 11/1998 | Shieh |
| 5,880,411 A | 3/1999 | Gillespie et al. |
| 5,886,690 A | 3/1999 | Pond et al. |
| 5,926,230 A | 7/1999 | Niijima et al. |
| 6,021,320 A | 2/2000 | Bickford et al. |
| 6,028,600 A | 2/2000 | Rosin et al. |
| 6,049,333 A | 4/2000 | Lajoie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,405,371 B1 | 6/2002 | Oosterhout et al. |
| 6,487,722 B1 | 11/2002 | Okura et al. |
| 6,570,557 B1 | 5/2003 | Westerman et al. |
| 6,628,304 B2 | 9/2003 | Mitchell et al. |
| 6,677,932 B1 | 1/2004 | Westerman |
| 6,690,387 B2 | 2/2004 | Zimmerman et al. |
| 6,745,391 B1 | 6/2004 | Macrae et al. |
| 6,909,837 B1 | 6/2005 | Unger |
| 6,928,433 B2 | 8/2005 | Goodman et al. |
| 7,015,894 B2 | 3/2006 | Morohoshi |
| 7,039,879 B2 | 5/2006 | Bergsten et al. |
| 7,103,906 B1 | 9/2006 | Katz et al. |
| 7,134,089 B2 | 11/2006 | Celik et al. |
| 7,184,064 B2 | 2/2007 | Zimmerman et al. |
| 7,213,255 B2 | 5/2007 | Markel et al. |
| 7,293,275 B1 | 11/2007 | Krieger et al. |
| 7,330,192 B2 | 2/2008 | Brunner et al. |
| 7,596,761 B2 | 9/2009 | Lemay et al. |
| 7,614,008 B2 | 11/2009 | Ording |
| 7,631,278 B2 | 12/2009 | Miksovsky et al. |
| 7,633,076 B2 | 12/2009 | Huppi et al. |
| 7,636,897 B2 | 12/2009 | Koralski et al. |
| 7,649,526 B2 | 1/2010 | Ording et al. |
| 7,650,569 B1 | 1/2010 | Allen et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,694,231 B2 | 4/2010 | Kocienda et al. |
| 7,712,051 B2 | 5/2010 | Chadzelek et al. |
| 7,783,892 B2 | 8/2010 | Russell et al. |
| 7,810,043 B2 | 10/2010 | Ostojic et al. |
| 7,814,023 B1 | 10/2010 | Rao et al. |
| 7,827,483 B2 | 11/2010 | Unbedacht et al. |
| 7,836,475 B2 | 11/2010 | Angiolillo et al. |
| 7,844,914 B2 | 11/2010 | Andre et al. |
| 7,849,487 B1 | 12/2010 | Vosseller |
| 7,856,605 B2 | 12/2010 | Ording et al. |
| 7,917,477 B2 | 3/2011 | Hutson et al. |
| 7,956,846 B2 | 6/2011 | Ording et al. |
| 7,957,762 B2 | 6/2011 | Herz et al. |
| 7,970,379 B2 | 6/2011 | White et al. |
| 8,006,002 B2 | 8/2011 | Kalayjian et al. |
| 8,026,805 B1 | 9/2011 | Rowe |
| 8,082,523 B2 | 12/2011 | Forstall et al. |
| 8,094,132 B1 | 1/2012 | Frischling et al. |
| 8,115,731 B2 | 2/2012 | Varanda |
| 8,145,617 B1 | 3/2012 | Verstak et al. |
| 8,170,931 B2 | 5/2012 | Ross et al. |
| 8,205,240 B2 | 6/2012 | Ansari et al. |
| 8,239,784 B2 | 8/2012 | Hotelling et al. |
| 8,279,180 B2 | 10/2012 | Hotelling et al. |
| 8,291,452 B1 | 10/2012 | Yong et al. |
| 8,299,889 B2 | 10/2012 | Kumar et al. |
| 8,301,484 B1 | 10/2012 | Kumar |
| 8,312,484 B1 | 11/2012 | Mccarty et al. |
| 8,312,486 B1 | 11/2012 | Briggs et al. |
| 8,325,160 B2 | 12/2012 | St. Pierre et al. |
| 8,346,798 B2 | 1/2013 | Spiegelman et al. |
| 8,370,874 B1 | 2/2013 | Chang et al. |
| 8,381,135 B2 | 2/2013 | Hotelling et al. |
| 8,386,588 B1 | 2/2013 | Cooley |
| 8,407,737 B1 | 3/2013 | Ellis |
| 8,416,217 B1 | 4/2013 | Eriksson et al. |
| 8,418,202 B2 | 4/2013 | Ahmad-taylor |
| 8,424,048 B1 | 4/2013 | Lyren et al. |
| 8,479,122 B2 | 7/2013 | Hotelling et al. |
| 8,495,499 B1 | 7/2013 | Denise |
| 8,516,063 B2 | 8/2013 | Fletcher |
| 8,516,525 B1 | 8/2013 | Jerding et al. |
| 8,560,398 B1 | 10/2013 | Few et al. |
| 8,584,165 B1 | 11/2013 | Kane et al. |
| 8,607,163 B2 | 12/2013 | Plummer |
| 8,613,015 B2 | 12/2013 | Gordon et al. |
| 8,613,023 B2 | 12/2013 | Narahara et al. |
| 8,625,974 B1 | 1/2014 | Pinson |
| 8,674,958 B1 | 3/2014 | Kravets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,769,408 B2 | 7/2014 | Madden et al. |
| 8,782,706 B2 | 7/2014 | Ellis |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,129,656 B2 | 9/2015 | Prather et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,215,273 B2 | 12/2015 | Jonnala et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |
| 9,319,727 B2 | 4/2016 | Phipps et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,514,476 B2 | 12/2016 | Kay et al. |
| 9,532,111 B1 | 12/2016 | Christie et al. |
| 9,538,310 B2 | 1/2017 | Fjeldsoe-nielsen et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,600,159 B2 | 3/2017 | Lawson et al. |
| 9,602,566 B1 | 3/2017 | Lewis et al. |
| 9,639,241 B2 | 5/2017 | Penha et al. |
| 9,652,118 B2 | 5/2017 | Hill et al. |
| 9,652,448 B2 | 5/2017 | Pasquero et al. |
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |

(56) References Cited

U.S. PATENT DOCUMENTS

| | | | |
|---|---|---|---|
| 9,913,142 B2 | 3/2018 | Folse et al. | |
| 9,933,937 B2 | 4/2018 | Lemay et al. | |
| 9,973,800 B2 | 5/2018 | Yellin et al. | |
| 10,019,142 B2 | 7/2018 | Van Os et al. | |
| 10,025,499 B2 | 7/2018 | Howard et al. | |
| 10,079,872 B1 | 9/2018 | Thomas et al. | |
| 10,091,558 B2 | 10/2018 | Christie et al. | |
| 10,116,996 B1 | 10/2018 | Christie et al. | |
| 10,126,904 B2 | 11/2018 | Agnetta et al. | |
| 10,168,871 B2 | 1/2019 | Wallters et al. | |
| 10,200,761 B1 | 2/2019 | Christie et al. | |
| 10,205,985 B2 | 2/2019 | Lue-sang et al. | |
| 10,209,866 B2 | 2/2019 | Johnston et al. | |
| 10,237,599 B1 | 3/2019 | Gravino et al. | |
| 10,275,148 B2 | 4/2019 | Matas et al. | |
| 10,282,088 B2 | 5/2019 | Kim et al. | |
| 10,303,422 B1* | 5/2019 | Woo | H04N 21/43615 |
| 10,405,015 B2 | 9/2019 | Kite et al. | |
| 10,521,188 B1 | 12/2019 | Christie et al. | |
| 10,551,995 B1 | 2/2020 | Ho et al. | |
| 10,552,470 B2 | 2/2020 | Todd et al. | |
| 10,564,823 B1 | 2/2020 | Dennis et al. | |
| 10,601,808 B1 | 3/2020 | Nijim et al. | |
| 10,606,539 B2 | 3/2020 | Bernstein et al. | |
| 10,631,042 B2* | 4/2020 | Zerr | H04N 21/4627 |
| 10,795,490 B2 | 10/2020 | Chaudhri et al. | |
| 10,827,007 B2* | 11/2020 | Kode | H04W 4/80 |
| 11,062,358 B1 | 7/2021 | Lewis et al. | |
| 2002/0015024 A1 | 2/2002 | Westerman et al. | |
| 2002/0026637 A1 | 2/2002 | Markel et al. | |
| 2002/0042920 A1 | 4/2002 | Thomas et al. | |
| 2002/0060750 A1 | 5/2002 | Istvan et al. | |
| 2002/0085045 A1 | 7/2002 | Vong et al. | |
| 2002/0100063 A1 | 7/2002 | Herigstad et al. | |
| 2002/0112239 A1 | 8/2002 | Goldman | |
| 2002/0113816 A1 | 8/2002 | Mitchell et al. | |
| 2002/0144269 A1 | 10/2002 | Connelly | |
| 2002/0171686 A1 | 11/2002 | Kamen et al. | |
| 2003/0001907 A1 | 1/2003 | Bergsten et al. | |
| 2003/0005445 A1 | 1/2003 | Schein et al. | |
| 2003/0009757 A1 | 1/2003 | Kikinis | |
| 2003/0011641 A1 | 1/2003 | Totman et al. | |
| 2003/0013483 A1 | 1/2003 | Ausems et al. | |
| 2003/0088872 A1 | 5/2003 | Maissel et al. | |
| 2003/0093790 A1 | 5/2003 | Logan et al. | |
| 2003/0126600 A1 | 7/2003 | Heuvelman | |
| 2003/0149628 A1 | 8/2003 | Abbosh et al. | |
| 2003/0158950 A1 | 8/2003 | Sako | |
| 2003/0167471 A1 | 9/2003 | Roth et al. | |
| 2003/0177075 A1 | 9/2003 | Burke | |
| 2003/0177498 A1 | 9/2003 | Ellis et al. | |
| 2003/0192060 A1 | 10/2003 | Levy | |
| 2003/0221191 A1 | 11/2003 | Khusheim | |
| 2003/0228130 A1 | 12/2003 | Tanikawa et al. | |
| 2003/0234804 A1 | 12/2003 | Parker et al. | |
| 2004/0019497 A1 | 1/2004 | Volk et al. | |
| 2004/0046801 A1 | 3/2004 | Lin et al. | |
| 2004/0070573 A1 | 4/2004 | Graham | |
| 2004/0088328 A1 | 5/2004 | Cook et al. | |
| 2004/0090463 A1 | 5/2004 | Celik et al. | |
| 2004/0133909 A1 | 7/2004 | Ma | |
| 2004/0139401 A1 | 7/2004 | Unbedacht et al. | |
| 2004/0161151 A1 | 8/2004 | Iwayama et al. | |
| 2004/0168184 A1 | 8/2004 | Steenkamp et al. | |
| 2004/0193421 A1 | 9/2004 | Blass | |
| 2004/0252120 A1 | 12/2004 | Hunleth et al. | |
| 2004/0254883 A1 | 12/2004 | Kondrk et al. | |
| 2004/0254958 A1 | 12/2004 | Volk | |
| 2004/0267715 A1 | 12/2004 | Polson et al. | |
| 2005/0012599 A1 | 1/2005 | Dematteo | |
| 2005/0071761 A1 | 3/2005 | Kontio | |
| 2005/0071785 A1 | 3/2005 | Chadzelek et al. | |
| 2005/0076363 A1 | 4/2005 | Dukes et al. | |
| 2005/0091254 A1 | 4/2005 | Stabb et al. | |
| 2005/0091597 A1 | 4/2005 | Ackley | |
| 2005/0162398 A1 | 7/2005 | Eliasson et al. | |
| 2005/0162402 A1 | 7/2005 | Watanachote | |
| 2005/0186988 A1 | 8/2005 | Lim et al. | |
| 2005/0190059 A1 | 9/2005 | Wehrenberg | |
| 2005/0223335 A1 | 10/2005 | Ichikawa | |
| 2005/0235316 A1 | 10/2005 | Ahmad-taylor | |
| 2005/0257166 A1 | 11/2005 | Tu | |
| 2005/0283358 A1 | 12/2005 | Stephanick et al. | |
| 2006/0017692 A1 | 1/2006 | Wehrenberg et al. | |
| 2006/0020904 A1 | 1/2006 | Aaltonen et al. | |
| 2006/0026521 A1 | 2/2006 | Hotelling et al. | |
| 2006/0029374 A1 | 2/2006 | Park | |
| 2006/0031872 A1 | 2/2006 | Hsiao et al. | |
| 2006/0033724 A1 | 2/2006 | Chaudhri et al. | |
| 2006/0053449 A1 | 3/2006 | Gutta | |
| 2006/0069998 A1 | 3/2006 | Artman et al. | |
| 2006/0071905 A1 | 4/2006 | Varanda | |
| 2006/0080352 A1 | 4/2006 | Boubez et al. | |
| 2006/0097991 A1 | 5/2006 | Hotelling et al. | |
| 2006/0107304 A1 | 5/2006 | Cleron et al. | |
| 2006/0112346 A1 | 5/2006 | Miksovsky et al. | |
| 2006/0112352 A1 | 5/2006 | Tseng et al. | |
| 2006/0117267 A1 | 6/2006 | Koralski et al. | |
| 2006/0120624 A1 | 6/2006 | Jojic et al. | |
| 2006/0195479 A1 | 8/2006 | Spiegelman et al. | |
| 2006/0195512 A1 | 8/2006 | Rogers et al. | |
| 2006/0197753 A1 | 9/2006 | Hotelling | |
| 2006/0224987 A1 | 10/2006 | Caffarelli | |
| 2006/0248113 A1 | 11/2006 | Leffert et al. | |
| 2006/0265637 A1 | 11/2006 | Marriott et al. | |
| 2006/0271968 A1 | 11/2006 | Zellner | |
| 2006/0282856 A1 | 12/2006 | Errico et al. | |
| 2006/0294545 A1 | 12/2006 | Morris et al. | |
| 2007/0005569 A1 | 1/2007 | Hurst-hiller et al. | |
| 2007/0009229 A1 | 1/2007 | Liu | |
| 2007/0011702 A1 | 1/2007 | Vaysman | |
| 2007/0028267 A1 | 2/2007 | Ostojic et al. | |
| 2007/0038957 A1 | 2/2007 | White | |
| 2007/0073596 A1 | 3/2007 | Alexander et al. | |
| 2007/0092204 A1 | 4/2007 | Wagner et al. | |
| 2007/0150802 A1 | 6/2007 | Wan et al. | |
| 2007/0154163 A1 | 7/2007 | Cordray | |
| 2007/0157220 A1 | 7/2007 | Cordray et al. | |
| 2007/0157249 A1 | 7/2007 | Cordray et al. | |
| 2007/0168413 A1 | 7/2007 | Barletta et al. | |
| 2007/0186254 A1 | 8/2007 | Tsutsui et al. | |
| 2007/0199035 A1 | 8/2007 | Schwartz et al. | |
| 2007/0204057 A1 | 8/2007 | Shaver et al. | |
| 2007/0229465 A1 | 10/2007 | Sakai et al. | |
| 2007/0233880 A1 | 10/2007 | Nieh et al. | |
| 2007/0244902 A1 | 10/2007 | Seide et al. | |
| 2007/0248317 A1 | 10/2007 | Bahn | |
| 2008/0046928 A1 | 2/2008 | Poling et al. | |
| 2008/0059884 A1 | 3/2008 | Ellis et al. | |
| 2008/0065989 A1 | 3/2008 | Conroy et al. | |
| 2008/0066010 A1 | 3/2008 | Brodersen et al. | |
| 2008/0077562 A1 | 3/2008 | Schleppe | |
| 2008/0092168 A1 | 4/2008 | Logan et al. | |
| 2008/0092173 A1 | 4/2008 | Shannon et al. | |
| 2008/0111822 A1 | 5/2008 | Horowitz et al. | |
| 2008/0120668 A1 | 5/2008 | Yau | |
| 2008/0127281 A1 | 5/2008 | Van et al. | |
| 2008/0155475 A1 | 6/2008 | Duhig | |
| 2008/0189740 A1 | 8/2008 | Carpenter et al. | |
| 2008/0189742 A1 | 8/2008 | Ellis et al. | |
| 2008/0216020 A1 | 9/2008 | Plummer | |
| 2008/0222677 A1 | 9/2008 | Woo et al. | |
| 2008/0235588 A1 | 9/2008 | Gonze et al. | |
| 2008/0243817 A1 | 10/2008 | Chan et al. | |
| 2008/0250312 A1 | 10/2008 | Curtis | |
| 2008/0260252 A1 | 10/2008 | Borgaonkar et al. | |
| 2008/0270886 A1 | 10/2008 | Gossweiler et al. | |
| 2008/0276279 A1 | 11/2008 | Gossweiler et al. | |
| 2008/0301260 A1 | 12/2008 | Goldeen et al. | |
| 2008/0301579 A1 | 12/2008 | Jonasson et al. | |
| 2008/0301734 A1 | 12/2008 | Goldeen et al. | |
| 2008/0307343 A1 | 12/2008 | Robert et al. | |
| 2008/0307458 A1 | 12/2008 | Kim et al. | |
| 2008/0307459 A1 | 12/2008 | Migos | |

(56) References Cited

U.S. PATENT DOCUMENTS

| | | |
|---|---|---|
| 2008/0320391 A1 | 12/2008 | Lemay et al. |
| 2008/0320532 A1 | 12/2008 | Lee |
| 2009/0055385 A1 | 2/2009 | Jeon et al. |
| 2009/0063521 A1 | 3/2009 | Bull et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0164944 A1 | 6/2009 | Webster et al. |
| 2009/0165054 A1 | 6/2009 | Rudolph |
| 2009/0174679 A1 | 7/2009 | Westerman |
| 2009/0177301 A1 | 7/2009 | Hayes |
| 2009/0177989 A1 | 7/2009 | Ma et al. |
| 2009/0178083 A1 | 7/2009 | Carr et al. |
| 2009/0228491 A1 | 9/2009 | Malik |
| 2009/0239587 A1 | 9/2009 | Negron et al. |
| 2009/0256807 A1 | 10/2009 | Nurmi |
| 2009/0259957 A1 | 10/2009 | Slocum et al. |
| 2009/0278916 A1 | 11/2009 | Ito |
| 2009/0282444 A1 | 11/2009 | Laksono et al. |
| 2009/0288079 A1 | 11/2009 | Zuber et al. |
| 2009/0313100 A1 | 12/2009 | Ingleshwar |
| 2009/0322962 A1 | 12/2009 | Weeks |
| 2009/0327952 A1 | 12/2009 | Karas et al. |
| 2010/0009629 A1 | 1/2010 | Jung et al. |
| 2010/0031162 A1 | 2/2010 | Wiser et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0083181 A1 | 4/2010 | Matsushima et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115592 A1 | 5/2010 | Belz et al. |
| 2010/0121714 A1 | 5/2010 | Bryant et al. |
| 2010/0146442 A1 | 6/2010 | Nagasaka et al. |
| 2010/0153881 A1 | 6/2010 | Dinn |
| 2010/0153999 A1 | 6/2010 | Yates |
| 2010/0159898 A1 | 6/2010 | Krzyzanowski et al. |
| 2010/0162172 A1 | 6/2010 | Aroner |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0257005 A1 | 10/2010 | Phenner et al. |
| 2010/0269145 A1 | 10/2010 | Ingrassia et al. |
| 2010/0275143 A1 | 10/2010 | Fu et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0047513 A1 | 2/2011 | Onogi et al. |
| 2011/0052146 A1 | 3/2011 | Murthy et al. |
| 2011/0054649 A1 | 3/2011 | Sarkis et al. |
| 2011/0055762 A1 | 3/2011 | Jung et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0119715 A1 | 5/2011 | Chang et al. |
| 2011/0131607 A1 | 6/2011 | Thomas et al. |
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0162022 A1 | 6/2011 | Xia |
| 2011/0163971 A1 | 7/2011 | Wagner et al. |
| 2011/0167339 A1 | 7/2011 | Emay |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0197153 A1 | 8/2011 | King et al. |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0307631 A1 | 12/2011 | Park et al. |
| 2011/0312278 A1 | 12/2011 | Matsushita et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0093481 A1 | 4/2012 | Mcdowell et al. |
| 2012/0096011 A1 | 4/2012 | Kay et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler |
| 2012/0114303 A1 | 5/2012 | Chung et al. |
| 2012/0117584 A1 | 5/2012 | Gordon |
| 2012/0139938 A1 | 6/2012 | Khedouri et al. |
| 2012/0144003 A1 | 6/2012 | Rosenbaum et al. |
| 2012/0158524 A1 | 6/2012 | Hintz et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0215684 A1 | 8/2012 | Kidron |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0242704 A1 | 9/2012 | Bamford et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |

(56) References Cited

U.S. PATENT DOCUMENTS

| | | |
|---|---|---|
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0173034 A1 | 7/2013 | Reimann et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1 | 8/2013 | Kawai et al. |
| 2013/0205312 A1 | 8/2013 | Huang |
| 2013/0212531 A1 | 8/2013 | Yoshida |
| 2013/0227482 A1 | 8/2013 | Thorsander et al. |
| 2013/0247105 A1 | 9/2013 | Jovanovski et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283168 A1 | 10/2013 | Brown et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332960 A1 | 12/2013 | Young et al. |
| 2013/0340006 A1 | 12/2013 | Kwan |
| 2013/0346564 A1* | 12/2013 | Warrick ............ H04L 65/1045 709/219 |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0020017 A1 | 1/2014 | Stern et al. |
| 2014/0024341 A1 | 1/2014 | Johan |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0068654 A1 | 3/2014 | Marlow et al. |
| 2014/0071068 A1 | 3/2014 | Shih et al. |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |
| 2014/0130097 A1 | 5/2014 | Londero |
| 2014/0136946 A1 | 5/2014 | Matas |
| 2014/0137029 A1 | 5/2014 | Stephenson et al. |
| 2014/0137030 A1 | 5/2014 | Matas |
| 2014/0143260 A1 | 5/2014 | Simonson et al. |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0157329 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0172622 A1 | 6/2014 | Baronshin |
| 2014/0172953 A1 | 6/2014 | Blanksteen |
| 2014/0173660 A1 | 6/2014 | Correa et al. |
| 2014/0184471 A1 | 7/2014 | Martynov et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0196069 A1 | 7/2014 | Ahmed et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0317653 A1 | 10/2014 | Mlodzinski |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344247 A1 | 11/2014 | Procopio et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0365479 A1 | 12/2014 | Lyons et al. |
| 2014/0365481 A1 | 12/2014 | Novosel et al. |
| 2014/0365604 A1 | 12/2014 | Lewis et al. |
| 2014/0365919 A1 | 12/2014 | Shaw et al. |
| 2014/0366040 A1 | 12/2014 | Parker et al. |
| 2014/0366047 A1 | 12/2014 | Thomas et al. |
| 2015/0020127 A1 | 1/2015 | Doshi et al. |
| 2015/0039685 A1 | 2/2015 | Lewis et al. |
| 2015/0046866 A1 | 2/2015 | Shimadate |
| 2015/0067582 A1 | 3/2015 | Donnelly et al. |
| 2015/0067724 A1 | 3/2015 | Johnson et al. |

(56) References Cited

U.S. PATENT DOCUMENTS

| | | |
|---|---|---|
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0095460 A1 | 4/2015 | Berger et al. |
| 2015/0095845 A1 | 4/2015 | Chun et al. |
| 2015/0113429 A1 | 4/2015 | Edwards et al. |
| 2015/0121408 A1 | 4/2015 | Jacoby et al. |
| 2015/0134653 A1 | 5/2015 | Bayer et al. |
| 2015/0150049 A1 | 5/2015 | White |
| 2015/0150066 A1 | 5/2015 | Park et al. |
| 2015/0153571 A1 | 6/2015 | Ballard et al. |
| 2015/0161251 A1 | 6/2015 | Ramanarayanan et al. |
| 2015/0169705 A1 | 6/2015 | Korbecki et al. |
| 2015/0169975 A1 | 6/2015 | Kienzle et al. |
| 2015/0186002 A1 | 7/2015 | Suzuki et al. |
| 2015/0189347 A1 | 7/2015 | Oztaskent et al. |
| 2015/0195624 A1 | 7/2015 | Gossweiler, III |
| 2015/0205591 A1 | 7/2015 | Jitkoff et al. |
| 2015/0237389 A1 | 8/2015 | Grouf et al. |
| 2015/0296072 A1 | 10/2015 | Zhou et al. |
| 2015/0301729 A1 | 10/2015 | Wang et al. |
| 2015/0309670 A1 | 10/2015 | Wheeler et al. |
| 2015/0312603 A1 | 10/2015 | Singh et al. |
| 2015/0317343 A1 | 11/2015 | Cselle et al. |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0373107 A1 | 12/2015 | Chan et al. |
| 2015/0382047 A1 | 12/2015 | Van Os et al. |
| 2015/0382066 A1 | 12/2015 | Heeter et al. |
| 2016/0004425 A1 | 1/2016 | Yoon et al. |
| 2016/0004772 A1 | 1/2016 | Kim et al. |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0021412 A1 | 1/2016 | Zito, Jr. |
| 2016/0035119 A1 | 2/2016 | Lee et al. |
| 2016/0036897 A1 | 2/2016 | Kim et al. |
| 2016/0041702 A1 | 2/2016 | Wang |
| 2016/0043962 A1* | 2/2016 | Kim .................. H04W 4/08 709/224 |
| 2016/0066004 A1 | 3/2016 | Lieu et al. |
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0092559 A1 | 3/2016 | Lind et al. |
| 2016/0096113 A1 | 4/2016 | Decoufle |
| 2016/0099991 A1 | 4/2016 | Lonkar et al. |
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0133230 A1 | 5/2016 | Daniels et al. |
| 2016/0142783 A1 | 5/2016 | Bagga et al. |
| 2016/0165307 A1 | 6/2016 | Lavender et al. |
| 2016/0188902 A1 | 6/2016 | Jin |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0345070 A1 | 11/2016 | Beeson et al. |
| 2016/0357305 A1 | 12/2016 | Wells et al. |
| 2016/0357352 A1 | 12/2016 | Matas et al. |
| 2016/0357355 A1 | 12/2016 | Carrigan et al. |
| 2016/0357366 A1 | 12/2016 | Migos et al. |
| 2016/0370982 A1 | 12/2016 | Penha et al. |
| 2017/0010846 A1 | 1/2017 | Bernstein et al. |
| 2017/0010847 A1 | 1/2017 | Bernstein et al. |
| 2017/0013295 A1 | 1/2017 | Wertheimer et al. |
| 2017/0046039 A1 | 2/2017 | Karunamuni et al. |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0094360 A1 | 3/2017 | Keighran et al. |
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0140748 A1 | 5/2017 | Roberts et al. |
| 2017/0188116 A1 | 6/2017 | Major et al. |
| 2017/0192642 A1 | 7/2017 | Fishman et al. |
| 2017/0195736 A1 | 7/2017 | Chai et al. |
| 2017/0201850 A1 | 7/2017 | Raleigh et al. |
| 2017/0214975 A1 | 7/2017 | Schmidt et al. |
| 2017/0220228 A1 | 8/2017 | Sang et al. |
| 2017/0242913 A1 | 8/2017 | Tijssen et al. |
| 2017/0245017 A1 | 8/2017 | Chaudhri et al. |
| 2017/0251257 A1 | 8/2017 | Obrien |
| 2017/0300151 A1 | 10/2017 | Lue-sang et al. |
| 2017/0339443 A1 | 11/2017 | Lue-sang et al. |
| 2017/0344553 A1 | 11/2017 | Evnine et al. |
| 2017/0345040 A1 | 11/2017 | Pimnack et al. |
| 2017/0353603 A1 | 12/2017 | Grunewald et al. |
| 2017/0357387 A1 | 12/2017 | Clarke |
| 2017/0359722 A1 | 12/2017 | Folse et al. |
| 2017/0364246 A1 | 12/2017 | Van Os et al. |
| 2018/0011580 A1 | 1/2018 | Lebowitz et al. |
| 2018/0041814 A1 | 2/2018 | Christie et al. |
| 2018/0063591 A1 | 3/2018 | Newman et al. |
| 2018/0070121 A1 | 3/2018 | Zimmerman et al. |
| 2018/0070138 A1 | 3/2018 | Chai et al. |
| 2018/0107353 A1 | 4/2018 | Lee |
| 2018/0113579 A1 | 4/2018 | Johnston et al. |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0189076 A1 | 7/2018 | Liston et al. |
| 2018/0253900 A1 | 9/2018 | Finding et al. |
| 2018/0275855 A1 | 9/2018 | Van Os et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0349509 A1 | 12/2018 | Abou Mahmoud et al. |
| 2018/0367834 A1 | 12/2018 | Carpenter et al. |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0052744 A1 | 2/2019 | Jung et al. |
| 2019/0058921 A1 | 2/2019 | Christie et al. |
| 2019/0066672 A1 | 2/2019 | Wood et al. |
| 2019/0073104 A1 | 3/2019 | Wang |
| 2019/0073680 A1 | 3/2019 | Knox |
| 2019/0129588 A1 | 5/2019 | Johnston et al. |
| 2019/0138163 A1 | 5/2019 | Howland et al. |
| 2019/0141399 A1 | 5/2019 | Auxer et al. |
| 2019/0258373 A1 | 8/2019 | Davydov et al. |
| 2019/0272853 A1 | 9/2019 | Moore |
| 2019/0342616 A1 | 11/2019 | Domm et al. |
| 2019/0354264 A1 | 11/2019 | Van Os et al. |
| 2019/0373320 A1 | 12/2019 | Balsamo |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0133631 A1 | 4/2020 | Christie et al. |
| 2020/0137175 A1* | 4/2020 | Ganci, Jr. .................. H04L 67/36 |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |

(56) References Cited

U.S. PATENT DOCUMENTS

| | | |
|---|---|---|
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0363934 A1 | 11/2020 | Van Os et al. |
| 2020/0374595 A1 | 11/2020 | Yang et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0168424 A1 | 6/2021 | Sharma |
| 2021/0181901 A1 | 6/2021 | Johnston et al. |
| 2021/0195277 A1 | 6/2021 | Thurlow et al. |
| 2021/0286454 A1 | 9/2021 | Beaumier et al. |
| 2021/0306711 A1 | 9/2021 | Ellingford et al. |
| 2021/0337280 A1 | 10/2021 | Diaz Delgado et al. |
| 2021/0345004 A1 | 11/2021 | Christie et al. |
| 2021/0365134 A1 | 11/2021 | Beaumier et al. |
| 2021/0406995 A1 | 12/2021 | Peters et al. |
| 2022/0132215 A1 | 4/2022 | Venugopal et al. |
| 2022/0179526 A1 | 6/2022 | Schöberl |
| 2022/0244824 A1 | 8/2022 | Cielak |
| 2022/0321940 A1 | 10/2022 | Christie et al. |
| 2022/0329891 A1 | 10/2022 | Christie et al. |
| 2022/0337914 A1 | 10/2022 | Christie et al. |
| 2022/0360858 A1 | 11/2022 | Christie et al. |
| 2022/0413796 A1 | 12/2022 | Christie et al. |
| 2023/0022781 A1 | 1/2023 | Lindholm et al. |
| 2023/0033604 A1 | 2/2023 | Diaz Delgado et al. |
| 2023/0096458 A1 | 3/2023 | Van Os et al. |
| 2023/0127228 A1 | 4/2023 | Clarke |
| 2023/0132595 A1 | 5/2023 | Van Os et al. |

FOREIGN PATENT DOCUMENTS

| | | |
|---|---|---|
| AU | 2017101431 A4 | 11/2017 |
| AU | 2018100810 A4 | 7/2018 |
| CN | 1295419 A | 5/2001 |
| CN | 1391765 A | 1/2003 |
| CN | 1985277 A | 6/2007 |
| CN | 101160932 A | 4/2008 |
| CN | 101228570 A | 7/2008 |
| CN | 101317149 A | 12/2008 |
| CN | 101370104 A | 2/2009 |
| CN | 101436110 A | 5/2009 |
| CN | 101465993 A | 6/2009 |
| CN | 101529437 A | 9/2009 |
| CN | 101699505 A | 4/2010 |
| CN | 101706704 A | 5/2010 |
| CN | 101719125 A | 6/2010 |
| CN | 101860447 A | 10/2010 |
| CN | 102098537 A | 6/2011 |
| CN | 102103460 A | 6/2011 |
| CN | 102265586 A | 11/2011 |
| CN | 102325144 A | 1/2012 |
| CN | 102819715 A | 12/2012 |
| CN | 102859484 A | 1/2013 |
| CN | 102880404 A | 1/2013 |
| CN | 102890615 A | 1/2013 |
| CN | 102955653 A | 3/2013 |
| CN | 102981695 A | 3/2013 |
| CN | 103037265 A | 4/2013 |
| CN | 103177738 A | 6/2013 |
| CN | 103399967 A | 11/2013 |
| CN | 103516933 A | 1/2014 |
| CN | 103546816 A | 1/2014 |
| CN | 103562848 A | 2/2014 |
| CN | 103620531 A | 3/2014 |
| CN | 103620541 A | 3/2014 |
| CN | 103620639 A | 3/2014 |
| CN | 103686418 A | 3/2014 |
| CN | 103985045 A | 8/2014 |
| CN | 103999017 A | 8/2014 |
| CN | 104508618 A | 4/2015 |
| CN | 104822098 A | 8/2015 |
| CN | 105264479 A | 1/2016 |
| CN | 105303372 A | 2/2016 |
| CN | 105308634 A | 2/2016 |
| CN | 105308923 A | 2/2016 |
| CN | 105336350 A | 2/2016 |
| CN | 105657554 A | 6/2016 |
| CN | 105812849 A | 7/2016 |
| CN | 105828098 A | 8/2016 |
| CN | 105955520 A | 9/2016 |
| CN | 105955607 A | 9/2016 |
| CN | 105989085 A | 10/2016 |
| CN | 105992068 A | 10/2016 |
| CN | 106101982 A | 11/2016 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2574089 A1 | 3/2013 |
| EP | 2605203 A1 | 6/2013 |
| EP | 2642402 A2 | 9/2013 |
| EP | 2672703 A1 | 12/2013 |
| EP | 2704032 A2 | 3/2014 |
| EP | 2725531 A1 | 4/2014 |
| EP | 2879398 A1 | 6/2015 |
| JP | 2000-112977 A | 4/2000 |
| JP | 2000-163031 A | 6/2000 |
| JP | 2001-197445 A | 7/2001 |
| JP | 2002-027381 A | 1/2002 |
| JP | 2002-342033 A | 11/2002 |
| JP | 2003-99452 A | 4/2003 |
| JP | 2003-534737 A | 11/2003 |
| JP | 2004-62237 A | 2/2004 |
| JP | 2006-31219 A | 2/2006 |
| JP | 2007-124465 A | 5/2007 |
| JP | 2007-512640 A | 5/2007 |
| JP | 2007-140910 A | 6/2007 |
| JP | 2007-294068 A | 11/2007 |
| JP | 2008-71112 A | 3/2008 |
| JP | 2008-135911 A | 6/2008 |
| JP | 2009-60328 A | 3/2009 |
| JP | 2009-206957 A | 9/2009 |
| JP | 2009-260947 A | 11/2009 |
| JP | 2010-28437 A | 2/2010 |
| JP | 2010-56595 A | 3/2010 |
| JP | 2010-509684 A | 3/2010 |
| JP | 2010-114733 A | 5/2010 |
| JP | 2011-512701 A | 4/2011 |
| JP | 2011-154455 A | 8/2011 |
| JP | 2011-182146 A | 9/2011 |
| JP | 2011-205562 A | 10/2011 |
| JP | 2011-257930 A | 12/2011 |
| JP | 2012-95123 A | 5/2012 |
| JP | 2012-123685 A | 6/2012 |
| JP | 2012-208622 A | 10/2012 |
| JP | 2013-8369 A | 1/2013 |
| JP | 2013-223150 A | 10/2013 |
| JP | 2014-81740 A | 5/2014 |
| JP | 2014-102660 A | 6/2014 |
| JP | 2015-50655 A | 3/2015 |
| JP | 2015-70404 A | 4/2015 |
| KR | 2001-0005939 A | 1/2001 |
| KR | 2001-0035356 A | 5/2001 |
| KR | 10-2002-0010151 A | 2/2002 |
| KR | 10-2007-0114329 A | 12/2007 |
| KR | 10-2009-0106104 A | 10/2009 |
| KR | 10-2010-0039194 A | 4/2010 |
| KR | 10-2011-0036408 A | 4/2011 |
| KR | 10-2011-0061811 A | 6/2011 |
| KR | 10-2012-0076682 A | 7/2012 |
| KR | 10-2012-0124445 A | 11/2012 |
| KR | 10-2013-0014712 A | 2/2013 |
| KR | 10-2013-0058034 A | 6/2013 |
| KR | 10-2013-0137969 A | 12/2013 |
| KR | 10-2014-0041939 A | 4/2014 |
| KR | 10-2019-0033658 A | 3/2019 |
| KR | 10-2022-0041231 A | 3/2022 |
| TW | 200622893 A | 7/2006 |

(56) References Cited

FOREIGN PATENT DOCUMENTS

| | | | |
|---|---|---|---|
| TW | 200719204 | A | 5/2007 |
| TW | 201337717 | A | 9/2013 |
| TW | 201349049 | A | 12/2013 |
| TW | 201351261 | A | 12/2013 |
| WO | 1994/009438 | A2 | 4/1994 |
| WO | 1999/040728 | A1 | 8/1999 |
| WO | 2004/063862 | A2 | 7/2004 |
| WO | 2005/050652 | A1 | 6/2005 |
| WO | 2005/109345 | A1 | 11/2005 |
| WO | 2007/078623 | A2 | 7/2007 |
| WO | 2008/005135 | A1 | 1/2008 |
| WO | 2008/060486 | A2 | 5/2008 |
| WO | 2009/016607 | A2 | 2/2009 |
| WO | 2009/039786 | A1 | 4/2009 |
| WO | 2009/148781 | A1 | 12/2009 |
| WO | 2010/022570 | A1 | 3/2010 |
| WO | 2010/025168 | A1 | 3/2010 |
| WO | 2010/118690 | A1 | 10/2010 |
| WO | 2011/095693 | A1 | 8/2011 |
| WO | 2012/012446 | A2 | 1/2012 |
| WO | 2012/061760 | A2 | 5/2012 |
| WO | 2012/088665 | A1 | 7/2012 |
| WO | 2013/000741 | A1 | 1/2013 |
| WO | 2013/149128 | A2 | 10/2013 |
| WO | 2013/169849 | A2 | 11/2013 |
| WO | 2013/169877 | A2 | 11/2013 |
| WO | 2013/149128 | A3 | 2/2014 |
| WO | 2014/105276 | A1 | 7/2014 |
| WO | 2014/144908 | A1 | 9/2014 |
| WO | 2014/177929 | A2 | 11/2014 |
| WO | 2014/200730 | A1 | 12/2014 |
| WO | 2015/200227 | A1 | 12/2015 |
| WO | 2015/200228 | A1 | 12/2015 |
| WO | 2015/200537 | A2 | 12/2015 |
| WO | 2016/030437 | A1 | 3/2016 |
| WO | 2016/048308 | A1 | 3/2016 |
| WO | 2016/048310 | A1 | 3/2016 |
| WO | 2016/111065 | A1 | 7/2016 |
| WO | 2017/008079 | A1 | 1/2017 |
| WO | 2017/124116 | A1 | 7/2017 |
| WO | 2017/200923 | A1 | 11/2017 |
| WO | 2017/218104 | A1 | 12/2017 |
| WO | 2018/081157 | A1 | 5/2018 |

OTHER PUBLICATIONS

Corrected Notice of Allowance received for U.S. Appl. No. 15/876,715, dated Apr. 11, 2022, 4 Pages.
Corrected Notice of Allowance received for U.S. Appl. No. 15/876,715, dated Apr. 19, 2022, 4 Pages.
Corrected Notice of Allowance received for U.S. Appl. No. 16/142,635, dated Mar. 10, 2022, 2 Pages.
Corrected Notice of Allowance received for U.S. Appl. No. 16/233,990, dated Mar. 8, 2022, 4 pages.
Corrected Notice of Allowance received for U.S. Appl. No. 16/233,990, dated Oct. 20, 2022, 2 pages.
Corrected Notice of Allowance received for U.S. Appl. No. 16/872,274, dated Aug. 12, 2022, 5 pages.
Corrected Notice of Allowance received for U.S. Appl. No. 16/945,724, dated Aug. 31, 2022, 2 pages.
Corrected Notice of Allowance received for U.S. Appl. No. 17/000,112, dated Jun. 17, 2022, 2 pages.
Corrected Notice of Allowance received for U.S. Appl. No. 17/065,387, dated Mar. 30, 2022, 2 Pages.
Extended European Search Report received for European Patent Application No. 22167405.4, dated Jul. 4, 2022, 11 Pages.
Final Office Action received for U.S. Appl. No. 16/175,565, dated May 27, 2022, 33 pages.
Final Office Action received for U.S. Appl. No. 16/584,790, dated Jun. 14, 2022, 37 pages.
Final Office Action received for U.S. Appl. No. 16/697,090, dated Feb. 23, 2022, 25 pages.
Final Office Action received for U.S. Appl. No. 16/827,910, dated Feb. 28, 2022, 17 pages.
Final Office Action received for U.S. Appl. No. 16/888,453, dated Apr. 8, 2022, 39 pages.
Final Office Action received for U.S. Appl. No. 17/133,550, dated Feb. 11, 2022, 18 pages.
Final Office Action received for U.S. Appl. No. 17/210,352, dated Jun. 3, 2022, 21 pages.
Final Office Action received for U.S. Appl. No. 17/379,785, dated Oct. 28, 2022, 14 pages.
Non-Final Office Action received for U.S. Appl. No. 15/167,801, dated May 18, 2022, 17 Pages.
Non-Final Office Action received for U.S. Appl. No. 16/697,090, dated Jul. 7, 2022, 25 pages.
Non-Final Office Action received for U.S. Appl. No. 16/827,910, dated Sep. 14, 2022, 18 pages.
Non-Final Office Action received for U.S. Appl. No. 16/827,926, dated Apr. 25, 2022, 27 pages.
Non-Final Office Action received for U.S. Appl. No. 16/888,478, dated May 2, 2022, 29 pages.
Non-Final Office Action received for U.S. Appl. No. 17/133,550, dated Sep. 9, 2022, 23 pages.
Non-Final Office Action received for U.S. Appl. No. 17/379,785, dated Mar. 30, 2022, 18 Pages.
Non-Final Office Action received for U.S. Appl. No. 17/457,901, dated Apr. 28, 2022, 24 Pages.
Notice of Allowance received for U.S. Appl. No. 15/719,404, dated Jul. 13, 2022, 8 Pages.
Notice of Allowance received for U.S. Appl. No. 15/719,404, dated Nov. 9, 2022, 7 pages.
Notice of Allowance received for U.S. Appl. No. 15/876,715, dated Apr. 4, 2022, 7 pages.
Notice of Allowance received for U.S. Appl. No. 15/876,715, dated Aug. 3, 2022, 7 Pages.
Notice of Allowance received for U.S. Appl. No. 16/233,990, dated Feb. 22, 2022, 8 pages.
Notice of Allowance received for U.S. Appl. No. 16/233,990, dated May 26, 2022, 5 pages.
Notice of Allowance received for U.S. Appl. No. 16/233,990, dated Oct. 5, 2022, 5 pages.
Notice of Allowance received for U.S. Appl. No. 16/827,918, dated Feb. 7, 2022, 9 pages.
Notice of Allowance received for U.S. Appl. No. 16/827,918, dated Jun. 8, 2022, 9 Pages.
Notice of Allowance received for U.S. Appl. No. 16/827,931, dated Apr. 19, 2022, 7 Pages.
Notice of Allowance received for U.S. Appl. No. 16/865,172, dated Apr. 13, 2022, 8 pages.
Notice of Allowance received for U.S. Appl. No. 16/865,172, dated Aug. 25, 2022, 8 Pages.
Notice of Allowance received for U.S. Appl. No. 16/872,274, dated Apr. 19, 2022, 10 Pages.
Notice of Allowance received for U.S. Appl. No. 16/945,724, dated Apr. 4, 2022, 8 Pages.
Notice of Allowance received for U.S. Appl. No. 16/945,724, dated Jul. 20, 2022, 8 Pages.
Notice of Allowance received for U.S. Appl. No. 17/000,112, dated Jun. 3, 2022, 14 pages.
Notice of Allowance received for U.S. Appl. No. 17/000,112, dated Oct. 18, 2022, 10 pages.
Notice of Allowance received for U.S. Appl. No. 17/654,578, dated Oct. 25, 2022, 8 pages.
Search Report received for Chinese Patent Application No. 201780066823.6, dated Nov. 1, 2022, 4 pages (2 pages of English Translation and 2 Pages of Official Copy).
Search Report received for Chinese Patent Application No. 201680050096.X, dated Jan. 10, 2022, 4 pages (2 pages of English Translation and 2 pages of Official Copy).
Advisory Action received for U.S. Appl. No. 15/167,801, dated Feb. 16, 2018, 4 pages.
Applicant Initiated Interview Summary received for U.S. Appl. No. 15/167,801, dated Apr. 23, 2018, 3 pages.

(56) References Cited

OTHER PUBLICATIONS

Applicant Initiated Interview Summary received for U.S. Appl. No. 15/167,801, dated Jul. 29, 2019, 3 pages.
Corrected Notice of Allowability received for U.S. Appl. No. 16/108,519, dated Dec. 22, 2021, 3 pages.
Corrected Notice of Allowance received for U.S. Appl. No. 14/242,575, dated Dec. 15, 2016, 7 pages.
Corrected Notice of Allowance received for U.S. Appl. No. 14/242,575, dated Nov. 16, 2016, 7 pages.
Corrected Notice of Allowance received for U.S. Appl. No. 14/255,664, dated Aug. 29, 2017, 4 pages.
Corrected Notice of Allowance received for U.S. Appl. No. 14/267,671, dated Nov. 29, 2018, 3 pages.
Corrected Notice of Allowance received for U.S. Appl. No. 14/749,288, dated Sep. 21, 2017, 5 pages.
Corrected Notice of Allowance received for U.S. Appl. No. 15/276,633, dated Sep. 10, 2019, 7 pages.
Corrected Notice of Allowance received for U.S. Appl. No. 15/695,880, dated Jun. 11, 2018, 6 pages.
Corrected Notice of Allowance received for U.S. Appl. No. 15/714,904, dated Sep. 7, 2018, 5 pages.
Corrected Notice of Allowance received for U.S. Appl. No. 15/876,715, dated Oct. 20, 2021, 2 pages.
Corrected Notice of Allowance received for U.S. Appl. No. 16/010,280, dated Aug. 6, 2019, 2 pages.
Corrected Notice of Allowance received for U.S. Appl. No. 16/036,810, dated Nov. 19, 2018, 6 pages.
Corrected Notice of Allowance received for U.S. Appl. No. 16/827,931, dated Dec. 6, 2021, 4 pages.
Cover Flow—Wikipedia, Available online at: <https://en.wikipedia.org/w/index.php?t%20itle=Cover%20Flow&oldid=879285208>, Jan. 20, 2019, 3 pages.
Examiner Initiated Interview Summary received for U.S. Appl. No. 15/390,377, dated Oct. 30, 2017, 2 pages.
Examiner's Answer to Appeal Brief received for U.S. Appl. No. 15/876,715, dated Aug. 18, 2020, 16 pages.
Extended European Search Report received for European Patent Application No. 17813728.7, dated Feb. 11, 2019, 8 pages.
Extended European Search Report received for European Patent Application No. 20190698.9, dated Oct. 30, 2020, 6 pages.
Extended European Search Report received for European Patent Application No. 20199219.5, dated Apr. 22, 2021, 8 pages.
Final Office Action received for U.S. Appl. No. 14/255,664, dated Oct. 17, 2016, 16 pages.
Final Office Action received for U.S. Appl. No. 14/267,671, dated May 23, 2018, 17 pages.
Final Office Action received for U.S. Appl. No. 14/267,671, dated Oct. 26, 2016, 21 pages.
Final Office Action received for U.S. Appl. No. 14/271,179, dated Dec. 15, 2016, 10 pages.
Final Office Action received for U.S. Appl. No. 14/271,179, dated Jun. 20, 2019, 15 pages.
Final Office Action received for U.S. Appl. No. 14/271,179, dated Jun. 21, 2018, 14 pages.
Final Office Action received for U.S. Appl. No. 14/746,095, dated Jul. 16, 2018, 33 pages.
Final Office Action received for U.S. Appl. No. 14/746,662, dated Apr. 24, 2017, 8 pages.
Final Office Action received for U.S. Appl. No. 14/746,662, dated Jun. 27, 2017, 9 pages.
Final Office Action received for U.S. Appl. No. 15/167,801, dated Apr. 5, 2019, 18 pages.
Final Office Action received for U.S. Appl. No. 15/167,801, dated May 28, 2020, 17 pages.
Final Office Action received for U.S. Appl. No. 15/167,801, dated Nov. 29, 2017, 12 pages.
Final Office Action received for U.S. Appl. No. 15/235,000, dated Dec. 19, 2018, 33 pages.
Final Office Action received for U.S. Appl. No. 15/235,000, dated Mar. 13, 2018, 31 pages.
Final Office Action received for U.S. Appl. No. 15/272,393, dated Mar. 25, 2019, 54 pages.
Final Office Action received for U.S. Appl. No. 15/272,397, dated Mar. 7, 2017, 23 pages.
Final Office Action received for U.S. Appl. No. 15/276,633, dated Jul. 26, 2017, 15 pages.
Final Office Action received for U.S. Appl. No. 15/276,633, dated Oct. 29, 2018, 12 pages.
Final Office Action received for U.S. Appl. No. 15/390,377, dated Nov. 9, 2017, 18 pages.
Final Office Action received for U.S. Appl. No. 15/507,229, dated Jul. 15, 2020, 20 pages.
Final Office Action received for U.S. Appl. No. 15/507,229, dated Sep. 18, 2019, 15 pages.
Final Office Action received for U.S. Appl. No. 15/719,404, dated Aug. 8, 2019, 19 pages.
Final Office Action received for U.S. Appl. No. 15/719,404, dated Mar. 30, 2021, 19 pages.
Final Office Action received for U.S. Appl. No. 15/876,715, dated Nov. 5, 2018, 15 pages.
Final Office Action received for U.S. Appl. No. 16/108,519, dated Dec. 12, 2019, 10 pages.
Final Office Action received for U.S. Appl. No. 16/108,519, dated Nov. 25, 2020, 12 pages.
Final Office Action received for U.S. Appl. No. 16/126,962, dated Apr. 8, 2020, 20 pages.
Final Office Action received for U.S. Appl. No. 16/136,005, dated Mar. 9, 2020, 9 pages.
Final Office Action received for U.S. Appl. No. 16/142,635, dated Feb. 3, 2021, 23 pages.
Final Office Action received for U.S. Appl. No. 16/144,077, dated Jul. 12, 2019, 22 pages.
Final Office Action received for U.S. Appl. No. 16/175,565, dated Nov. 12, 2020, 40 pages.
Final Office Action received for U.S. Appl. No. 16/233,990, dated Jan. 11, 2021, 17 pages.
Final Office Action received for U.S. Appl. No. 16/584,790, dated Jun. 15, 2021, 30 pages.
Final Office Action received for U.S. Appl. No. 16/584,790, dated May 27, 2020, 27 pages.
Final Office Action received for U.S. Appl. No. 16/682,443, dated Mar. 9, 2021, 9 pages.
Final Office Action received for U.S. Appl. No. 16/697,090, dated Jan. 27, 2021, 18 pages.
Final Office Action received for U.S. Appl. No. 16/827,918, dated Jul. 8, 2021, 31 pages.
Final Office Action received for U.S. Appl. No. 16/827,926, dated Mar. 17, 2021, 44 pages.
Final Office Action received for U.S. Appl. No. 16/865,172, dated Feb. 12, 2021, 29 pages.
Final Office Action received for U.S. Appl. No. 16/872,274, dated Dec. 23, 2021, 20 pages.
Final Office Action received for U.S. Appl. No. 16/888,478, dated Nov. 15, 2021, 27 pages.
International Search Report received for PCT Patent Application No. PCT/US2014/057272, dated May 28, 2015, 4 pages.
International Search Report received for PCT Patent Application No. PCT/US2014/057280, dated May 27, 2015, 4 pages.
International Search Report received for PCT Patent Application No. PCT/US2015/037027, dated Sep. 28, 2015, 3 pages.
International Search Report received for PCT Patent Application No. PCT/US2015/037030, dated Dec. 10, 2015, 7 pages.
International Search Report received for PCT Patent Application No. PCT/US2015/037520, dated Mar. 7, 2016, 6 pages.
International Search Report received for PCT Patent Application No. PCT/US2017/029448, dated Jul. 13, 2017, 3 pages.
International Search Report received for PCT Patent Application No. PCT/US2017/031764, dated Aug. 7, 2017, 2 pages.
International Search Report received for PCT Patent Application No. PCT/US2017/058132, dated Mar. 27, 2018, 6 pages.
International Search Report received for PCT Patent Application No. PCT/US2019/034921, dated Nov. 19, 2019, 5 pages.

(56) References Cited

OTHER PUBLICATIONS

International Search Report received for PCT Patent Application No. PCT/US2020/024452, dated Aug. 6, 2020, 6 pages.
International Search Report received for PCT Patent Application No. PCT/US2020/024485, dated Aug. 3, 2020, 6 pages.
International Search Report received for PCT Patent Application No. PCT/US2020/024486, dated Aug. 11, 2020, 6 pages.
International Search Report received for PCT Patent Application No. PCT/US2020/024492, dated Aug. 10, 2020, 6 pages.
International Search Report received for PCT Patent Application No. PCT/US2020/035423, dated Oct. 13, 2020, 4 pages.
Non-Final Office Action received for U.S. Appl. No. 14/208,099, dated Jun. 25, 2015, 12 pages.
Non-Final Office Action received for U.S. Appl. No. 14/242,575, dated Mar. 21, 2016, 12 pages.
Non-Final Office Action received for U.S. Appl. No. 14/255,664, dated Apr. 1, 2016, 15 pages.
Non-Final Office Action received for U.S. Appl. No. 14/262,435, dated Feb. 22, 2016, 22 pages.
Non-Final Office Action received for U.S. Appl. No. 14/267,671, dated Apr. 1, 2016, 16 pages.
Non-Final Office Action received for U.S. Appl. No. 14/267,671, dated Dec. 1, 2017, 18 pages.
Non-Final Office Action received for U.S. Appl. No. 14/267,671, dated May 26, 2017, 18 pages.
Non-Final Office Action received for U.S. Appl. No. 14/271,179, dated May 29, 2015, 25 pages.
Non-Final Office Action received for U.S. Appl. No. 14/271,179, dated Oct. 5, 2018, 15 pages.
Non-Final Office Action received for U.S. Appl. No. 14/271,179, dated Sep. 21, 2017, 12 pages.
Non-Final Office Action received for U.S. Appl. No. 14/746,095, dated Dec. 1, 2017, 34 pages.
Non-Final Office Action received for U.S. Appl. No. 14/746,095, dated Jul. 25, 2019, 33 pages.
Non-Final Office Action received for U.S. Appl. No. 14/746,620, dated Jan. 11, 2017, 16 pages.
Non-Final Office Action received for U.S. Appl. No. 14/746,662, dated Aug. 9, 2016, 8 pages.
Non-Final Office Action received for U.S. Appl. No. 14/749,288, dated Oct. 12, 2016, 11 pages.
Non-Final Office Action received for U.S. Appl. No. 15/167,801 dated Mar. 24, 2017, 12 Pages.
Non-Final Office Action received for U.S. Appl. No. 15/167,801, dated Aug. 30, 2018, 15 pages.
Non-Final Office Action received for U.S. Appl. No. 15/167,801, dated Dec. 11, 2020, 18 pages.
Non-Final Office Action received for U.S. Appl. No. 15/167,801, dated Sep. 3, 2021, 17 pages.
Non-Final Office Action received for U.S. Appl. No. 15/167,801, dated Sep. 26, 2019, 18 pages.
Non-Final Office Action received for U.S. Appl. No. 15/224,370, dated Oct. 3, 2017, 14 pages.
Non-Final Office Action received for U.S. Appl. No. 15/235,000, dated Jul. 14, 2017, 31 pages.
Non-Final Office Action received for U.S. Appl. No. 15/235,000, dated Jul. 25, 2018, 31 pages.
Non-Final Office Action received for U.S. Appl. No. 15/235,000, dated Jun. 26, 2019, 31 pages.
Non-Final Office Action received for U.S. Appl. No. 15/272,393, dated Oct. 2, 2018, 52 pages.
Non-Final Office Action received for U.S. Appl. No. 15/272,397, dated Nov. 22, 2016, 20 pages.
Non-Final Office Action received for U.S. Appl. No. 15/276,633, dated Feb. 23, 2018, 12 pages.
Non-Final Office Action received for U.S. Appl. No. 15/276,633, dated Mar. 5, 2019, 16 pages.
Non-Final Office Action received for U.S. Appl. No. 15/276,633, dated Nov. 17, 2016, 12 pages.
Non-Final Office Action received for U.S. Appl. No. 15/390,377, dated Apr. 5, 2017, 17 pages.
Non-Final Office Action received for U.S. Appl. No. 15/414,493, dated Oct. 6, 2017, 15 pages.
Non-Final Office Action received for U.S. Appl. No. 15/507,229, dated Feb. 27, 2020, 16 pages.
Non-Final Office Action received for U.S. Appl. No. 15/507,229, dated Jun. 3, 2019, 14 pages.
Non-Final Office Action received for U.S. Appl. No. 15/674,992, dated May 11, 2018, 8 pages.
Non-Final Office Action received for U.S. Appl. No. 15/719,404, dated Dec. 14, 2018, 14 pages.
Non-Final Office Action received for U.S. Appl. No. 15/719,404, dated Nov. 26, 2021, 19 pages.
Non-Final Office Action received for U.S. Appl. No. 15/719,404, dated Oct. 16, 2020, 18 pages.
Non-Final Office Action received for U.S. Appl. No. 15/798,092, dated Dec. 20, 2017, 20 pages.
Non-Final Office Action received for U.S. Appl. No. 15/876,715, dated Jun. 4, 2018, 12 pages.
Non-Final Office Action received for U.S. Appl. No. 15/876,715, dated Sep. 10, 2019, 13 pages.
Non-Final Office Action received for U.S. Appl. No. 15/990,327, dated Jul. 31, 2018, 8 pages.
Non-Final Office Action received for U.S. Appl. No. 16/010,280, dated Mar. 7, 2019, 5 pages.
Non-Final Office Action received for U.S. Appl. No. 16/108,519, dated Apr. 5, 2021, 13 pages.
Non-Final Office Action received for U.S. Appl. No. 16/108,519, dated Aug. 2, 2019, 10 pages.
Non-Final Office Action received for U.S. Appl. No. 16/108,519, dated May 8, 2020, 11 pages.
Non-Final Office Action received for U.S. Appl. No. 16/126,962, dated Aug. 25, 2020, 22 pages.
Non-Final Office Action received for U.S. Appl. No. 16/126,962, dated Sep. 3, 2019, 16 pages.
Non-Final Office Action received for U.S. Appl. No. 16/136,005, dated Sep. 9, 2020, 10 pages.
Non-Final Office Action received for U.S. Appl. No. 16/136,005, dated Sep. 18, 2019, 9 pages.
Non-Final Office Action received for U.S. Appl. No. 16/142,635, dated Jun. 8, 2020, 19 pages.
Non-Final Office Action received for U.S. Appl. No. 16/142,635, dated Jun. 11, 2021, 23 pages.
Non-Final Office Action received for U.S. Appl. No. 16/144,077, dated Feb. 19, 2019, 24 pages.
Non-Final Office Action received for U.S. Appl. No. 16/144,077, dated Nov. 27, 2019, 40 pages.
Non-Final Office Action received for U.S. Appl. No. 16/175,565, dated Sep. 20, 2021, 33 pages.
Non-Final Office Action received for U.S. Appl. No. 16/233,990, dated Jul. 9, 2021, 18 pages.
Non-Final Office Action received for U.S. Appl. No. 16/233,990, dated Jun. 18, 2020, 17 pages.
Non-Final Office Action received for U.S. Appl. No. 16/392,467, dated Sep. 27, 2019, 5 pages.
Non-Final Office Action received for U.S. Appl. No. 16/584,790, dated Dec. 23, 2020, 30 pages.
Non-Final Office Action received for U.S. Appl. No. 16/584,790, dated Dec. 26, 2019, 24 pages.
Non-Final Office Action received for U.S. Appl. No. 16/584,790, dated Feb. 1, 2022, 33 pages.
Non-Final Office Action received for U.S. Appl. No. 16/682,443, dated Sep. 23, 2020, 10 pages.
Non-Final Office Action received for U.S. Appl. No. 16/697,090, dated Aug. 3, 2021, 16 pages.
Non-Final Office Action received for U.S. Appl. No. 16/697,090, dated Jul. 6, 2020, 14 pages.
Non-Final Office Action received for U.S. Appl. No. 16/827,910, dated Jun. 17, 2021, 16 pages.
Non-Final Office Action received for U.S. Appl. No. 16/827,918, dated Dec. 10, 2020, 28 pages.

(56) References Cited

OTHER PUBLICATIONS

Non-Final Office Action received for U.S. Appl. No. 16/827,926, dated Oct. 29, 2020, 45 pages.
Non-Final Office Action received for U.S. Appl. No. 16/827,931, dated Mar. 3, 2021, 24 pages.
Non-Final Office Action received for U.S. Appl. No. 16/865,172 dated Jun. 29, 2021, 29 pages.
Non-Final Office Action received for U.S. Appl. No. 16/865,172, dated Aug. 20, 2020, 19 pages.
Non-Final Office Action received for U.S. Appl. No. 16/872,274, dated Jul. 9, 2021, 19 pages.
Non-Final Office Action received for U.S. Appl. No. 16/888,453, dated Jun. 4, 2021, 37 pages.
Non-Final Office Action received for U.S. Appl. No. 16/888,478, dated Feb. 8, 2021, 24 pages.
Non-Final Office Action received for U.S. Appl. No. 16/945,724, dated Jul. 19, 2021, 8 pages.
Non-Final Office Action received for U.S. Appl. No. 17/000,112, dated Dec. 7, 2021, 15 pages.
Non-Final Office Action received for U.S. Appl. No. 17/065,387, dated Jan. 28, 2021, 28 pages.
Non-Final Office Action received for U.S. Appl. No. 17/065,387, dated Jun. 1, 2021, 25 pages.
Non-Final Office Action received for U.S. Appl. No. 17/133,550, dated Jun. 8, 2021, 23 pages.
Non-Final Office Action received for U.S. Appl. No. 17/210,352, dated Oct. 18, 2021, 18 pages.
Non-Final Office Action received for U.S. Appl. No. 16/175,565, dated Mar. 4, 2020, 36 pages.
Notice of Allowance received for U.S. Appl. No. 14/208,099, dated Feb. 3, 2016, 10 pages.
Notice of Allowance received for U.S. Appl. No. 14/242,575, dated Oct. 27, 2016, 11 pages.
Notice of Allowance received for U.S. Appl. No. 14/255,664, dated May 5, 2017, 7 pages.
Notice of Allowance received for U.S. Appl. No. 14/262,435, dated Aug. 16, 2016, 6 pages.
Notice of Allowance received for U.S. Appl. No. 14/267,671, dated Sep. 19, 2018, 8 pages.
Notice of Allowance received for U.S. Appl. No. 14/746,095, dated Dec. 31, 2019, 8 pages.
Notice of Allowance received for U.S. Appl. No. 14/746,620, dated Sep. 25, 2017, 8 pages.
Notice of Allowance received for U.S. Appl. No. 14/746,662, dated Sep. 25, 2017, 7 pages.
Notice of Allowance received for U.S. Appl. No. 14/749,288, dated May 25, 2017, 8 pages.
Notice of Allowance received for U.S. Appl. No. 15/272,393, dated Jan. 15, 2020, 7 pages.
Notice of Allowance received for U.S. Appl. No. 15/272,393, dated Sep. 18, 2019, 10 pages.
Notice of Allowance received for U.S. Appl. No. 15/272,397, dated Oct. 18, 2017, 8 pages.
Notice of Allowance received for U.S. Appl. No. 15/276,633, dated Aug. 26, 2019, 8 pages.
Notice of Allowance received for U.S. Appl. No. 15/390,377, dated Jul. 2, 2018, 9 pages.
Notice of Allowance received for U.S. Appl. No. 15/414,493, dated Mar. 14, 2018, 7 pages.
Notice of Allowance received for U.S. Appl. No. 15/674,992, dated Oct. 1, 2018, 7 pages.
Notice of Allowance received for U.S. Appl. No. 15/695,880, dated Feb. 28, 2018, 10 pages.
Notice of Allowance received for U.S. Appl. No. 15/695,880, dated Oct. 18, 2017, 9 pages.
Notice of Allowance received for U.S. Appl. No. 15/714,904, dated May 22, 2018, 8 pages.
Notice of Allowance received for U.S. Appl. No. 15/798,092, dated Jun. 7, 2018, 9 pages.
Notice of Allowance received for U.S. Appl. No. 15/798,092, dated Oct. 9, 2018, 5 pages.
Notice of Allowance received for U.S. Appl. No. 15/833,618, dated Mar. 14, 2018, 9 pages.
Notice of Allowance received for U.S. Appl. No. 15/876,715, dated Oct. 14, 2021, 7 pages.
Notice of Allowance received for U.S. Appl. No. 15/990,327, dated Jan. 11, 2019, 7 pages.
Notice of Allowance received for U.S. Appl. No. 16/010,280, dated Jul. 29, 2019, 7 pages.
Notice of Allowance received for U.S. Appl. No. 16/036,810, dated Oct. 31, 2018, 9 pages.
Notice of Allowance received for U.S. Appl. No. 16/108,519, dated Sep. 21, 2021, 8 pages.
Notice of Allowance received for U.S. Appl. No. 16/136,005, dated Feb. 24, 2021, 8 pages.
Notice of Allowance received for U.S. Appl. No. 16/136,005, dated Jun. 9, 2021, 7 pages.
Notice of Allowance received for U.S. Appl. No. 16/142,635, dated Nov. 10, 2021, 8 pages.
Notice of Allowance received for U.S. Appl. No. 16/144,077, dated May 8, 2020, 15 pages.
Notice of Allowance received for U.S. Appl. No. 16/392,467, dated Mar. 23, 2020, 9 pages.
Notice of Allowance received for U.S. Appl. No. 16/682,443, dated Aug. 20, 2021, 7 pages.
Notice of Allowance received for U.S. Appl. No. 16/682,443, dated Nov. 17, 2021, 8 pages.
Notice of Allowance received for U.S. Appl. No. 16/726,179, dated Jun. 17, 2021, 9 pages.
Notice of Allowance received for U.S. Appl. No. 16/726,179, dated Sep. 30, 2021, 8 pages.
Notice of Allowance received for U.S. Appl. No. 16/827,926, dated Nov. 1, 2021, 35 pages.
Notice of Allowance received for U.S. Appl. No. 16/827,931, dated Jan. 5, 2022, 7 pages.
Notice of Allowance received for U.S. Appl. No. 16/827,931, dated Sep. 15, 2021, 11 pages.
Notice of Allowance received for U.S. Appl. No. 16/827,942, dated Apr. 28, 2021, 5 pages.
Notice of Allowance received for U.S. Appl. No. 16/827,942, dated Jan. 22, 2021, 5 pages.
Notice of Allowance received for U.S. Appl. No. 16/827,942, dated Oct. 5, 2020, 10 pages.
Notice of Allowance received for U.S. Appl. No. 16/865,172, dated Dec. 16, 2021, 10 pages.
Notice of Allowance received for U.S. Appl. No. 16/945,724, dated Dec. 20, 2021, 7 pages.
Notice of Allowance received for U.S. Appl. No. 17/065,387, dated Dec. 1, 2021, 10 pages.
Patent Board Decision received for U.S. Appl. No. 15/876,715, dated Aug. 3, 2021, 8 pages.
Restriction Requirement received for U.S. Appl. No. 14/208,099, dated Feb. 24, 2015, 5 pages.
Search Report received for Chinese Patent Application No. 201580028382.1, dated Oct. 12, 2018, 5 pages (2 pages of English Translation & 3 pages of Official copy).
Search Report received for Chinese Patent Application No. 201780033590.X, dated Mar. 24, 2021, 4 pages (2 page of English Translation and 2 pages of Official Copy).
Search Report received for Chinese Patent Application No. 201910469185.3, dated Feb. 23, 2021, 6 pages (3 page of English Translation and 3 page of Official Copy).
Search Report received for Chinese Patent Application No. 201910587972.8, dated Jan. 4, 2022, 4 pages (2 page of English Translation and 2 pages of Official Copy).
Search Report received for Danish Patent Application No. PA 201670581, dated Apr. 4, 2017, 2 pages.
Search Report received for Danish Patent Application No. PA 201670581, dated Feb. 5, 2018, 1 page.
Search Report received for Danish Patent Application No. PA 201670581, dated Nov. 3, 2016, 1 page.

(56) References Cited

OTHER PUBLICATIONS

Search Report received for Danish Patent Application No. PA 201870354, dated Sep. 26, 2018, 4 pages.
Search Report received for Danish Patent Application No. PA201670582, dated Feb. 9, 2017, 1 pages.
Search Report received for Danish Patent Application No. PA201670582, dated Mar. 6, 2018, 2 pages.
Search Report received for Danish Patent Application No. PA201670582, dated Oct. 28, 2016, 4 pages.
Search Report received for Danish Patent Application No. PA201770200, Completed on Jul. 12, 2017, 4 pages.
Search Report received for Taiwanese Patent Application No. 104120369, dated Aug. 8, 2016, 2 Pages (1 page of official copy & 1 page of English translation).
Search Report received for Taiwanese Patent Application No. 104120385, dated Nov. 25, 2016, 2 Pages (1 page of official copy & 1 page of English translation).
Supplemental Notice of Allowability received for U.S. Appl. No. 16/827,942, dated Nov. 4, 2020, 3 pages.
Supplemental Notice of Allowance received for U.S. Appl. No. 15/798,092, dated Jan. 9, 2019, 2 pages.
Akhtar Iyaz, "Movies Anywhere: Everything You Need To Know", Available online at: <https://www.cnet.com/how-to/movies-anywhere-ultraviolet-movies-locker-streaming-redeem-faq/>, 2017, 8 pages.
Alvarez Edgar, "Sling TV Redesign Makes It Easy to Find Your Favorite Content", Engadget, Available online at: <https://www.engadget.com/2016/01/05/sling-tv-major-redesign/>, May 1, 2016, pp. 1-12.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, Jan. 6, 2014, 5 pages.
Cheredar Tom, "Verizon's Viewdini Lets You Watch Netflix, Comcast, & Hulu Videos from a Single App", Available online at: <venturebeat.com>, May 22, 2012, 6 pages.
episodecalendar.com, "Keep track of your favorite TV shows!—TV Episode Calendar", Available Online at: <https://web.archive.org/web/20140517060612/https://episodecalendar.com/>, May 17, 2014, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Kaijser Martijn, "Mimic Skin for Kodi 15.x: Installation and Showcase", Time 2:23-2:28, Available online at: <https://www.youtube.com/watch?v=RGfpbUWkgQ&t=143s>, Aug. 3, 2015, 1 page.
Lee et al., "A Multi-Touch Three Dimensional Touch-Sensitive Tablet", CHI'85 Proceedings, Apr. 1985, pp. 21-25.
Li Xiaoshan, "CNTV, Hulu, BBC iPlayer Comparative Study on User Interface of Three Network TV Stations", Modern Communication (Journal of Communication University of China), Issue 11, Nov. 5, 2010, pp. 156-158. See attached Communication 37 CFR § 1.98(a) (3).
Ng Gary, "New Netflix User Interface Coming This Month, First Redesign in Four Years", iPhone in Canada, Available online at: <https://www.iphoneincanada.ca/news/new-netflix-user-interface/>, Jun. 1, 2015, 3 pages.
Panzarino Matthew, "Apple Announces Voice Activated Siri Assistant Feature for iOS 5, Integrates Wolfram Alpha and Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, Mar. 10, 2016, pp. 1-4.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Final Office Action received for U.S. Appl. No. 16/697,090, dated Dec. 14, 2022, 28 pages.
Final Office Action received for U.S. Appl. No. 16/827,910, dated Mar. 15, 2023, 18 pages.
Final Office Action received for U.S. Appl. No. 16/827,926, dated Apr. 18, 2023, 32 pages.
Final Office Action received for U.S. Appl. No. 16/888,478, dated Feb. 13, 2023, 27 pages.
Final Office Action received for U.S. Appl. No. 17/133,550, dated Feb. 15, 2023, 22 pages.
Final Office Action received for U.S. Appl. No. 17/586,625, dated May 4, 2023, 15 pages.
Non-Final Office Action received for U.S. Appl. No. 15/167,801, dated Feb. 8, 2023, 23 pages.
Non-Final Office Action received for U.S. Appl. No. 16/175,565, dated Feb. 17, 2023, 33 pages.
Non-Final Office Action received for U.S. Appl. No. 17/379,785, dated Mar. 9, 2023, 14 pages.
Non-Final Office Action received for U.S. Appl. No. 17/586,625, dated Sep. 1, 2022, 13 pages.
Non-Final Office Action received for U.S. Appl. No. 17/651,731, dated Apr. 25, 2023, 9 pages.
Non-Final Office Action received for U.S. Appl. No. 17/656,610, dated Feb. 6, 2023, 10 pages.
Non-Final Office Action received for U.S. Appl. No. 17/660,622, dated Dec. 20, 2022, 17 pages.
Non-Final Office Action received for U.S. Appl. No. 17/937,410, dated Mar. 2, 2023, 15 pages.
Non-Final Office Action received for U.S. Appl. No. 17/937,704, dated Mar. 30, 2023, 18 pages.
Non-Final Office Action received for U.S. Appl. No. 18/060,902, dated Mar. 10, 2023, 8 pages.
Notice of Allowability received for U.S. Appl. No. 17/457,901, dated Mar. 8, 2023, 9 pages.
Notice of Allowance received for U.S. Appl. No. 16/233,990, dated Jan. 31, 2023, 5 pages.
Notice of Allowance received for U.S. Appl. No. 16/584,790, dated Feb. 3, 2023, 9 pages.
Notice of Allowance received for U.S. Appl. No. 16/888,453, dated Mar. 1, 2023, 8 pages.
Notice of Allowance received for U.S. Appl. No. 17/210,352, dated Dec. 5, 2022, 9 pages.
Notice of Allowance received for U.S. Appl. No. 17/210,352, dated Mar. 16, 2023, 7 pages.
Notice of Allowance received for U.S. Appl. No. 17/367,227, dated Mar. 23, 2023, 12 pages.
Notice of Allowance received for U.S. Appl. No. 17/457,901, dated Nov. 16, 2022, 9 pages.
Notice of Allowance received for U.S. Appl. No. 17/654,578, dated Feb. 15, 2023, 8 pages.
Search Report received for Chinese Patent Application No. 201811143102.3, dated Nov. 22, 2022, 5 pages (2 pages of English Translation and 3 pages of Official Copy).
Search Report received for Chinese Patent Application No. 201911313480.6, dated Jan. 20, 2023, 4 pages (2 pages of English Translation and 2 pages of Official Copy).

(56) References Cited

OTHER PUBLICATIONS

Search Report received for Chinese Patent Application No. 201911313496.7, dated Jan. 20, 2023, 4 pages (2 pages of English Translation and 2 pages of Official Copy).
Search Report Received for Chinese Patent Application No. 201911313497.1, dated Apr. 11, 2023, 5 pages (2 pages of English Translation and 3 pages of Official Copy).
Search Report received for Chinese Patent Application No. 201911313497.1, dated Dec. 14, 2022, 3 pages (1 page of English Translation and 2 pages of Official Copy).
Search Report received for Chinese Patent Application No. 202010011436.6, dated Dec. 15, 2022, 9 pages (4 pages of English Translation and 5 pages of Official Copy).
Search Report Received for European Patent Application No. 20718506.7, dated Mar. 21, 2023, 2 pages.
Anonymous, "Video Progress Bar—YouTube Help", Retrieved from the Internet: <URL:https://web.archive.org/web/20190317001501/https://support.google.com/youtube/answer/7174115?hl=en>, [retrieved on Mar. 22, 20232], Mar. 17, 2019, 2 pages.
Apple, "The control is all yours", Available online at : <https://www.apple.com.cn/privacy/control/>, [Retrieved Dec. 29, 2022], Nov. 30, 2022, 12 pages. See attached Communication 37 CFR § 1.98(a)(3).
Drews et al., "Virtual Jukebox—Reviving a Classic", Proceedings of the 35th Hawaii International Conference on System Sciences, 2022, 7 pages.
Jin et al., "Pricing Sponsored Content in Wireless Networks with Multiple Content Providers", The Fourth IEEE Workshop on Smart Data Pricing 2015, 2015, pp. 668-673.
Kimbler, Kristofer, "App Store Strategies for Service Providers", 2010 4th International Conference on Intelligence in Next Generation Networks, Nov. 18, 2010, 5 pages.
Meng et al., "Role Authorization Based Web Service Access Control Model", Journal of Lanzhou University (Natural Science Edition), vol. 42, No. 2, 2007, pp. 84-88. See attached Communication 37 CFR § 1.98(a)(3).
Tinari, George, "What's New in the Netflix Redesign and How to Use It", Retrieved from the Internet: <https://web.archive.org/web/20161110092133/https://www.guidingtech.com/48443/netflix-redesign-overview/ >, [retrieved on Mar. 22, 2023]., Nov. 10, 2016, 9 pages.
Wang et al., "Authorization Management Mechanism of Web Application System", Network and Information Technology, vol. 25, No. 11, 2006, 3 pages. See attached Communication 37 CFR § 1.98(a)(3).
Corrected Notice of Allowance received for U.S. Appl. No. 16/888,453, dated Jul. 26, 2023, 5 pages.
Corrected Notice of Allowance received for U.S. Appl. No. 17/367,227, dated Jul. 27, 2023, 2 pages.
Final Office Action received for U.S. Appl. No. 17/660,622, dated May 24, 2023, 20 pages.
Final Office Action received for U.S. Appl. No. 17/937,410, dated Aug. 3, 2023, 15 pages.
Non-Final Office Action received for U.S. Appl. No. 15/719,404, dated May 10, 2023, 14 pages.
Non-Final Office Action received for U.S. Appl. No. 17/656,610, dated Jul. 26, 2023, 10 pages.
Non-Final Office Action received for U.S. Appl. No. 17/657,913, dated Jul. 21, 2023, 16 pages.
Non-Final Office Action received for U.S. Appl. No. 18/146,336, dated Aug. 3, 2023, 23 pages.
Notice of Allowance received for U.S. Appl. No. 16/827,910, dated Aug. 3, 2023, 21 pages.
Notice of Allowance received for U.S. Appl. No. 16/888,453, dated Jun. 21, 2023, 7 pages.
Notice of Allowance received for U.S. Appl. No. 16/888,478, dated Aug. 2, 2023, 9 pages.
Notice of Allowance received for U.S. Appl. No. 17/654,578, dated Jun. 13, 2023, 7 pages.
Search Report received for Chinese Patent Application No. 202010662190.9, dated Apr. 28, 2023, 5 pages (2 pages of English Translation and 3 pages of Official Copy).
Search Report received for Chinese Patent Application No. 202010662206.6, dated Apr. 28, 2023, 5 pages (2 pages of English Translation and 3 pages of Official Copy).
Search Report received for Chinese Patent Application No. 202010662994.9, dated Apr. 28, 2023, 5 pages (2 pages of English Translation and 3 pages of Official Copy).
Beer et al., "The Odds of Running a Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communications, 2013, 4 pages. See attached Communication 37 CFR § 1.98(a)(3).
Budhraja et al., "Probability Based Playlist Generation Based on Music Similarity and User Customization", National Conference on Computing and Communication Systems, 2012, 5 pages.
Search Report received for Chinese Patent Application No. 202210799020.4, dated Jul. 27, 2023, 5 pages (1 page of English Translation and 4 pages of Official Copy).
Cheng, Luo, "The Designing of Dynamic Play-list Based on Flash Streaming Media Technology", Computer and Telecommunication, 2008, 3 pages. See attached Communication 37 CFR § 1.98(a)(3).
Liu, Chang, "Functions and Design of Multi-Screen Playing System in TV Variety Studio", Modern TV Technology, 2013, 5 pages. See attached Communication 37 CFR § 1.98(a)(3).
Zhang et al., "Music Playlist Prediction via Detecting Song Moods", IEEE China Summit and International Conference on Signal and Information Processing, 2013, pp. 174-178.

\* cited by examiner

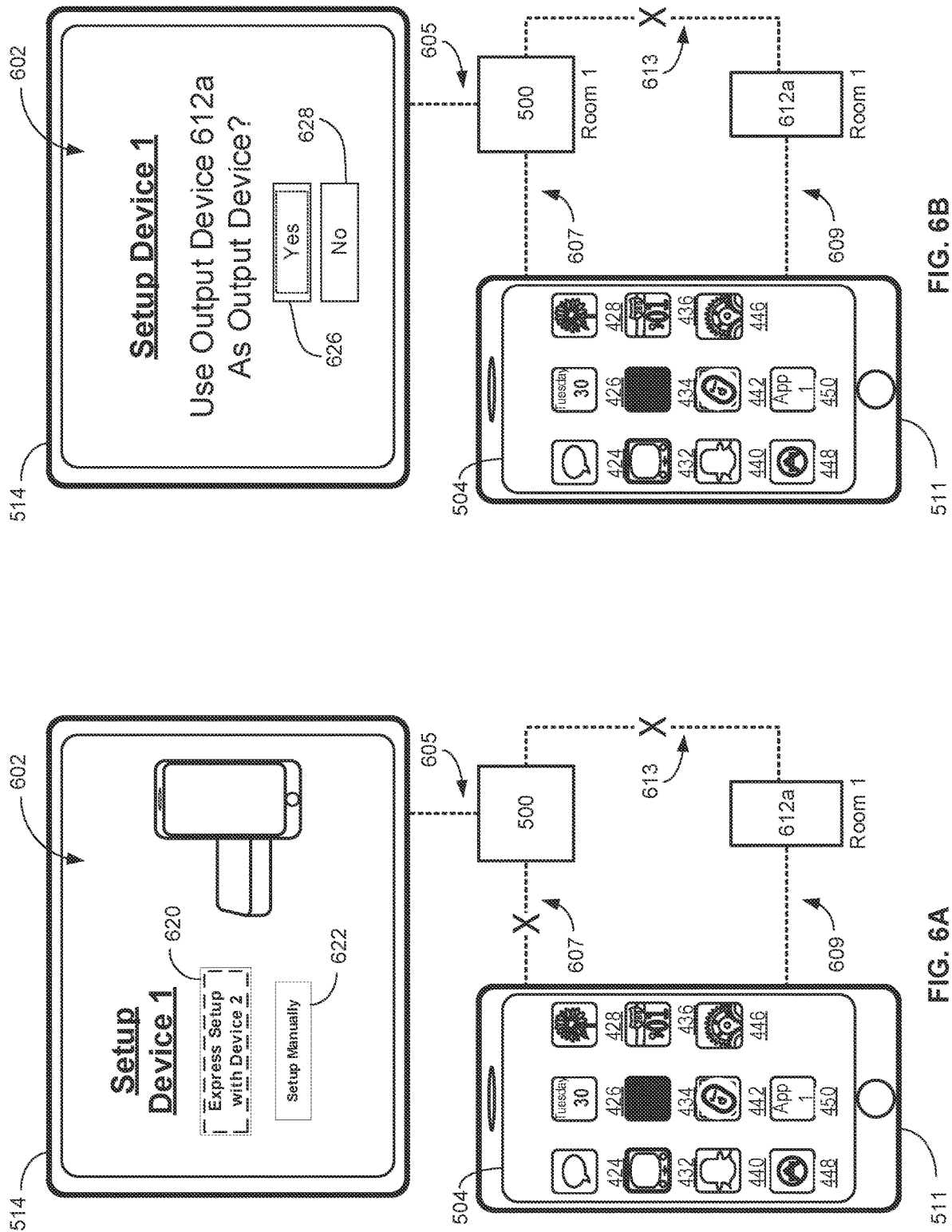

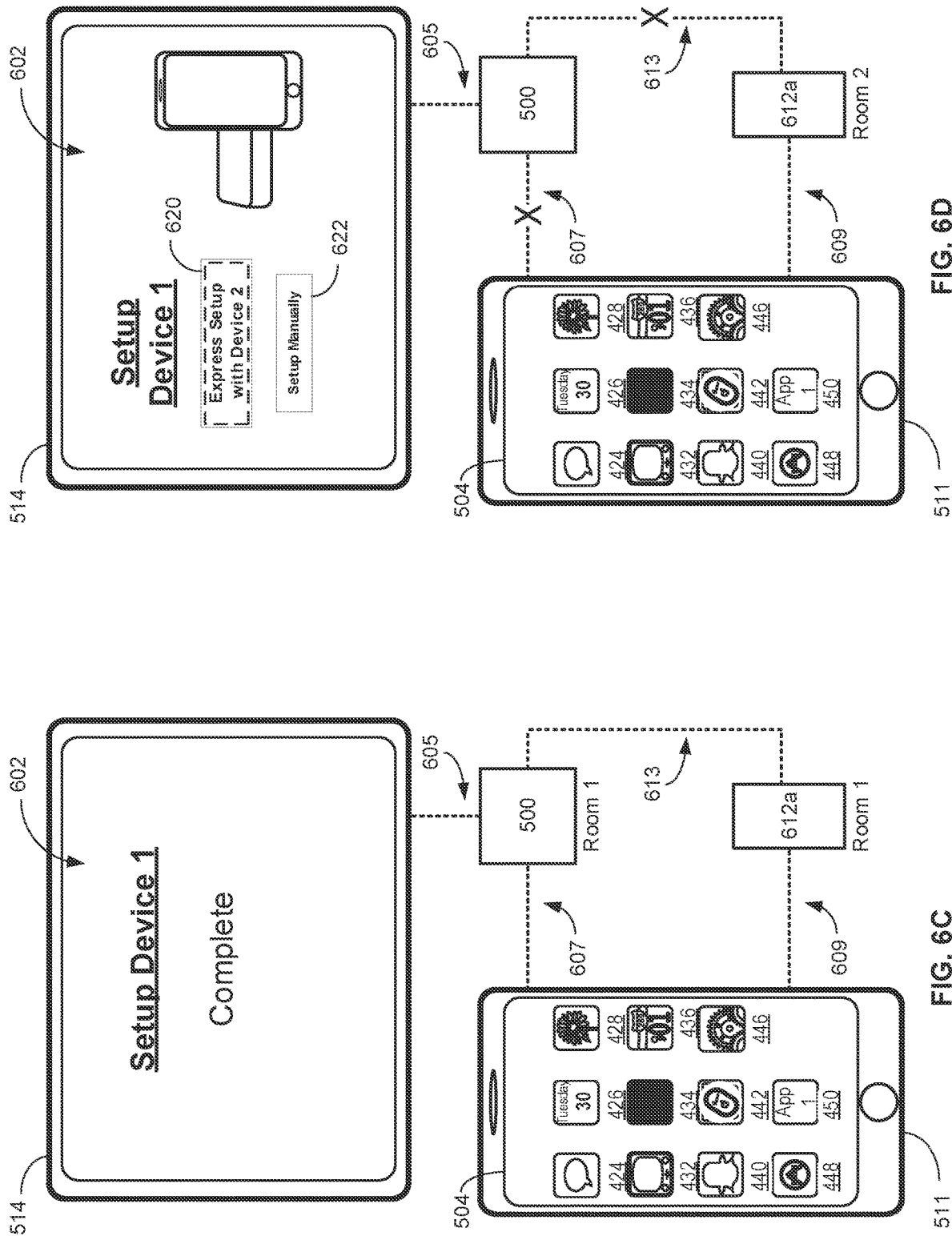

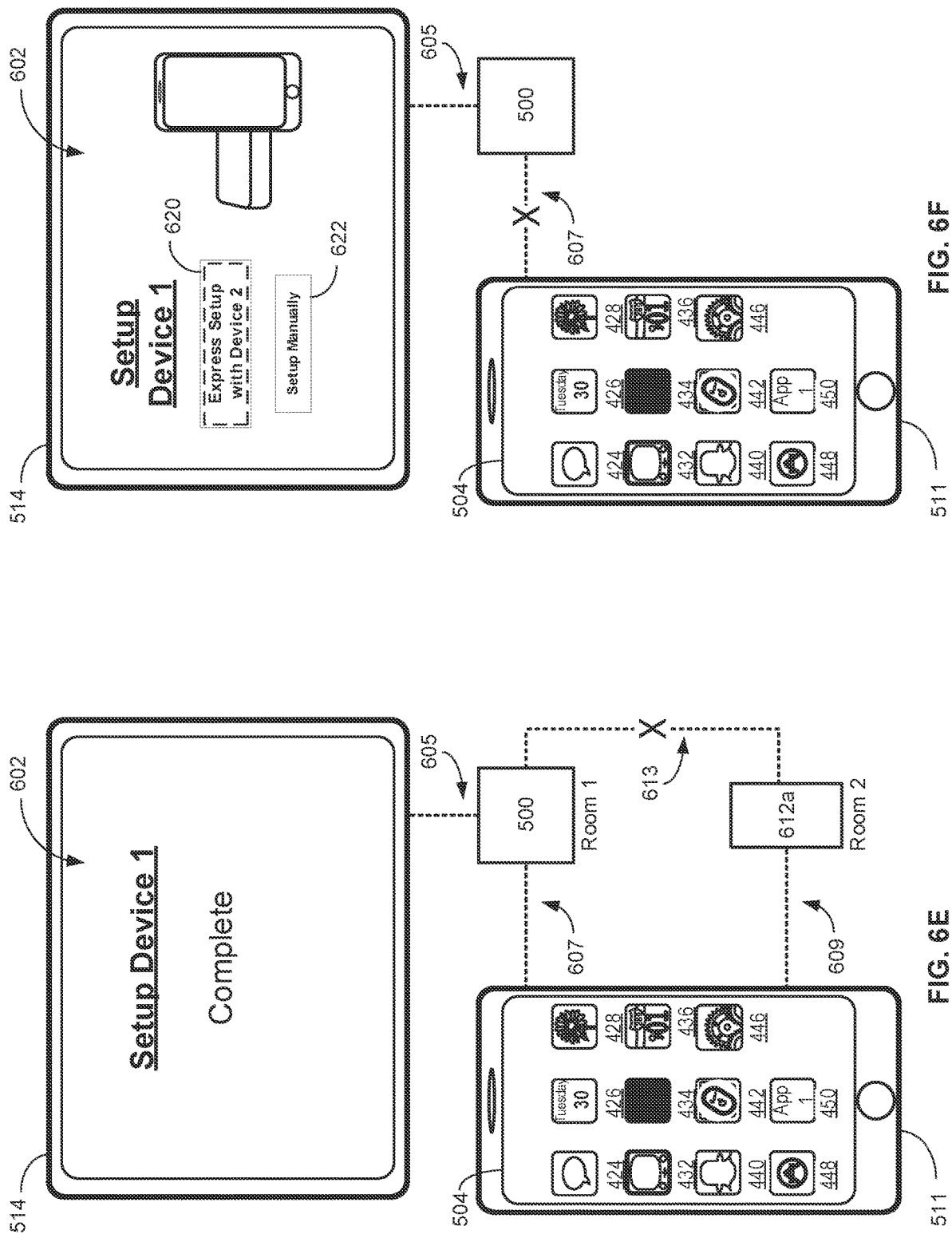

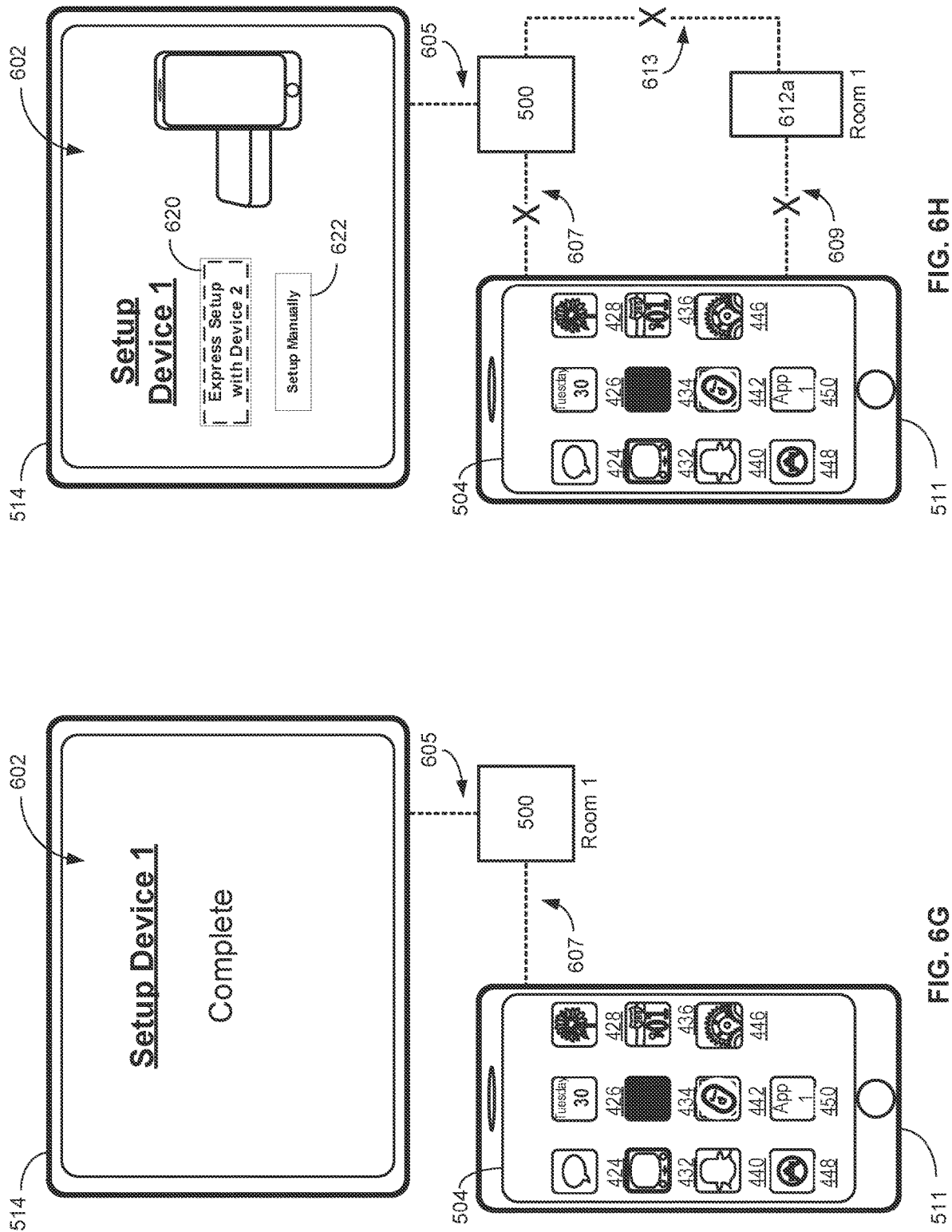

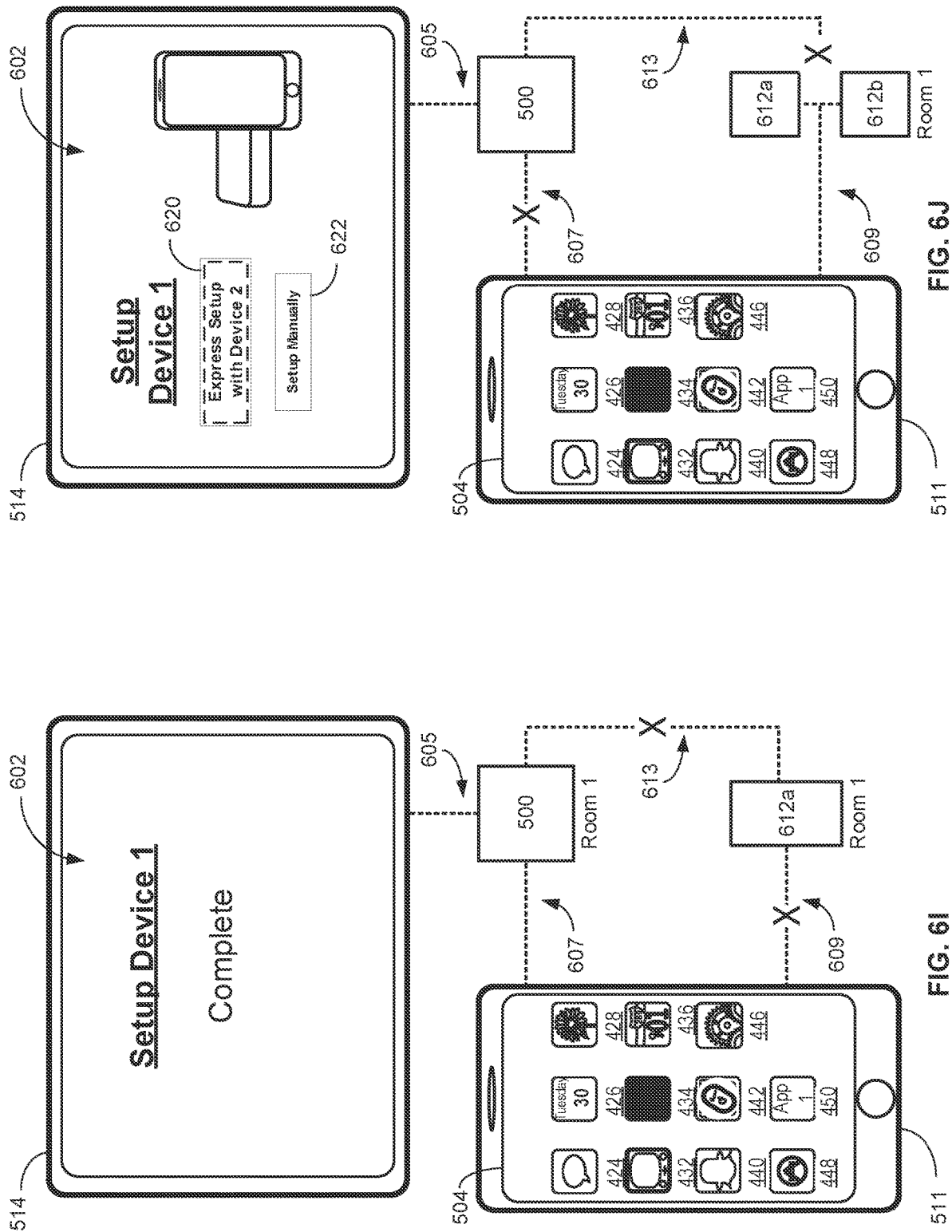

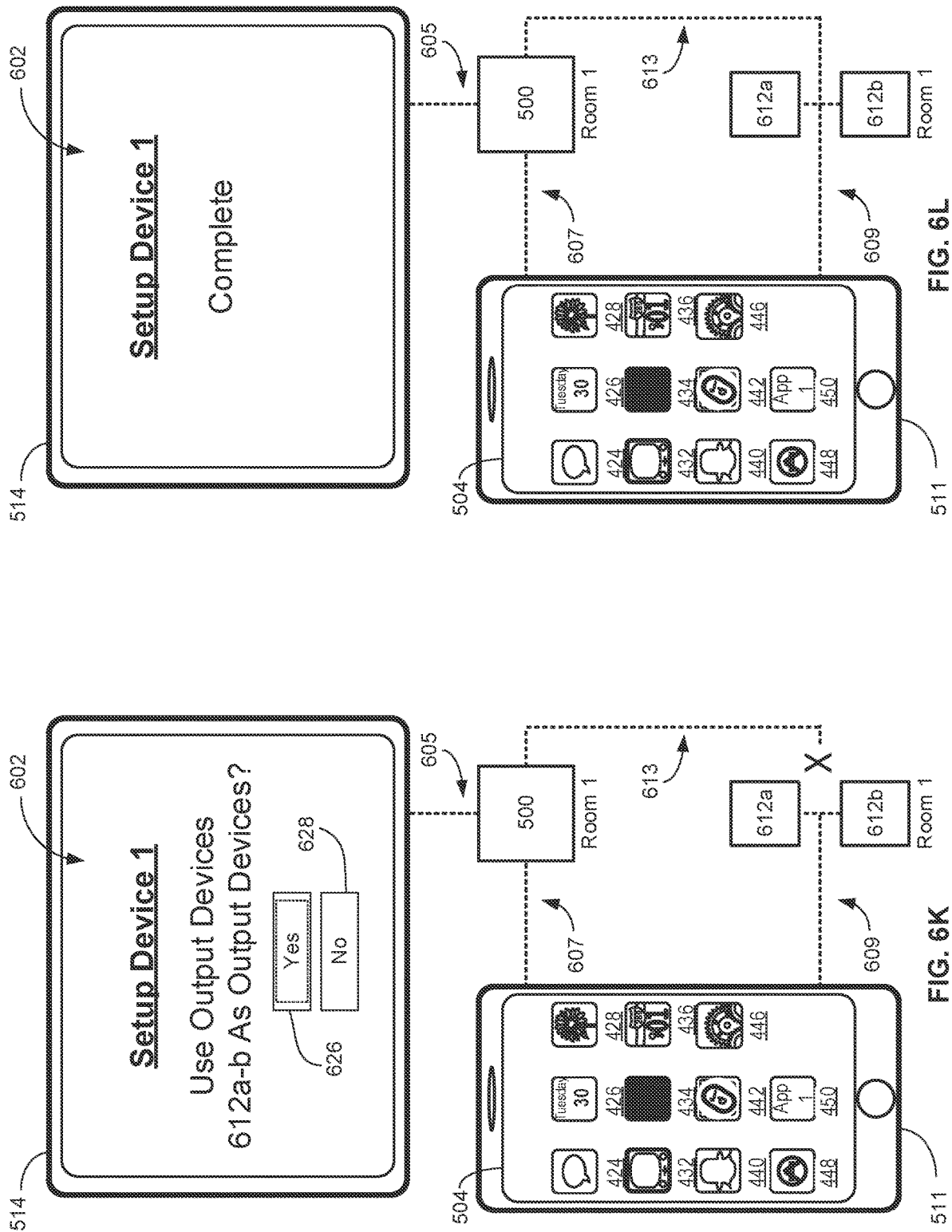

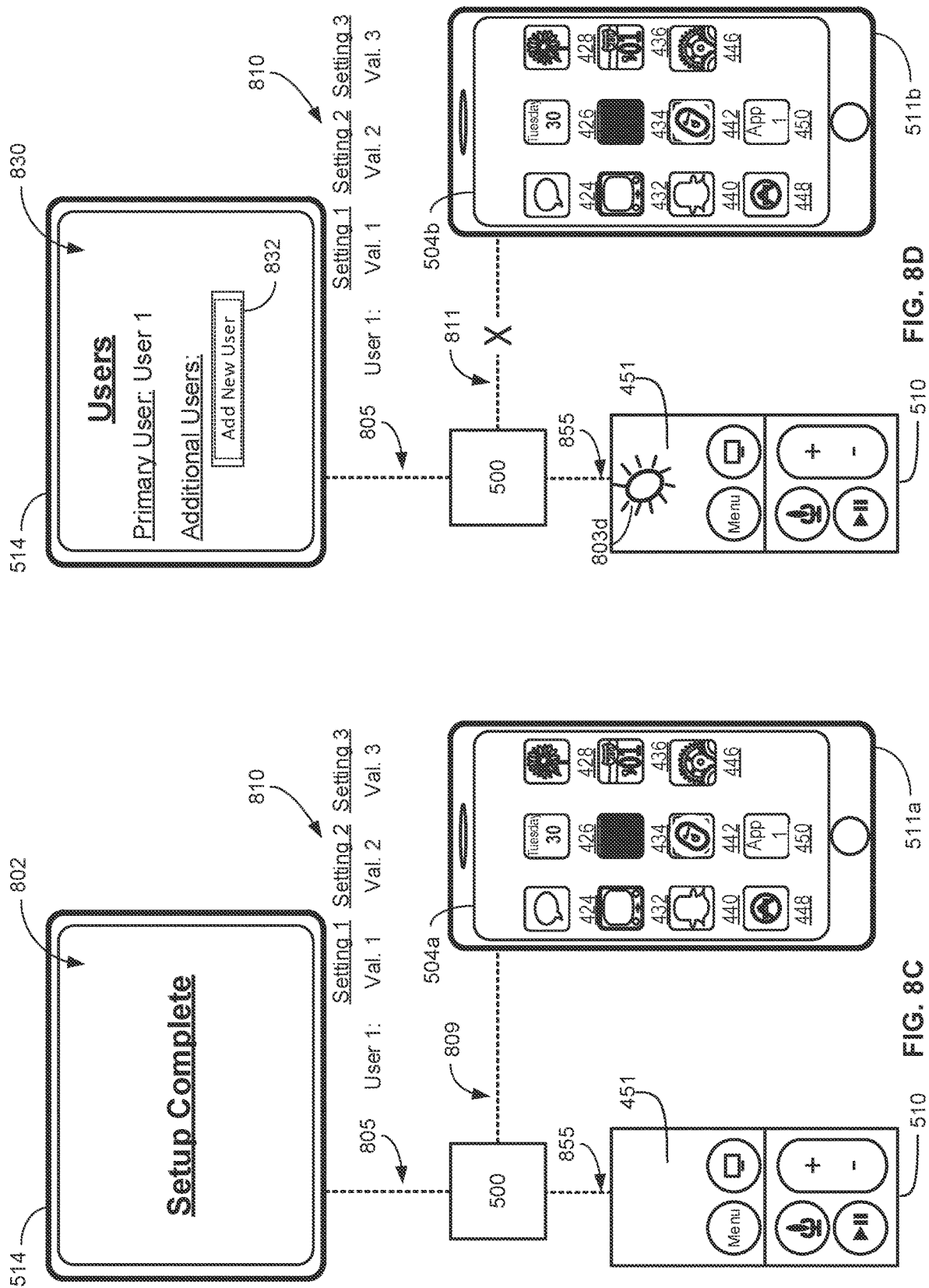

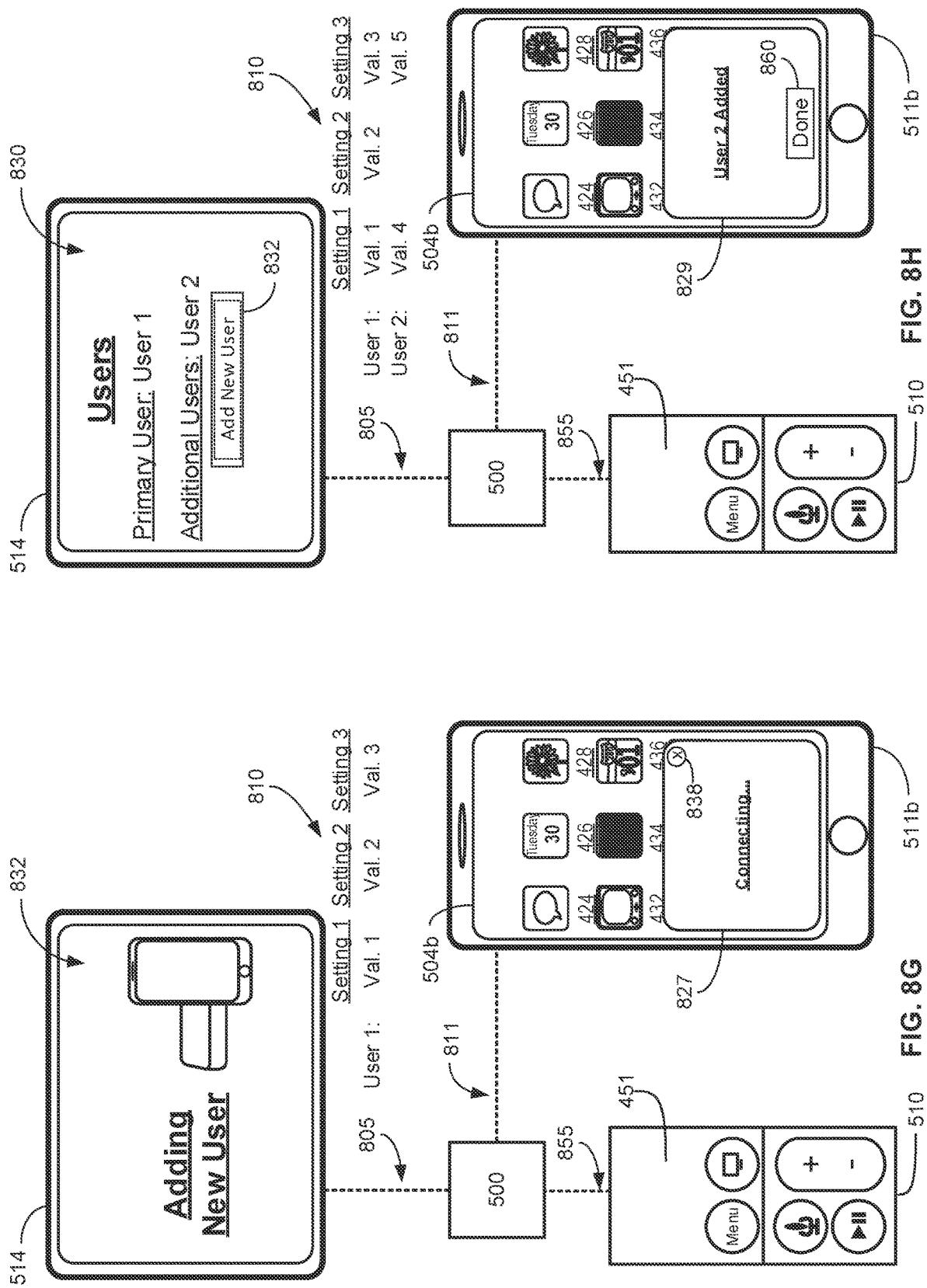

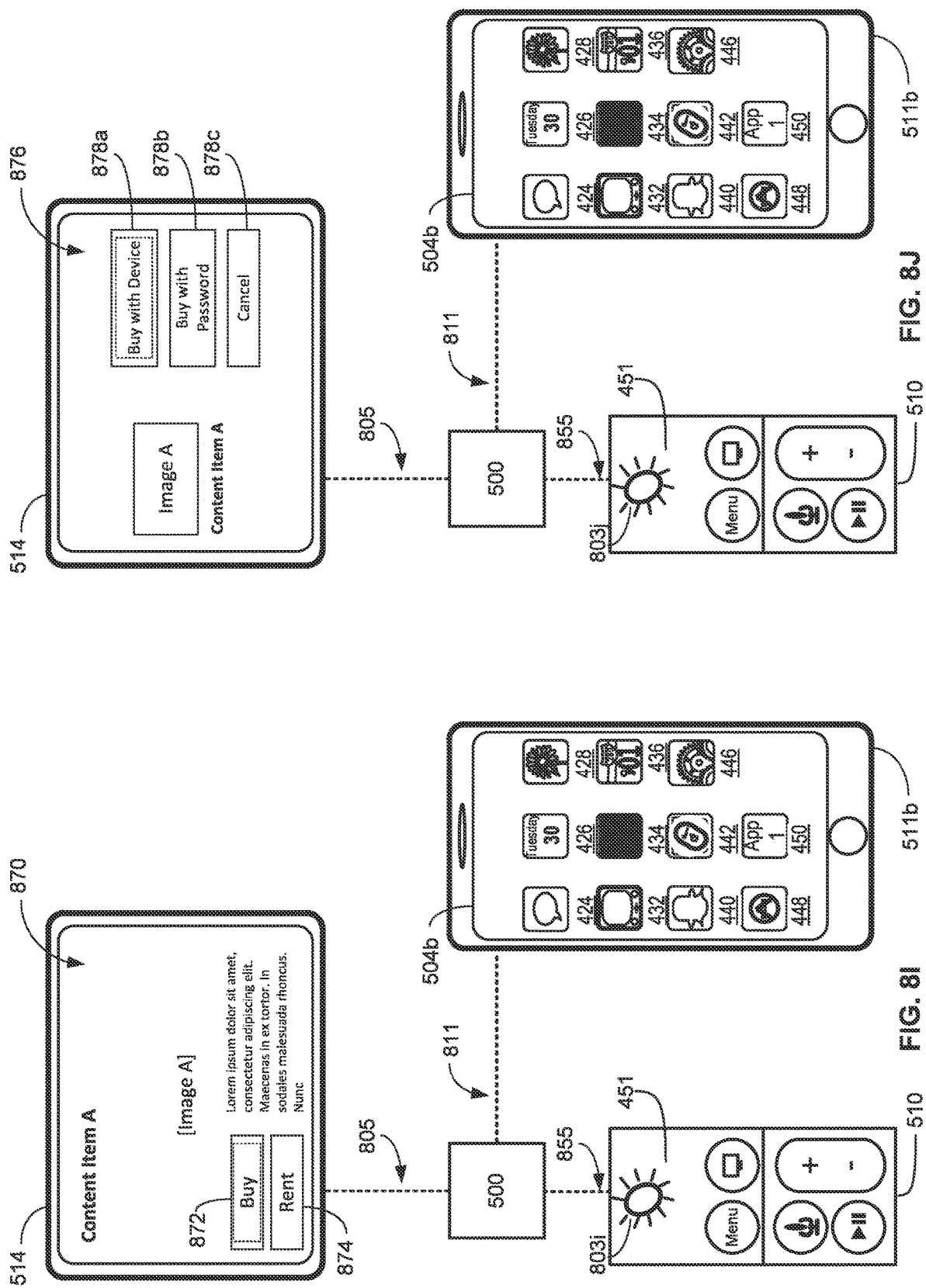

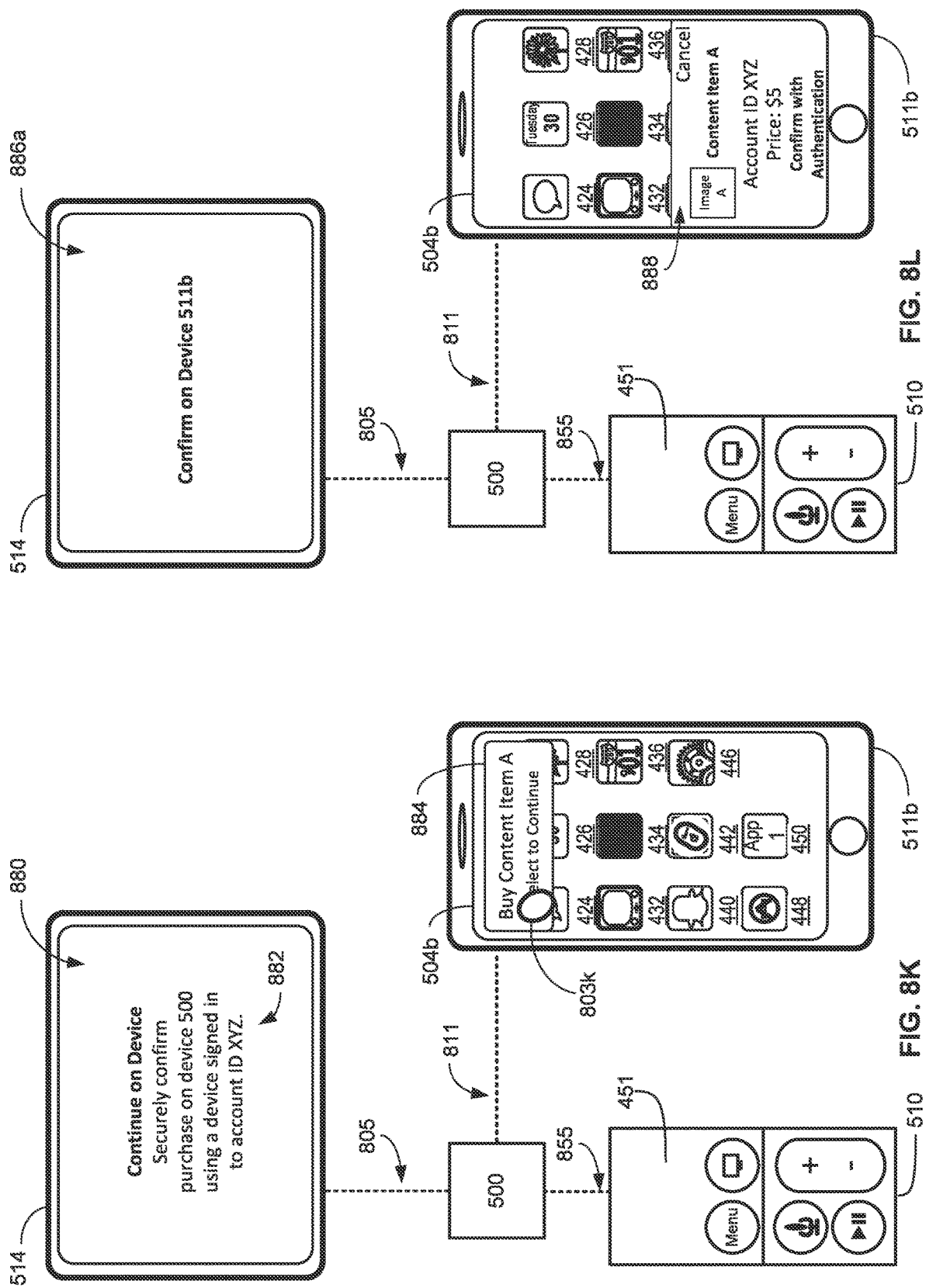

USER INTERFACES FOR SETTING UP AN ELECTRONIC DEVICE

CROSS-REFERENCE TO RELATED APPLICATIONS

This application claims the benefit of U.S. Provisional Application No. 63/041,981, filed Jun. 21, 2020, and U.S. Provisional Application No. 63/197,472, filed Jun. 6, 2021, the contents of which are incorporated herein by reference in their entirety for all purposes.

FIELD OF THE DISCLOSURE

This disclosure relates generally to user interfaces for setting up an electronic device.

BACKGROUND OF THE DISCLOSURE

User interaction with electronic devices has increased significantly in recent years. These devices can be devices such as computers, tablet computers, televisions, multimedia devices, or mobile devices. Sometimes a user may be setting up a first electronic device. The user may therefore desire efficient setup processes for the first electronic device.

SUMMARY OF THE DISCLOSURE

In some circumstances, an output device (e.g., an audio output device, such as a smart speaker) can operate as an output device for the first electronic device (e.g., set-top box), and in some circumstances, the first electronic device can be setup with settings values associated with a user profile. Enhancing the processes for setting an output device for the first electronic device and/or populating settings values for the first electronic device improve a user's experience with the first electronic device and decreases user interaction time, which is particularly important where input devices are battery-operated.

Some embodiments described in this disclosure are directed to ways to facilitate associating an output device with the first electronic device using a second electronic device. Some embodiments described in this disclosure are directed to ways to add an additional user to the first electronic device using a second electronic device. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
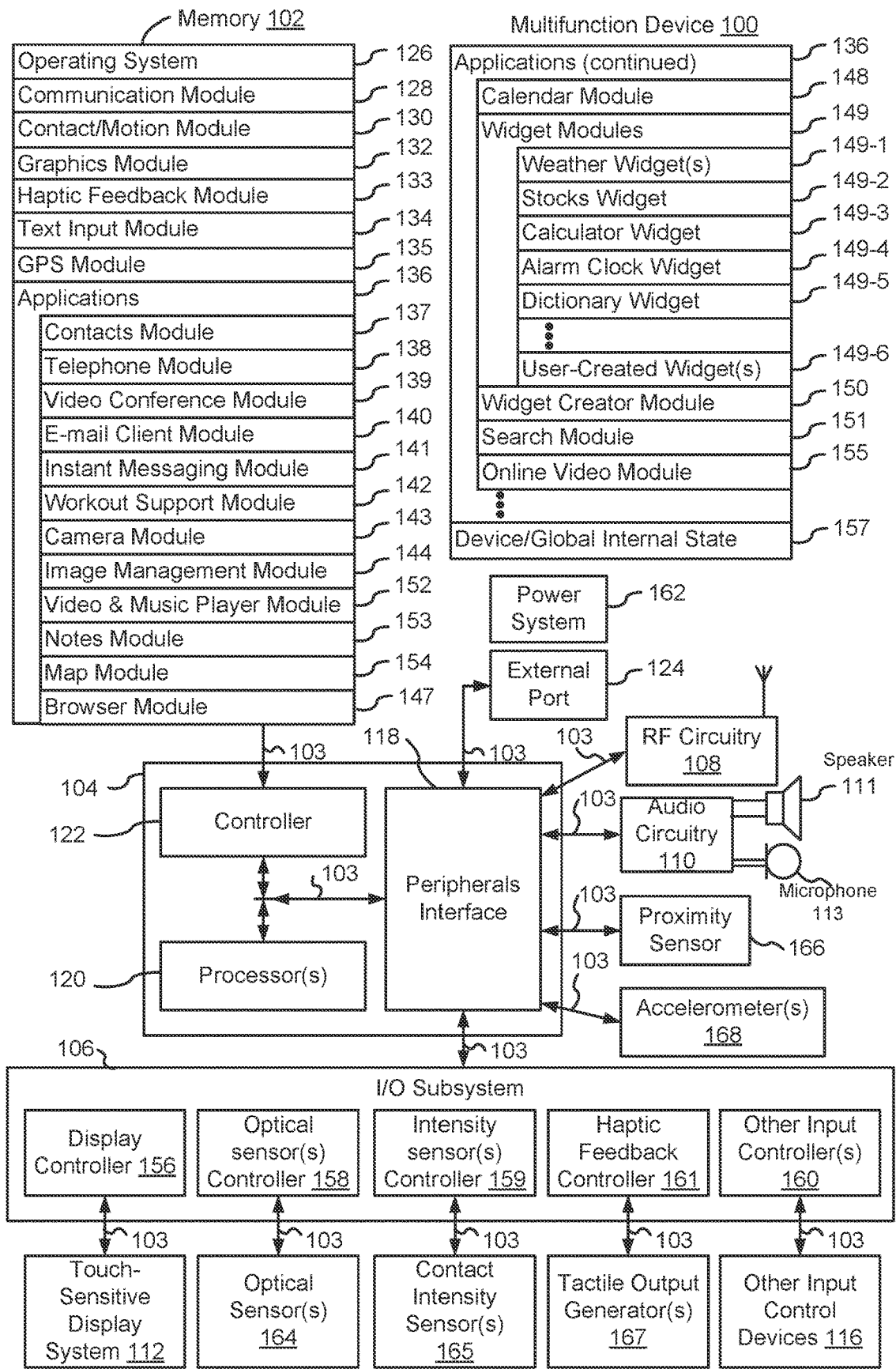
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for electronic devices that provide efficient user interfaces and mechanisms for associating an output device with a first electronic device and/or adding an additional user to the first electronic device. In some implementations, a second electronic device with which an output device is associated facilitates associating the output device with the first electronic device. In some implementations, a second electronic device that is associated with an additional user facilitates associating the additional user with the first electronic device. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/ or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/ output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
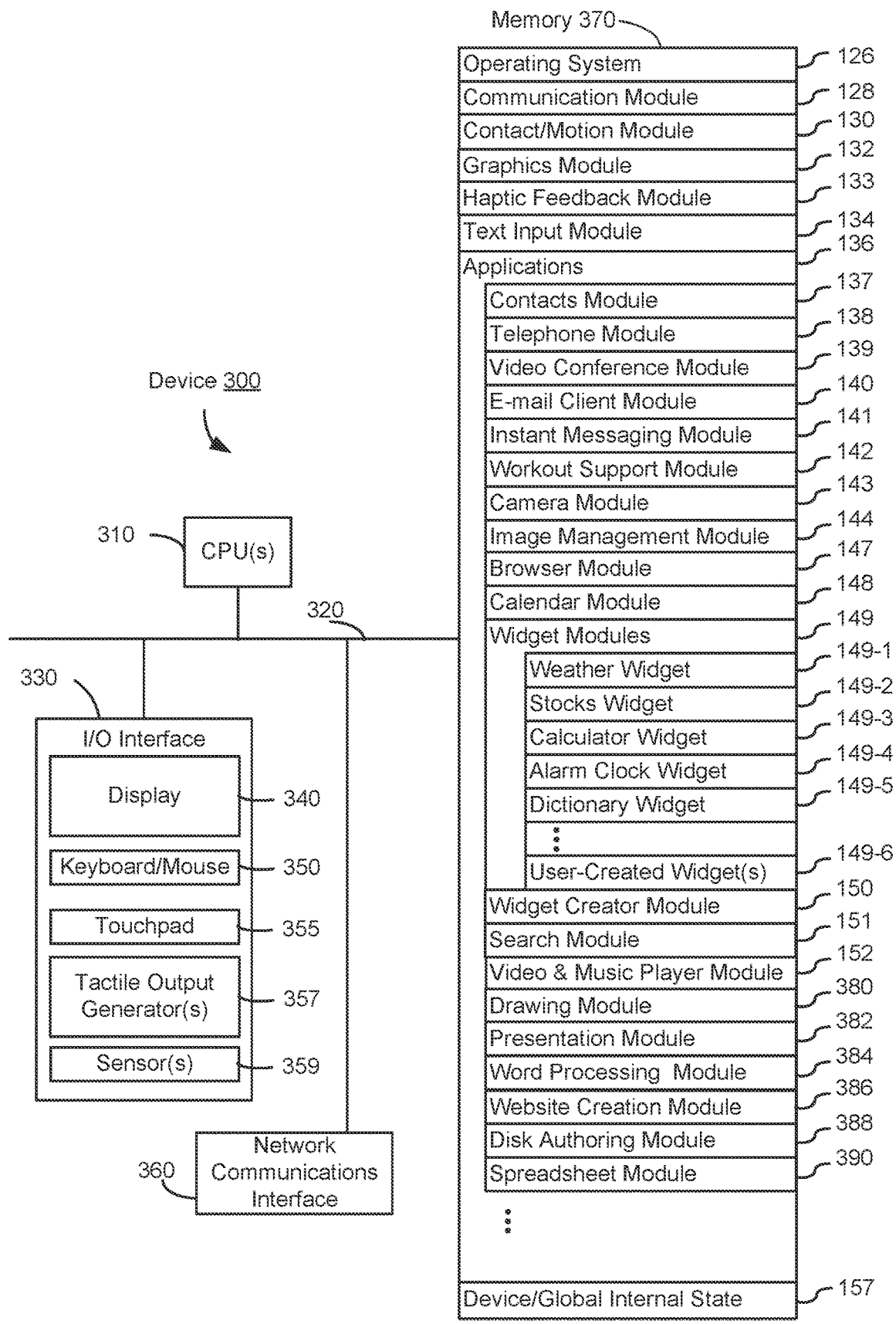
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
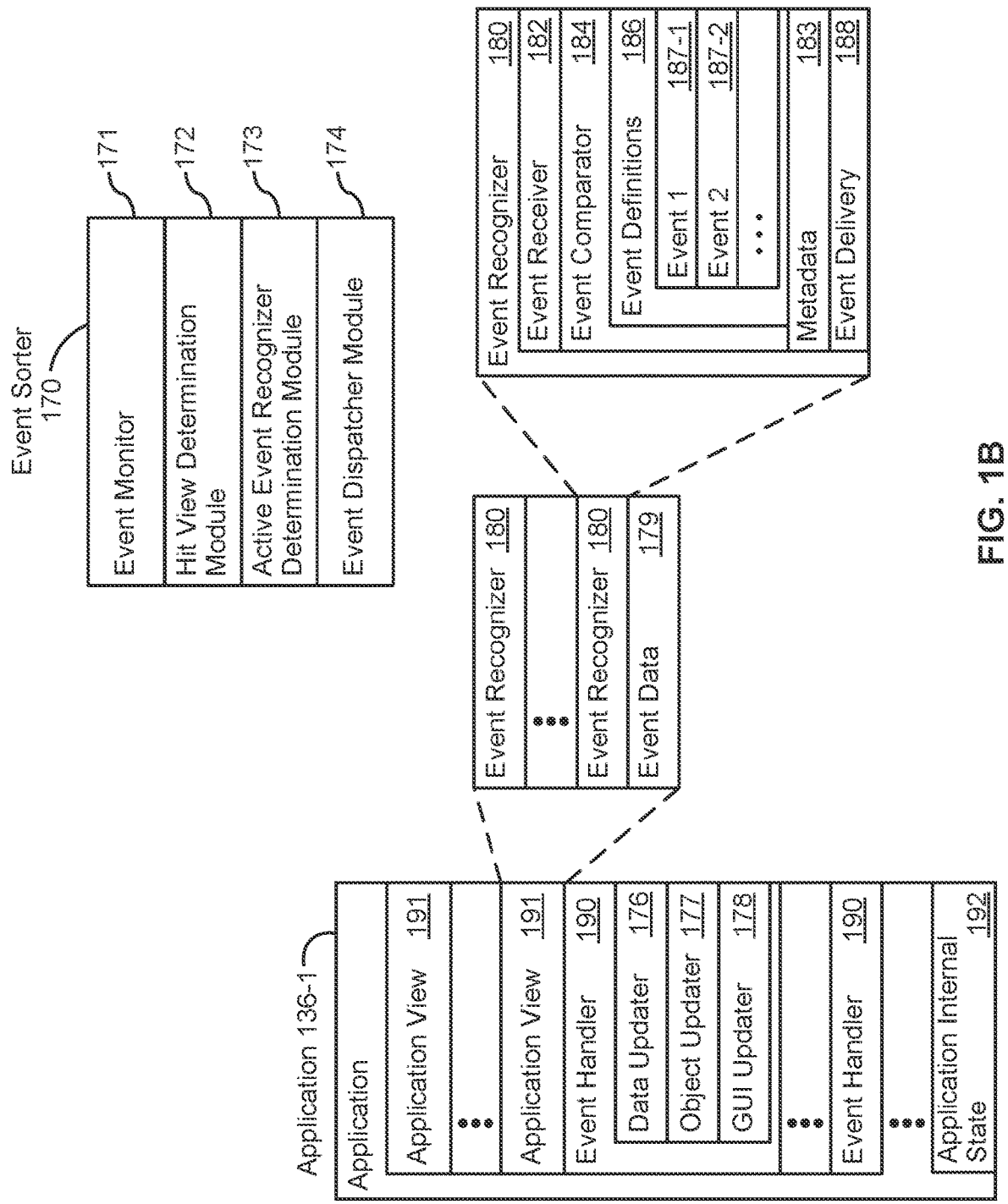
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
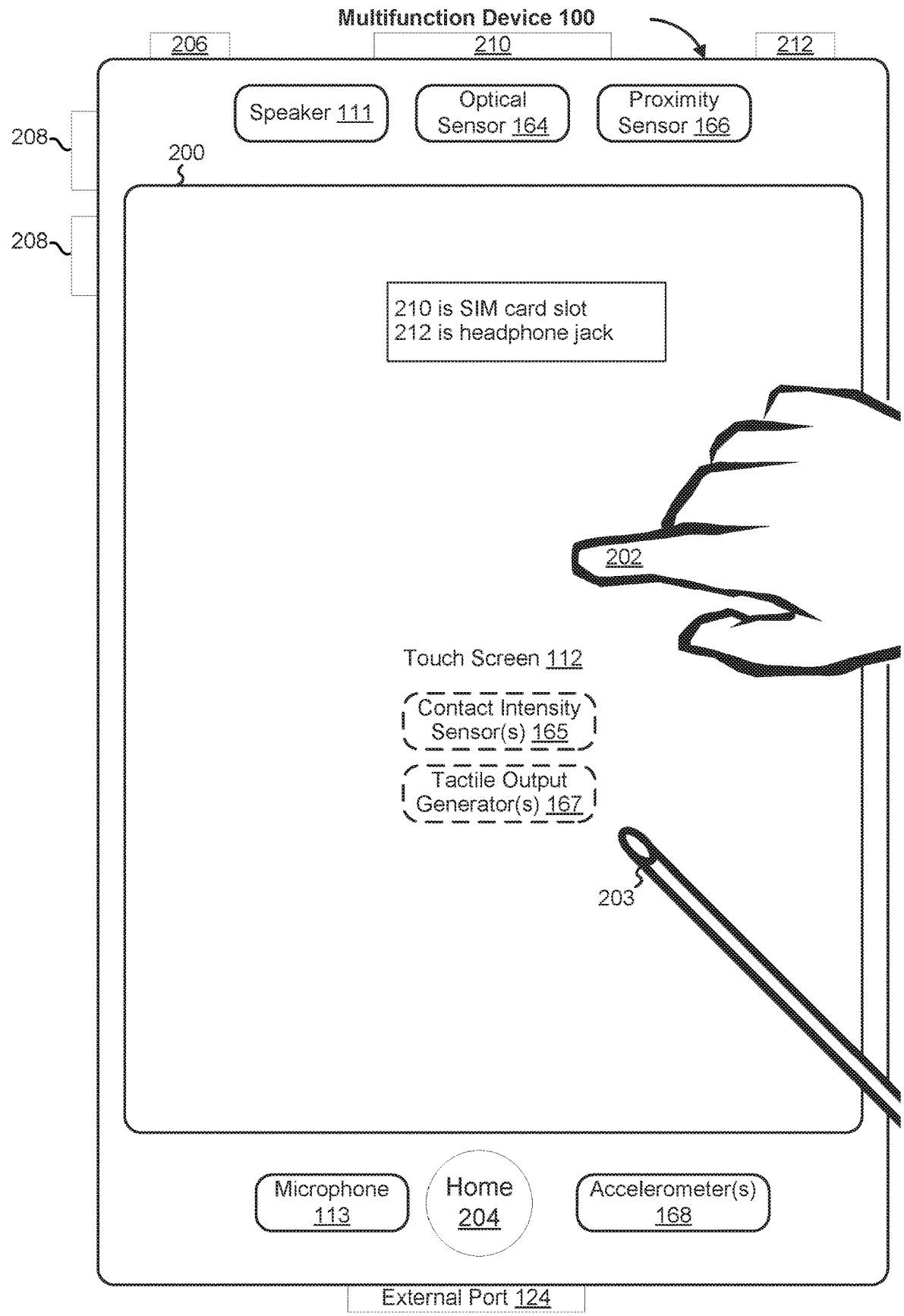
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
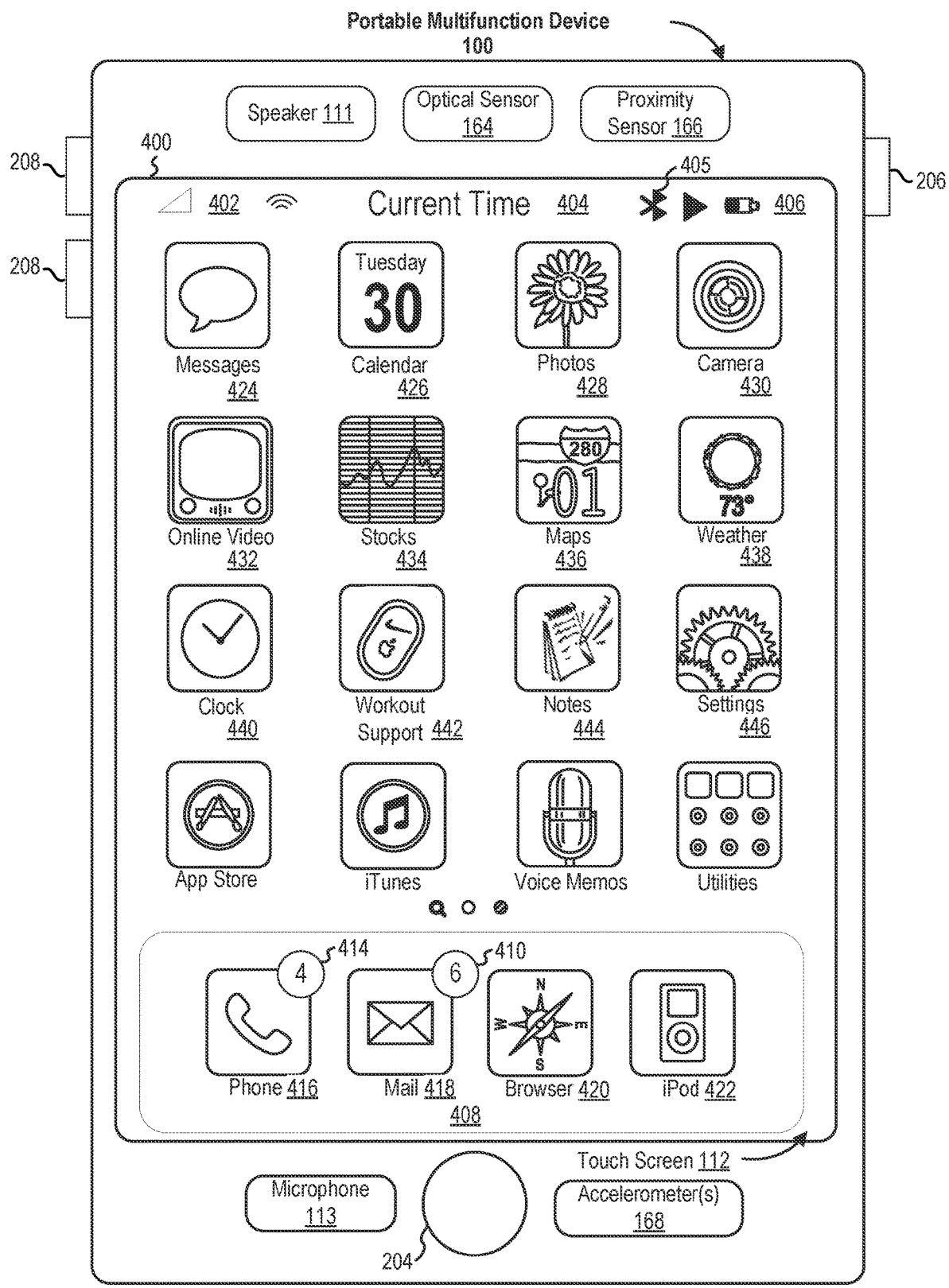
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
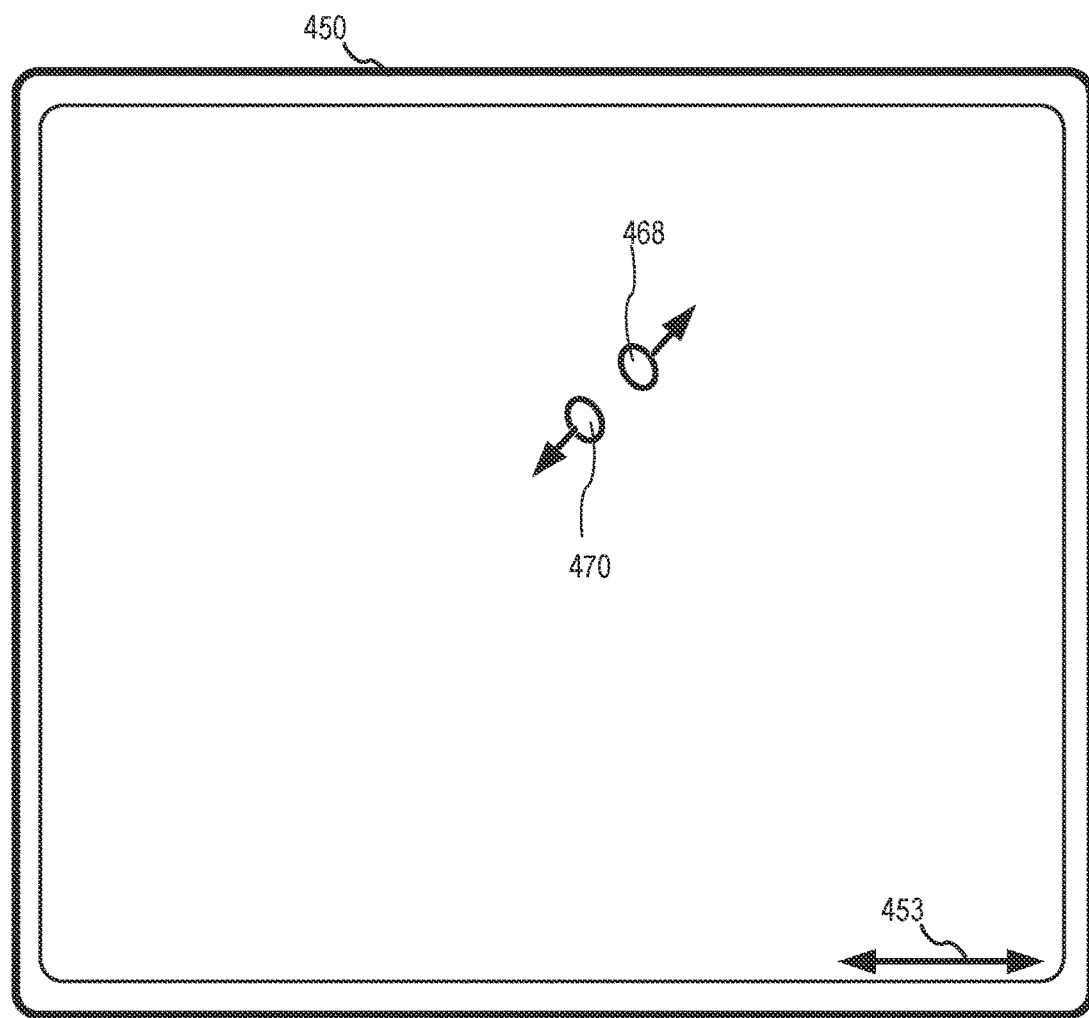
FIG. 4B illustrates an exemplary user interface for a multifunction device with a touch-sensitive surface that is separate from the display in accordance with some embodiments.
Figure 4B:
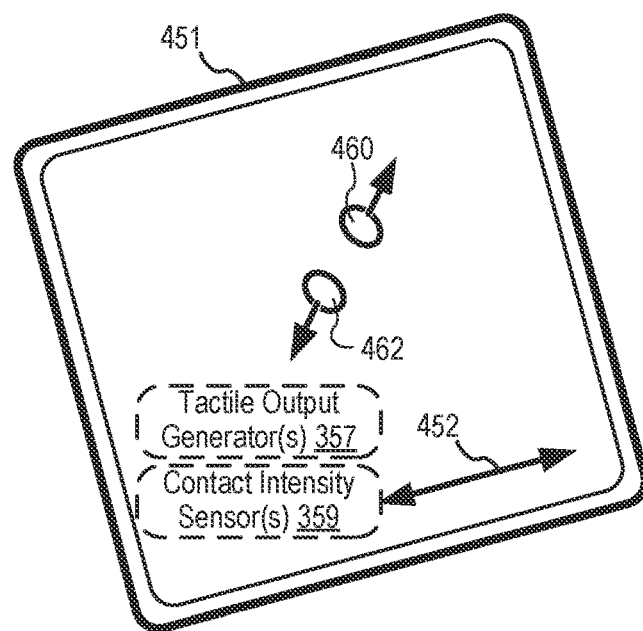

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
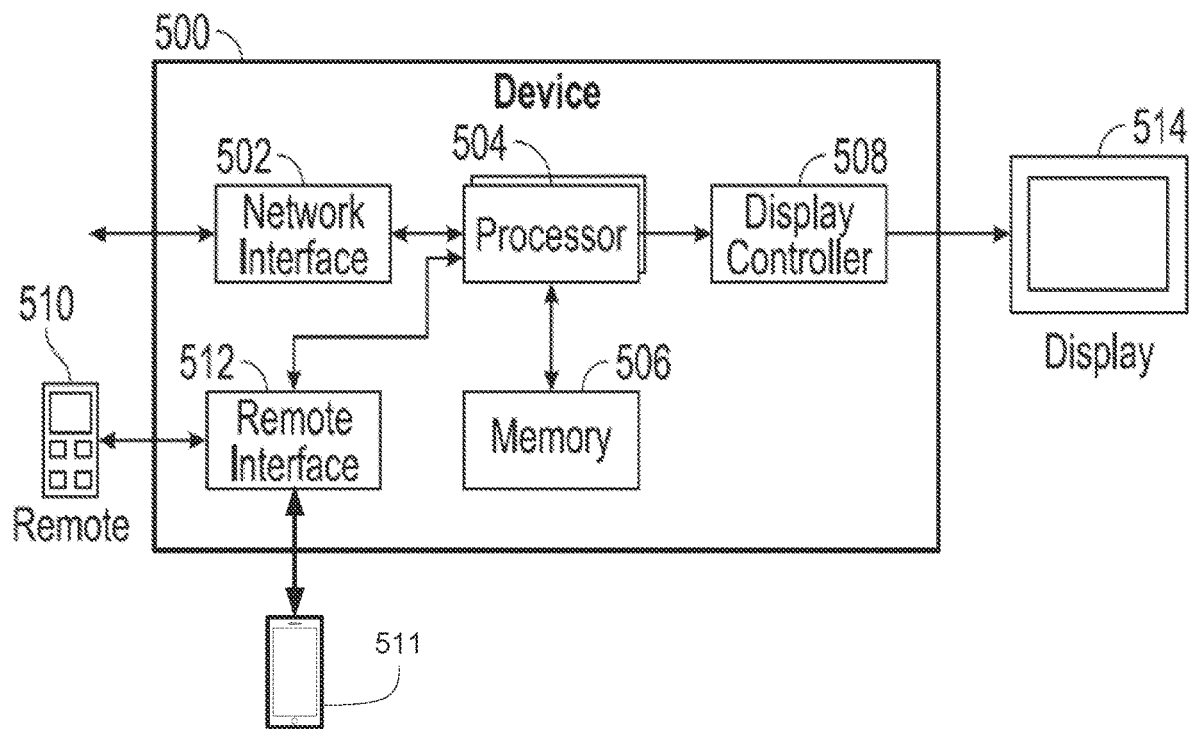
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700 and 900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multi-function device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
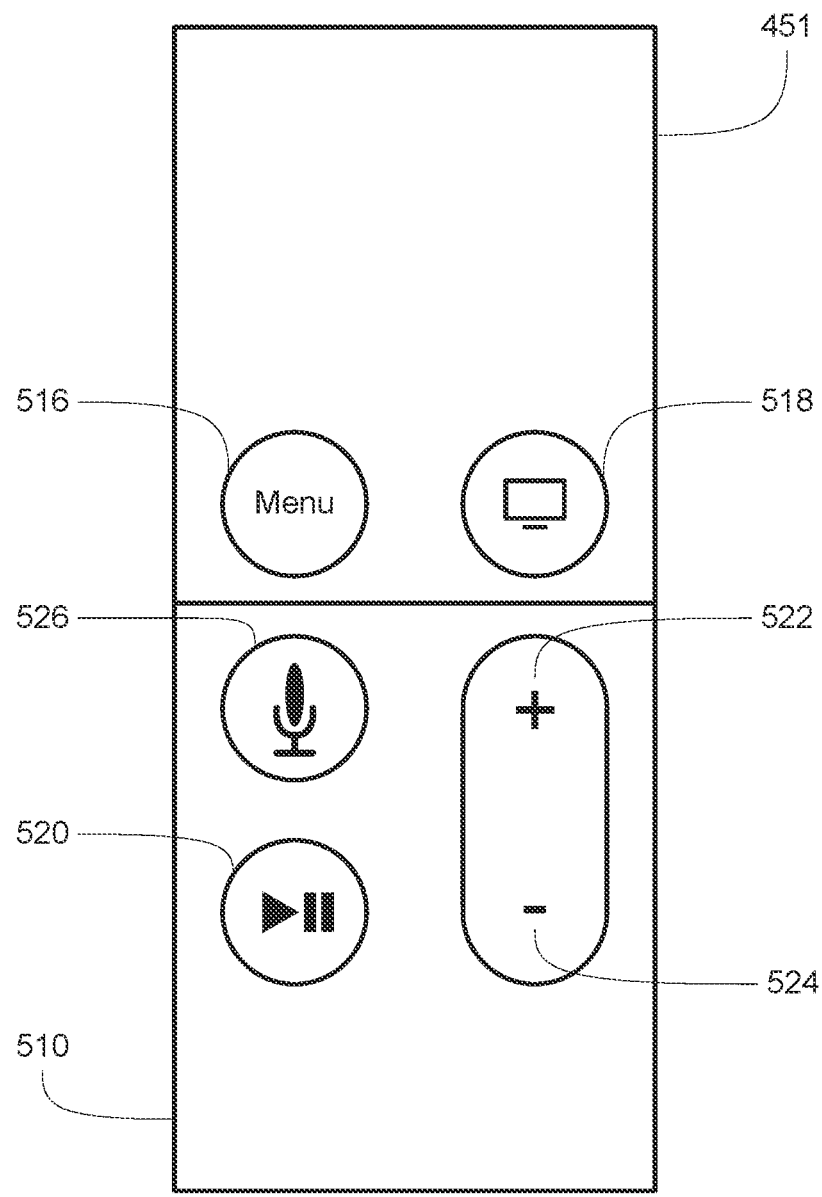

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
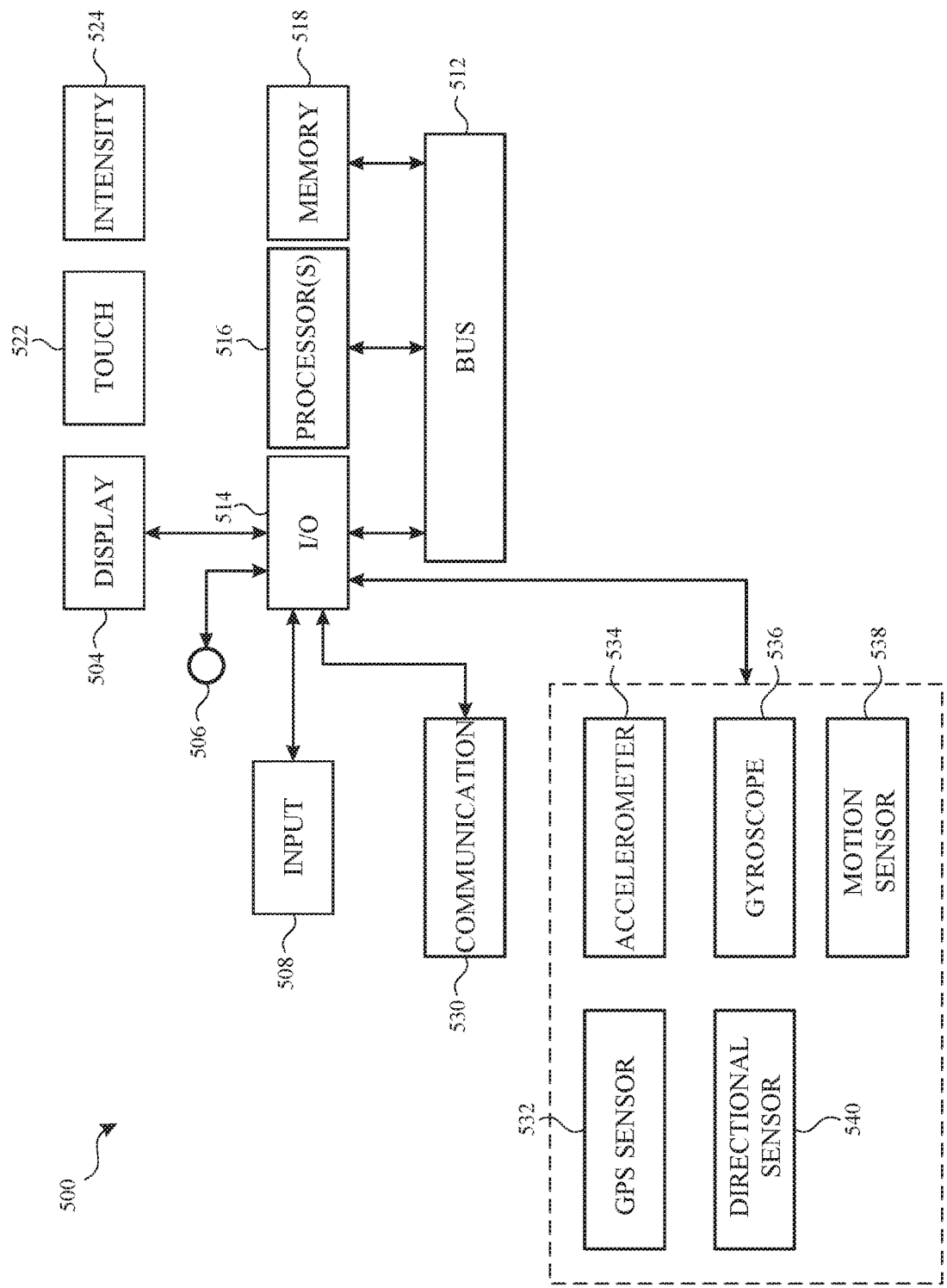

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-9. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application", filed Mar. 24, 2019), "User Interfaces For a Media Browsing Application", filed Mar. 24, 2019), and "User Interface Specific to Respective Content Items", filed Mar. 24, 2019), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

Output Device Association

Users interact with electronic devices in many different manners, including using electronic devices in ways that cause the electronic devices to generate outputs (e.g., audio, video, or otherwise). In some circumstances, associating an output device with an electronic device can allow the outputs generated by the electronic device to be produced by the output device (e.g., the output device can be a speaker that produces audio corresponding to audio signals generated by the electronic device and transmitted to the output device). The embodiments described below provide ways in which a second electronic device (e.g., smartphone or other device associated with an output device) facilitates associating an output device with a first electronic device (e.g., set-top box or other device not associated with the output device). Using the second electronic device to facilitate the association of the output device with the first electronic device enhances interactions with the first and second electronic devices, thus reducing the amount of time a user needs to perform operations with the first and/or second electronic devices, and reducing the power usage of the first and second devices, which increases battery life for battery-powered devices. It is understood that people use devices. When a person uses a device, that person is optionally referred to as a user of the device.

Figure 6N:
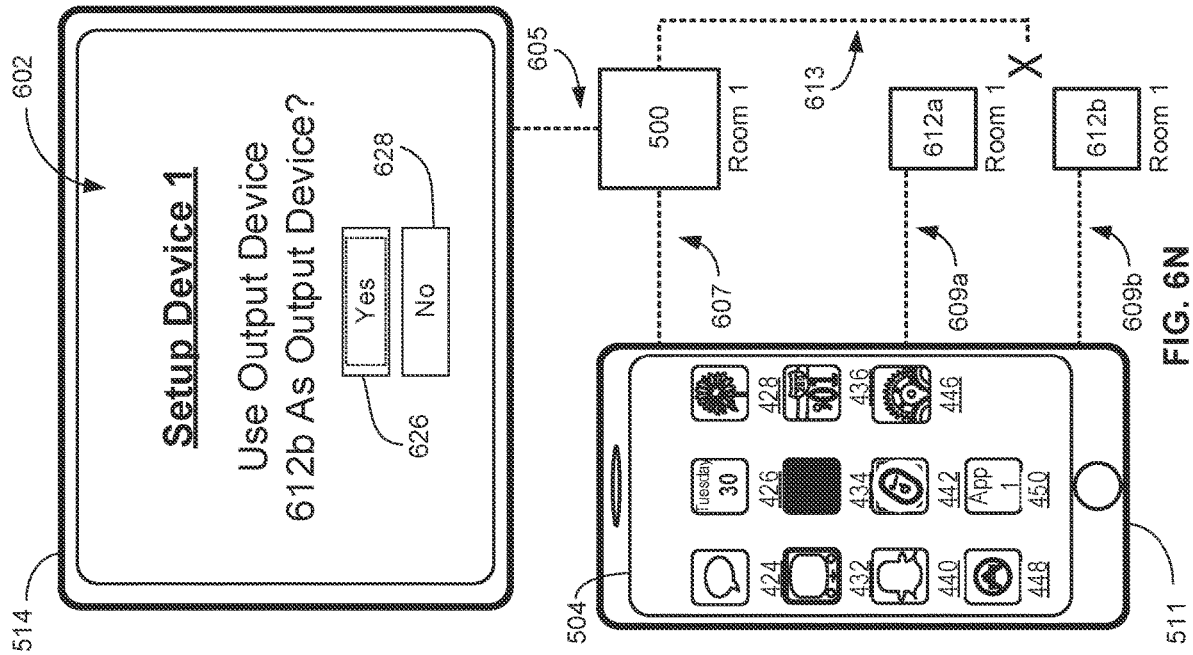
FIGS. 6A-6Q illustrate exemplary ways in which a second electronic device facilitates associating an output device with a first electronic device in accordance with some embodiments.
Figure 6M:
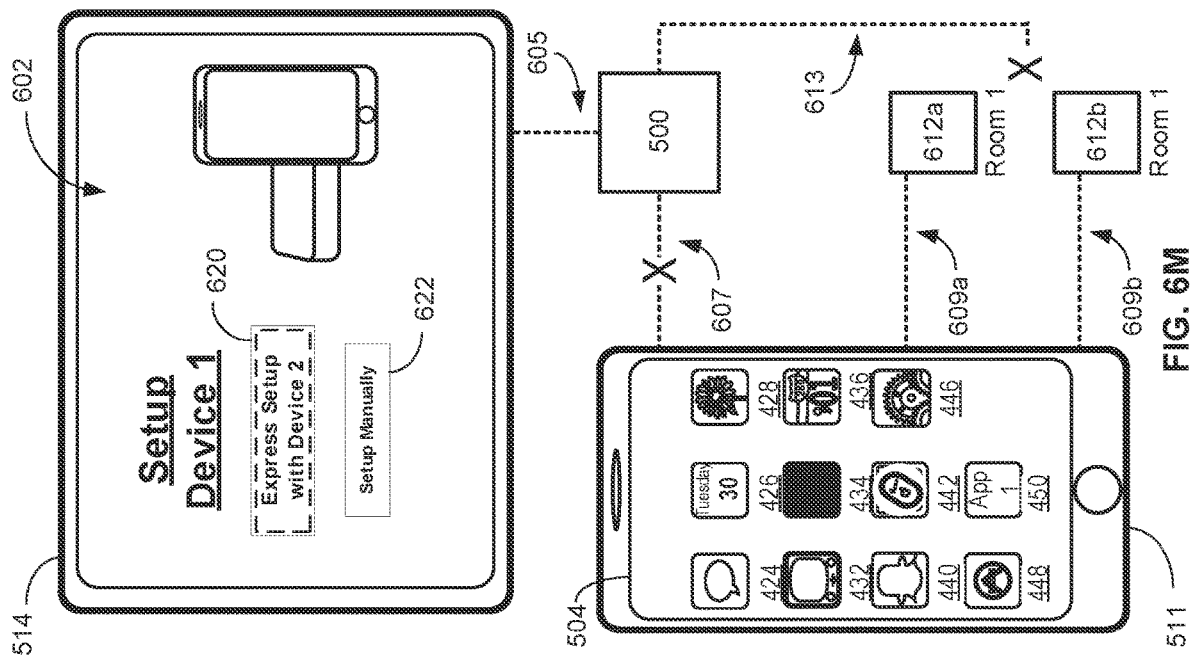
Figure 6P:
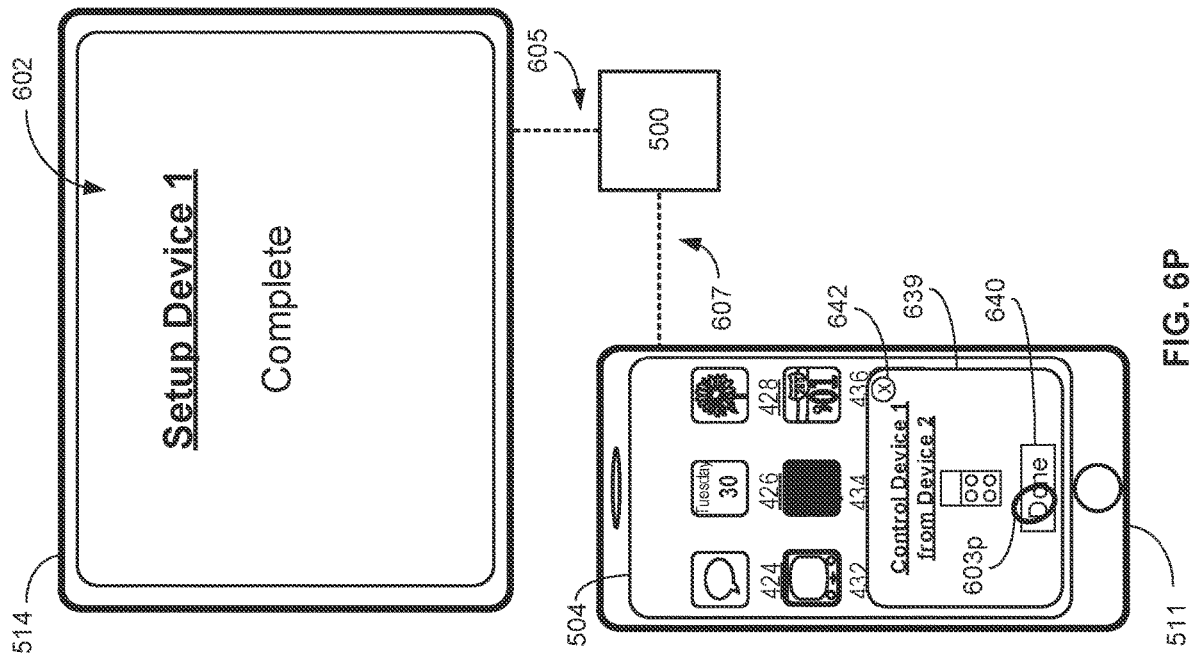
Figure 6O:
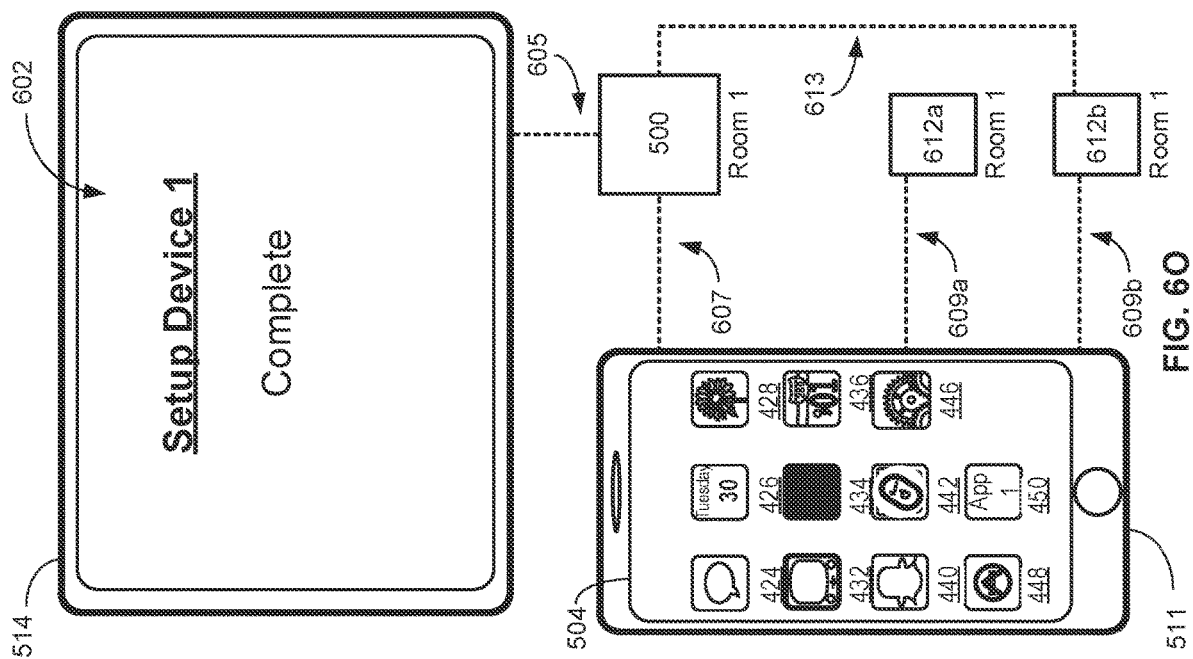
Figure 6Q:
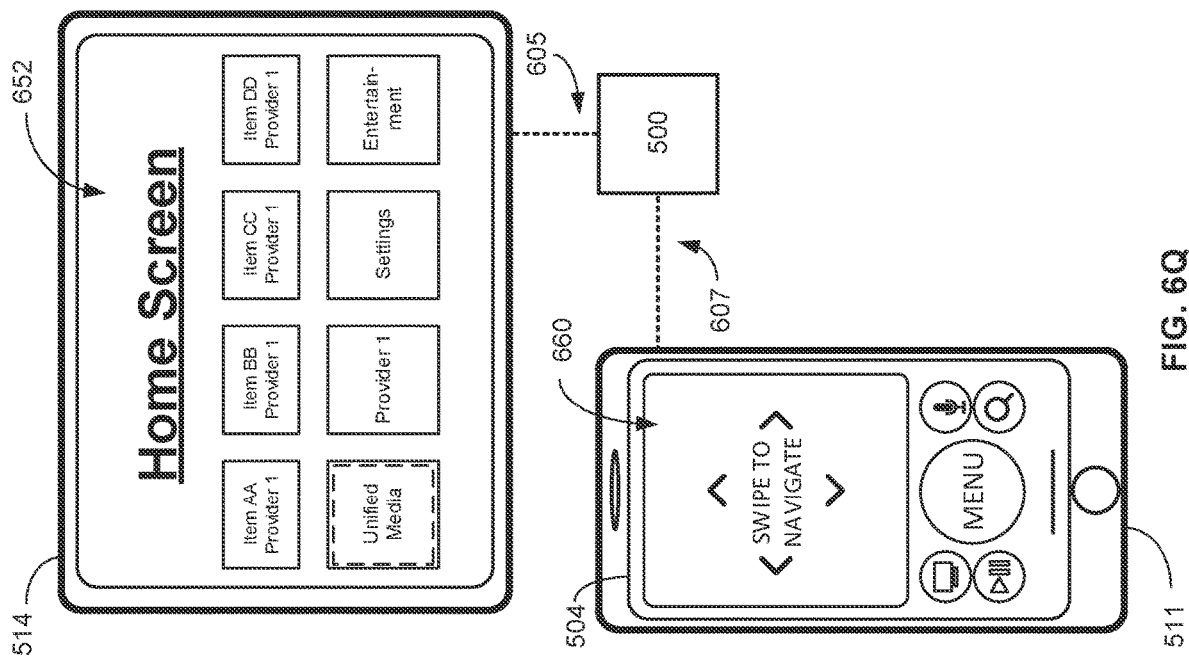

FIGS. 6A-6Q illustrate exemplary ways in which a second electronic device facilitates associating an output device with a first electronic device in accordance with some embodiments. The embodiments in these figures are used to illustrate the processes described below, including the processes described with reference to FIG. 7. Although FIGS. 6A-6Q illustrate various examples of ways a first/second electronic device is able to perform the processes described below with reference to FIG. 7, it should be understood that these examples are not meant to be limiting, and the first/second electronic device is able to perform one or more processes described below with reference to FIG. 7 in ways not expressly described with reference to FIGS. 6A-6Q.

In some embodiments, the first electronic device is a set-top box (e.g., device 500 in FIG. 5A) and the second electronic device is a smartphone (e.g., device 511 in FIG. 5A) in communication with the set-top box. In some embodiments, the first and second electronic devices are other types of devices, such as one or more of a wearable device (e.g., smart watch), a tablet computer, a laptop computer, a desktop computer, etc. In FIG. 6A, device 500 has not yet started a setup process and/or is in the midst of a setup process to configure device 500. In some embodiments, the setup process for device 500 includes populating one or more settings (e.g., user profile settings, user account settings, etc., such as described with reference to methods 700 and 900) such that device 500 is able to provide access to content, access to which is provided by those settings, for example. As shown in FIG. 6A, device 500 is in communication (e.g., wired or wireless) 605 with display 514. In FIG. 6A, device is displaying user interface 602 on a display generation component—for example, display 514 (e.g., a television).

User interface 602 is optionally a user interface of the setup process for device 500. User interface 602 optionally includes a first selectable option 620 that initiates the setup process for device 500 during which a second device, such as device 511, will be used to facilitate populating the one or more settings of device 500. User interface 602 optionally also includes a second selectable option 622 that initiates the setup process for device 500 during which the second device is not used to facilitate populating the one or more settings of device 500—in some embodiments, the settings are instead provided manually to device 500 (e.g., using a remote control device, such as device 510 in FIG. 5B). In FIG. 6A, the first selectable option 620 has the current focus (e.g., such that a click input detected on remote 510 will select selectable option 620).

In some embodiments, as part of the setup process for device 500, if device 511 is associated with an output device (e.g., a smart speaker, or any other device that is able to generate outputs, such as audio outputs, video outputs, or otherwise), device 500 is able to automatically provide an option to a user of device 500 to associate the output device with device 500 (e.g., in addition to device 511). In this way, the output device can be efficiently associated with device 500 as part of the setup process for device 500. Various examples of the treatment of an output device by device 500 during the setup process for device 500 will now be described.

For example, in FIG. 6A, a communication link 607 (e.g., wired or wireless) between device 511 and device 500 is not yet active (e.g., because device 500 has not yet been setup and/or because device 511 has not yet been paired with device 500). Further, a communication link 613 (e.g., wired or wireless) between device 500 and output device 612a is not yet active (e.g., because device 500 has not yet been setup and/or because output device 612a has not yet been set as an output device of device 500). However, a communication link 609 (e.g., wired or wireless) between device 511 and output device 612a is active. For example, output device 612a (e.g., a smart speaker) has been setup as an output device for device 511 such that outputs (e.g., audio) generated by device 511 can be outputted by output device 612a (e.g., when indicated on device 511). In some embodiments, output device 612a has been setup as a component in a smart home configuration associated with device 511—in some embodiments, output device 612a has been associated with a particular location in the smart home configuration (e.g., Room 1).

In FIG. 6A, an input initiating the setup process for device 500 (e.g., manual setup or device-assisted setup) is optionally detected (e.g., via a remote 510), and the setup process for device 500 optionally begins. In some embodiments, during the setup process for device 500, communication link 607 between device 511 and device 500 becomes active, as shown in FIG. 6B (e.g., because device 511 and device 500 become associated with the same user profile, similar to as described with reference to method 900). Further, in some embodiments, device 500 becomes associated with a location (e.g., a room in a smart home configuration associated with device 511 and/or device 500). For example, during the setup process, a user of device 500 optionally indicates with what location device 500 is associated. Because device 511 was associated with output device 612a, and because device 500 and output device 612a have been associated with the same location (e.g., Room 1) as a result of the setup process of device 500, in some embodiments, during (and/or at the end of and/or after) the setup process for device 500, device 500 displays on display 514, a selectable option 626. Selectable option 626 is optionally selectable to associate device 500 with output device 612a, such that output device 612a is able to produce outputs generated by device 500 (e.g., output device 612a becomes an output device for device 500 in addition to device 511). In some embodiments, device 500 also displays on display 514 selectable option 628 that is selectable to forgo associating output device 612a with device 500.

In FIG. 6B, an input selecting selectable option 626 is optionally detected (e.g., via a remote 510). In response, as shown in FIG. 6C, communication link 613 between device 500 and output device 612a becomes active, and output device 612a becomes associated with device 500 to be able to operate as an output device for device 500 (e.g., in addition to device 511). In some embodiments, the setup process is completed. In some embodiments, device 511 transfers, to device 500, settings values and/or data to facilitate the association of, and the communication between, device 500 and output device 612a—in some embodiments, no user inputs other than selection of option 626 are required to successfully associate output device 612a and device 500. Therefore, as described with reference to FIGS. 6A-6C, device 500 and 511 are able to facilitate efficient association of output device 612a with device 500 (e.g., as part of, at the end of, or after the setup process for device 500). In some embodiments, anytime a device (e.g., a smartphone, tablet computer, wearable device such as a smart watch, etc.) that is associated with device 500 (e.g., paired with device 500) is associated with an output device with which device 500 is not associated, device 500 optionally presents a user interface and selectable options similar to those shown in FIG. 6B to initiate a process to associate the relevant output device with device 500 (e.g., independent of any more general setup process of device 500). This behavior optionally analogously applies to any and all of the embodiments described herein.

In various other scenarios, device 500 optionally responds differently than as described with reference to FIGS. 6A-6C. For example, in FIG. 6D (e.g., having the same features as described with reference to FIG. 6A, except as otherwise noted), before the setup process for device 500 begins, device 511 is associated with output device 612a, which is associated with Room 2 (e.g., rather than Room 1 in FIG. 6A). Further, communication links 607 and 613 are not active. After the setup process begins (e.g., as described with reference to FIG. 6A), device 500 has been associated with Room 1, and communication link 607 has become active, as shown in FIG. 6E. Further, the setup process has been completed without device 500 displaying the option to associate output device 612a with device 500. In FIGS. 6D-6E, because device 500 and output device 612a are not associated with the same location (e.g., they are associated with different rooms in a smart home configuration), the setup process of device 500 optionally does not include displaying the option to associate the output device 612a with device 500. Therefore, as shown in FIG. 6E, the setup process for device 500 optionally completes, and the communication link 613 between device 500 and output device 612a remains inactive.

Device 500 optionally does not display an option to associate an output device with device 500 as part of the setup process of device 500 when device 511 is not associated with an output device. For example, in FIG. 6F (e.g., having the same features as described with reference to FIG. 6A, except as otherwise noted), before the setup process for device 500 begins, device 511 is not associated with an output device, and communication link 607 is not active. After the setup process begins (e.g., as described with reference to FIG. 6A), device 500 has been associated with Room 1, and communication link 607 has become active, as shown in FIG. 6G. Further, the setup process has been completed without device 500 displaying the option to associate an output device with device 500. In FIGS. 6F-6G, because device 511 is not associated with an output device (e.g., the device that becomes associated with device 500 during the setup process and/or facilitates the setup of device 500 is not associated with an output device), the setup process of device 500 optionally does not include displaying the option to associate an output device with device 500. Therefore, as shown in FIG. 6G, the setup process for device 500 optionally completes, and no communication link between device 500 and an output device is established or active.

As another example, even if an output device is associated with the same location as device 500, device 500 optionally does not display an option to become associated with the output device if that output device is not associated with device 511 (e.g., the device 511 that is in communication with device 500 during the setup process). For example, in FIG. 6H (e.g., having the same features as described with reference to FIG. 6A, except as otherwise noted), before the setup process for device 500 begins, output device 612a is associated with Room 1, but device 511 is not associated with output device 612a. In some embodiments, output device 612a is associated with another multifunction device such as a smartphone (e.g., is set as an output device for that other multifunction device) that is not in communication with (e.g., is not facilitating setup of) device 500. Further, communication links 607, 609 and 613 are not active. After the setup process begins (e.g., as described with reference to FIG. 6A), device 500 has been associated with Room 1, and communication link 607 has become active, as shown in FIG. 6I. Further, the setup process has been completed without device 500 displaying the option to associate output device 612a with device 500. In FIGS. 6H-6I, even though device 500 and output device 612a are associated with the same location (e.g., Room 1), because output device 612a is not associated with device 511, the setup process of device 500 optionally does not include displaying the option to associate the output device 612a with device 500. Therefore, as shown in FIG. 6I, the setup process for device 500 optionally completes, and the communication link 613 between device 500 and output device 612a remains inactive.

In some embodiments, if multiple output devices have been associated with each other (e.g., as a stereo pair) when the setup process of device 500 occurs, device 500 optionally displays an option to associate the pair (or more) of output devices with device 500. For example, in FIG. 6J (e.g., having the same features as described with reference to FIG. 6A, except as otherwise noted), before the setup process for device 500 begins, output device 612a is associated with (e.g., paired with) output device 612b (e.g., as a stereo pair), and the associated group of output devices 612a and 612b is associated with Room 1. Further, device 511 is associated with the group of output devices 612a and 612b (e.g., devices 612a and 612b operate as stereo output devices for device 511). Communication links 607 and 613 are not active. After the setup process begins (e.g., as described with reference to FIG. 6A), device 500 has been associated with Room 1, and communication link 607 has become active, as shown in FIG. 6K (e.g., having the same features as described with reference to FIG. 6B, except as otherwise noted). Because device 500 and output devices 612a/612b are associated with the same location, and because device 511 is associated with output devices 612a/612b, device 500 displays the selectable option 626 to associate the group of output devices 612a/612b with device 500, such that the group of output device 612a/612b will be set as the output device for device 500. In FIG. 6K, selectable option 626 is selected, and as shown in FIG. 6L, the setup process has been completed, the group of output devices 612a/612b has been set as the output device for device 500 (e.g., to operate as a stereo pair of output devices for device 500), and the communication link 613 between device 500 and the group of output devices 612a/612b is active.

In some embodiments, if multiple output devices have been associated with device 511 when the setup process of device 500 occurs, device 500 optionally displays an option to associate a selected one of the output devices with device 500. For example, in FIG. 6M (e.g., having the same features as described with reference to FIG. 6A, except as otherwise noted), before the setup process for device 500 begins, output device 612a is associated with device 511 (e.g., via active communication link 609a), output device 612b is separately associated with device 511 (e.g., via active communication link 609b), and output devices 612a and 612b are associated with Room 1. In some embodiments, output devices 612a and 612b are not associated with each other (e.g., are not a stereo pair of output devices for device 511, but rather are individual output devices that can be individually set as an output device for device 511). Communication links 607 and 613 are not active. After the setup process begins (e.g., as described with reference to FIG. 6A), device 500 has been associated with Room 1, and communication link 607 has become active, as shown in FIG. 6N (e.g., having the same features as described with reference to FIG. 6B, except as otherwise noted). Because device 500 and output devices 612*a* and 612*b* are associated with the same location, and because device 511 is associated with output devices 612*a* and 612*b*, device 500 displays the selectable option 626 to associate one of output devices 612*a* or 612*b* with device 500, such that the selected output device of devices 612*a* and 612*b* will be set as the output device for device 500. In some embodiments, which output device is presented for association depends on a prioritization of the output devices. For example, in some embodiments, the output device more recently used by device 511 as an output device is presented, by device 500, for association with device 500. In FIG. 6N, this selected device is output device 612*b*. In FIG. 6N, selectable option 626 is selected, and as shown in FIG. 6O, the setup process has been completed, output device 612*b* has been set as the output device for device 500, and the communication link 613 between device 500 and output device 612*b* is active. There is optionally no active communication link between device 500 and output device 612*a*. In some embodiments, rather than selecting one output device for association, device 500 presents both output devices to be concurrently associated with device 500 (e.g., either as individual output devices or as paired output devices). In some embodiments, if device 500 detects selection of option 628 in FIG. 6N, device 500 optionally presents another selectable option that is selectable to associate the other output device (e.g., output device 612*a*) with device 500 (e.g., device 500 steps through the available output devices until the device 500 detects an input accepting association with one or more of the output devices).

In some embodiments, additionally or alternatively to the embodiments described above with reference to output devices, device 511 is able to operate as a remote control input device to device 500 (e.g., to provide directional inputs to device 500 and/or to provide button-press inputs to device 500, such as the directional and button press inputs described with reference to FIG. 5B). Therefore, in some embodiments, during, at the end of, or after the setup process for device 500, device 500 causes an indication to be displayed on device 511 (e.g., the device that facilitates setup of device 500) that allows for quick and efficient access of a remote control user interface on device 511 for controlling device 500. For example, in FIG. 6P, the setup process for device 500 has been completed (e.g., and the setup process was optionally initiated as described with reference to FIG. 6A), and communication link 607 between device 500 and device 511 is active. In FIG. 6P, device 500 has optionally transmitted an indication to device 511 to display a user interface element 639 on touch screen 504 (e.g., overlaid on whatever user interface was displayed by device 511, such as overlaid on a home screen user interface of device 511 as described with reference to FIG. 4A). In some embodiments, user interface element 639 includes information indicating that device 500 can be controlled from device 511, an option 642 that is selectable to dismiss user interface element 639 without displaying a remote control user interface on touchscreen 504, and an option 640 that is selectable to display the remote control user interface on touch screen 504.

In FIG. 6P, device 511 detects selection of option 640 (e.g., via contact 603*p*). In response, as shown in FIG. 6Q, device 511 displays remote control user interface 660 on touch screen 504. In some embodiments, remote control user interface 660 includes the functionality of remote control 510 described with reference to FIG. 5B via touch screen 504 (e.g., a directional input area that is interactable via touch inputs/gestures with movements detected via touch screen 504, and one or more buttons that are selectable via touch inputs (e.g., taps) detected via touch screen 504). In some embodiments, interaction with remote control user interface 660 causes device 511 to transmit commands corresponding to the interaction to device 500, thus controlling operation of device 500 in accordance with those interactions. In some embodiments, upon completion of the setup process for device 500, device displays a home screen user interface 652 that includes various selectable options (e.g., "Unified Media", "Provider 1", "Settings", etc.) that are selectable to display corresponding applications/user interfaces on display 514. In FIG. 6Q, the "Unified Media" option has the current focus. In some embodiments, inputs detected at remote control user interface 660 control the current focus (e.g., move the current focus) and/or provide other inputs to device 500 (e.g., a selection input to cause selection of the option that has the current focus, such as the "Unified Media" option). Therefore, as described with reference to FIGS. 6P-6Q, in some embodiments, device 511 displays a selectable option that facilitates quick and efficient access to the remote control user interface for controlling device 500.

Figure 7:
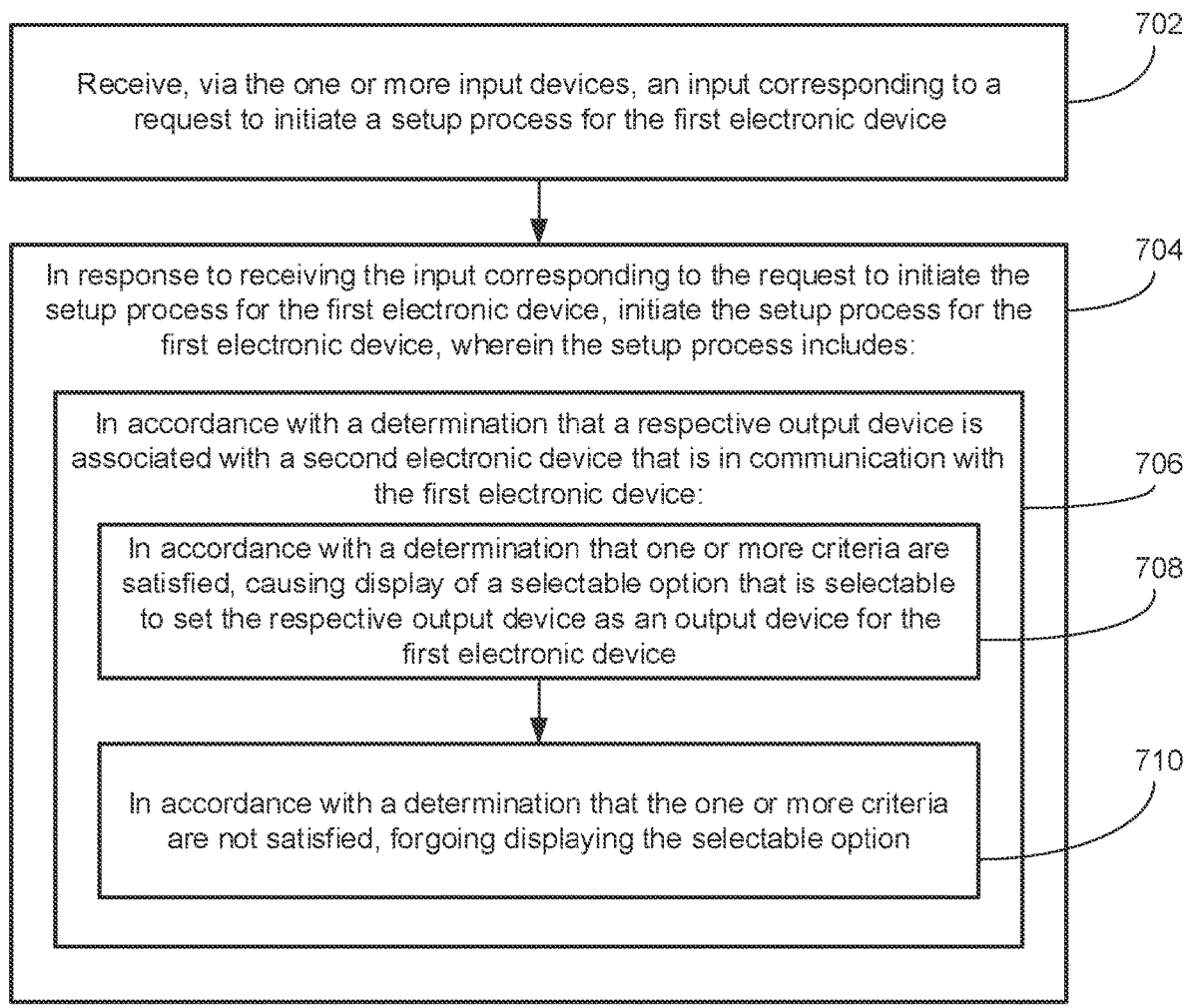
FIG. 7 is a flow diagram illustrating a method of associating an output device with a first electronic device, facilitated by a second electronic device, in accordance with some embodiments of the disclosure.

FIG. 7 is a flow diagram illustrating a method of associating an output device with a first electronic device, facilitated by a second electronic device, in accordance with some embodiments of the disclosure. The method 700 is optionally performed at an electronic device such as device 100, device 300, device 500, device 510, and device 511 as described above with reference to FIGS. 1A-1B, 2-3, 4A-4B and 5A-5C. Some operations in method 700 are, optionally, combined and/or order of some operations is, optionally, changed.

As described below, the method 700 provides ways in which a second electronic device facilitates associating an output device with a first electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

Method 700 is optionally performed at a first electronic device 500 in communication with a display generation component 514 and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the first electronic device is a set-top box in communication with a television and a remote control device). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the first electronic device receives (702), via the one or more input devices, an input corresponding to a request to initiate a setup process for the first electronic device, such as selection of option 620 in FIG. 6A (e.g., an input detected at a remote control device of the first electronic device that selects a selectable option displayed by the first electronic device via the display generation component for setting up the first electronic device). The setup process for the first electronic device is optionally an initial setup process for the first electronic device when the first electronic device has not yet been configured with user-defined settings. In some embodiments, the setup process includes configuring various aspects/settings of the first electronic device, such as configuring the first electronic device with content account information of a user of the first electronic device (e.g., content login information so the first electronic device is able to access content from an external server using the content account information), network settings (e.g., Wi-Fi network ID and/or password) that allow the first electronic device connect to a (e.g., wireless) network, display settings that define how (e.g., dynamic range, resolution, frame rate, etc.) the first electronic device is to transmit information/content to the display generation component, etc.

In some embodiments, in response to receiving the input corresponding to the request to initiate the setup process for the first electronic device, the first electronic device initiates (704) the setup process for the first electronic device, such as described with reference to FIG. 6A, wherein the setup process includes, in accordance with a determination that a respective output device (e.g., an audio-generating device that is separate from the first electronic device, such as a speaker or smart speaker, headphones, etc. In some embodiments, the output device is a display-generating device that is separate from the first electronic device, such as a television, a tablet computer, a computer monitor, a wearable display, etc. In some embodiments, the output device is any device that is able to generate any type of output provided by the first electronic device, whether via wired or wireless communication) is associated with a second electronic device that is in communication with the first electronic device (706), such as output device 612a being associated with device 511 in FIG. 6A (e.g., the respective output device is associated with a smartphone, separate from the respective output device. In some embodiments, the respective output device has been setup as an available output device on the second electronic device such that output (e.g., audio, video, etc.) generated by the second electronic device is able to be output by the respective output device if the respective output device is set as the active output device for the second electronic device. In some embodiments, the first electronic device, the second electronic device and the respective output device are associated with the same user account/profile with a content service provider. In some embodiments, the respective output device has been setup as a component in a smart home configuration setup on the second electronic device), in accordance with a determination that one or more criteria are satisfied, such as device 500 and output device 612a being associated with Room 1 in FIG. 6B (e.g., criteria independent of user input. For example, the setup process optionally includes receiving (e.g., user-provided) information about a room (e.g., in a home and/or smart home configuration) in which the first electronic is located and/or with which the first electronic device is associated. In some embodiments, the criteria include a criterion that is satisfied when the respective output device and the first electronic device are associated with and/or located in the same room (e.g., in a home and/or smart home configuration). In some embodiments, the first electronic device communicates wirelessly with (e.g., via Bluetooth, Wi-Fi, etc.) the respective output device (e.g., using communication information received from the second electronic device, such as communication/access credentials for communicating with the respective output device) to determine the distance between the first electronic device and the respective output device, and the criteria include a criterion that is satisfied when the distance between the first electronic device and the respective output device is less than a distance threshold (e.g., 5, 10, 20 feet) and/or the signal strength between the first electronic device and the respective output device is greater than a threshold), causing display of a selectable option that is selectable to set the respective output device as an output device for the first electronic device (708), such as displaying option 626 in FIG. 6B (e.g., in some embodiments, the first electronic device detects selection of the selectable option (e.g., via the one or more input devices), which causes the respective output device to be set as the output device of the first electronic device). In some embodiments, once the respective output device is the output device for the first electronic device, outputs (e.g., audio, video, etc.) generated by the first electronic device are transmitted (e.g., wirelessly or via wired communication) to the respective output device, which outputs the outputs generated by the first electronic device. In some embodiments, the selectable option is displayed by the first electronic device via the display generation component, and selection of the selectable option is detected via the one or more input devices. In some embodiments, the first electronic device transmits an indication to another electronic device (e.g., second electronic device) to display the selectable option, and selection of the selectable option is detected by the other electronic device, which optionally transmits an indication of the selection to the first electronic device.

In some embodiments, the setup process includes in accordance with a determination that the one or more criteria are not satisfied, such as device 500 and output device 612a being associated with Rooms 1 and 2, respectively, in FIG. 6E (e.g., because the respective output device and the first electronic device are not associated with the same room in a home and/or smart home configuration), forgoing displaying the selectable option (710), such as in FIG. 6E (e.g., the setup process does not include displaying the selectable option). In some embodiments, selection of the selectable option configures the first electronic device to generate outputs via the respective output device using information obtained from the second electronic device and/or other information obtained during the setup process without requiring any additional user input for setting the respective output device as the output device for the first electronic device. The above-described manner of displaying a selectable option for automatically configuring an output device for use with the first electronic device provides a quick and efficient manner of associating the two devices, which simplifies the interaction between the user and the electronic device and enhances the operability of the electronic device and makes the user-device interface more efficient (e.g., by reducing the number of inputs needed to associate the output device and the first electronic device), which additionally reduces power usage and improves battery life of the electronic device by enabling the user to use the electronic device more quickly and efficiency while reducing errors in the usage of the device.

In some embodiments, the setup process includes in accordance with a determination that the respective output device is not associated with the second electronic device, such as output device 612a not being associated with device 511 in FIG. 6H, forgoing displaying the selectable option, such as in FIG. 6I. For example, if the respective output device is not associated with the second electronic device (e.g., the respective output device has not been setup as an available output device for the second electronic device), the setup process does not include displaying the selectable option. In some embodiments, the respective output device has not been setup as an available output device on the second electronic device such that output (e.g., audio, video, etc.) generated by the second electronic device is not able to be output by the respective output device. In some embodiments, the respective output device has not been setup as a component in a smart home configuration setup on the second electronic device. The above-described manner of not displaying the selectable option for automatically configuring the output device for use with the first electronic device ensures that output devices do not get associated with the first electronic device erroneously, which simplifies the interaction between the user and the electronic device and enhances the operability of the electronic device and makes the user-device interface more efficient (e.g., by reducing the number of inputs needed to associate the output device and the first electronic device), which additionally reduces power usage and improves battery life of the electronic device by enabling the user to use the electronic device more quickly and efficiency while reducing errors in the usage of the device.

In some embodiments, the one or more criteria include a criterion that is satisfied when the first electronic device and the respective output device are associated with a same location, such as device 500 and output device 612a both being associated with Room 1 in FIG. 6B. For example, during the setup process of the first electronic device, (e.g., user) input defines what room/location (e.g., in a smart home configuration) the first electronic device is associated with. Similarly, in some embodiments, during a setup process of the respective output device (e.g., setup using the second electronic device), (e.g., user) input defines what room/location (e.g., in a smart home configuration) the respective output device is associated with. If, during the setup process of the first electronic device, the first electronic device and the respective output device are determined to be associated with the same location/room, the one or more criteria are optionally satisfied. In some embodiments, if it is determined that the first electronic device and the respective output device are not associated with the same location/room, then the one or more criteria are not satisfied. The above-described utilization of device location during the setup process ensures that output devices that are likely to be paired with the first electronic device (e.g., those in the same location) are presented during the setup process, which simplifies the interaction between the user and the electronic device and enhances the operability of the electronic device and makes the user-device interface more efficient (e.g., by avoiding presenting information about output devices not in the same location), which additionally reduces power usage and improves battery life of the electronic device by enabling the user to use the electronic device more quickly and efficiency while reducing errors in the usage of the device.

In some embodiments, before initiating the setup process, the respective output device and a second respective output device were associated with each other as a group of respective output devices (e.g., paired together as a stereo pair of output devices, for example in a smart home configuration associated with the second electronic device), such as devices 612a and 612b in FIG. 6J, the one or more criteria include a criterion that is satisfied when the group of respective output devices and the first electronic device are associated with a same location (e.g., as described above), such as the group of output devices 612a and 612b and device 500 in FIG. 6K, and setting the respective output device as the output device for the first electronic device includes setting the group of respective output devices as the output device for the first electronic device, such as in FIG. 6L. For example, the stereo pair of output devices are set as the output device of the first electronic device, rather than any one or both of the output devices being paired as individual output devices with the first electronic device. Therefore, the pair of output devices optionally continue to operate as a stereo pair with the first electronic device once they have been paired with the first electronic device. The above-described manner of associating a pre-paired set of output devices with the first electronic device while maintaining the output devices as paired provides a quick and efficient manner of associating the pair of output devices with the first electronic device, which simplifies the interaction between the user and the electronic device and enhances the operability of the electronic device and makes the user-device interface more efficient (e.g., by not requiring the user to provide additional input to pair the output devices after they have been associated with the first electronic device), which additionally reduces power usage and improves battery life of the electronic device by enabling the user to use the electronic device more quickly and efficiency while reducing errors in the usage of the device.

In some embodiments, before initiating the setup process, the respective output device and a second respective output device were not associated with each other (e.g., not paired together as a stereo pair of output devices, for example in a smart home configuration associated with the second electronic device), such as devices 612a and 612b in FIG. 6M, the one or more criteria include a criterion that is satisfied when the respective output device, the second respective output device and the first electronic device are associated with a same location (e.g., as described above), such as device 500 and output devices 612a and 612b in FIG. 6N, and setting the respective output device as the output device for the first electronic device includes: in accordance with a determination that one or more second criteria are satisfied, setting the respective output device as the output device for the first electronic device without setting the second respective output device as the output device for the first electronic device, and in accordance with a determination that one or more third criteria are satisfied, setting the second respective output device as the output device for the first electronic device without setting the first electronic device as the output device for the first electronic device, such as in FIG. 6O. For example, in some embodiments, the two output devices are associated with prioritizations (e.g., which output devices has been more recently used by the second electronic device, which output device is able to generate the type of output (e.g., audio, video, etc.) provided by the first electronic device, which output device has not been used by the second electronic device), and the output device with higher prioritization is automatically selected as the output device to associate with the first electronic device. For example, the output device that has been more recently used by the second electronic device is the one associated with the first electronic device, the output device that is able to generate the type of output (e.g., audio, video, etc.) provided by the first electronic device is the one associated with the first electronic device, that output device that has not been previously used (e.g., despite having been associated/paired with the second electronic device) by the second electronic device) is not the one associated with the first electronic device, etc. In some embodiments, in response to detecting a selection of the single selectable option displayed by the first electronic device for associating the respective output device with the first electronic device, the two (or more) output devices become paired (e.g., stereo paired) and the stereo pair of output devices becomes associated with the first electronic device. The above-described manner of associating an output device with the first electronic device provides a quick and efficient manner of associating one output device from a plurality of output devices with the first electronic device, which simplifies the interaction between the user and the electronic device and enhances the operability of the electronic device and makes the user-device interface more efficient (e.g., by not requiring the user to provide additional input to define which output device is to be associated with the first electronic device), which additionally reduces power usage and improves battery life of the electronic device by enabling the user to use the electronic device more quickly and efficiency while reducing errors in the usage of the device.

In some embodiments, the setup process includes causing display, on the second electronic device, of a respective selectable option that is selectable to display, on the second electronic device, a user interface for controlling the first electronic device, such as display of option 640 on device 511 in FIG. 6P. For example, at some point during the setup process of the first electronic device (e.g., during, upon completion, etc.), the first electronic device transmits, to the second electronic device, an indication (e.g., signal) to cause the second electronic device to display a user interface element and/or selectable option that is selectable to cause the second electronic device to display a remote control user interface. In some embodiments, inputs directed to the remote control user interface on the second electronic device (e.g., swipe/movement inputs, selections of buttons displayed in the user interface, etc.) cause the second electronic device to transmit indications (e.g., signals) to the first electronic device to control the first electronic device (e.g., move an indicator of current focus in the user interface displayed by the first electronic device, etc.). In some embodiments, the second electronic device only displays the selectable option if it is within a certain distance threshold (e.g., 5 ft., 10 ft., 15 ft.) of the first electronic device (e.g., determined wirelessly, such as via Bluetooth and/or Wi-Fi) and/or if it is connected to the same Wi-Fi or other communication network shared between the first and second electronic devices). In some embodiments, the selectable option is displayed on the second electronic device independent of whether or not any output device was available to be associated with the first electronic device during the setup process of the first electronic device. The above-described manner of displaying an option to display the remote control user interface on the second electronic device provides a quick and efficient manner of accessing the remote control user interface and beginning to control the first electronic device, which simplifies the interaction between the user and the electronic device and enhances the operability of the electronic device and makes the user-device interface more efficient (e.g., by not requiring the user to provide additional input try to find or access the remote control user interface), which additionally reduces power usage and improves battery life of the electronic device by enabling the user to use the electronic device more quickly and efficiency while reducing errors in the usage of the device.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with reference to FIG. 7. For example, the ways of associating an output device with a first electronic device described above with reference to method 700 optionally have one or more of the characteristics of the ways of adding an additional user to an electronic device, etc., described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5C) or application specific chips. Further, the operations described above with reference to FIG. 7 are, optionally, implemented by components depicted in FIGS. 1A-1B. For example, receiving operation 702 and initiating operation 704 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Adding Additional Users

Users interact with electronic devices in many different manners, including using electronic devices to access various content, provide various functionality, interact with various devices, etc. In some embodiments, an electronic device can be configured with a first user profile (e.g., values for various settings on the electronic device, such as Wi-Fi settings, content account settings, etc., that correspond to the first user profile) to facilitate the above interactions. In some circumstances, additional user profiles can be added to the electronic device such that the electronic device is able to switch between the different user profiles and provide different sets of functionality based on the different user profiles (e.g., providing access to different sets of content from different content providers based on different content account settings of the currently active user profile(s)). The embodiments described below provide ways in which a second electronic device (e.g., smartphone) can be used to facilitate populating settings on a first electronic device (e.g., set-top box) with values for a new user (e.g., in addition to an existing user) on the first electronic device. Using the second electronic device to facilitate adding new users to the first electronic device enhances interactions with the first and second electronic devices, thus reducing the amount of time a user needs to add an additional user to the first electronic device, and reducing the power usage of the first and second devices, which increases battery life for battery-powered devices. It is understood that people use devices. When a person uses a device, that person is optionally referred to as a user of the device.

Figure 8B:
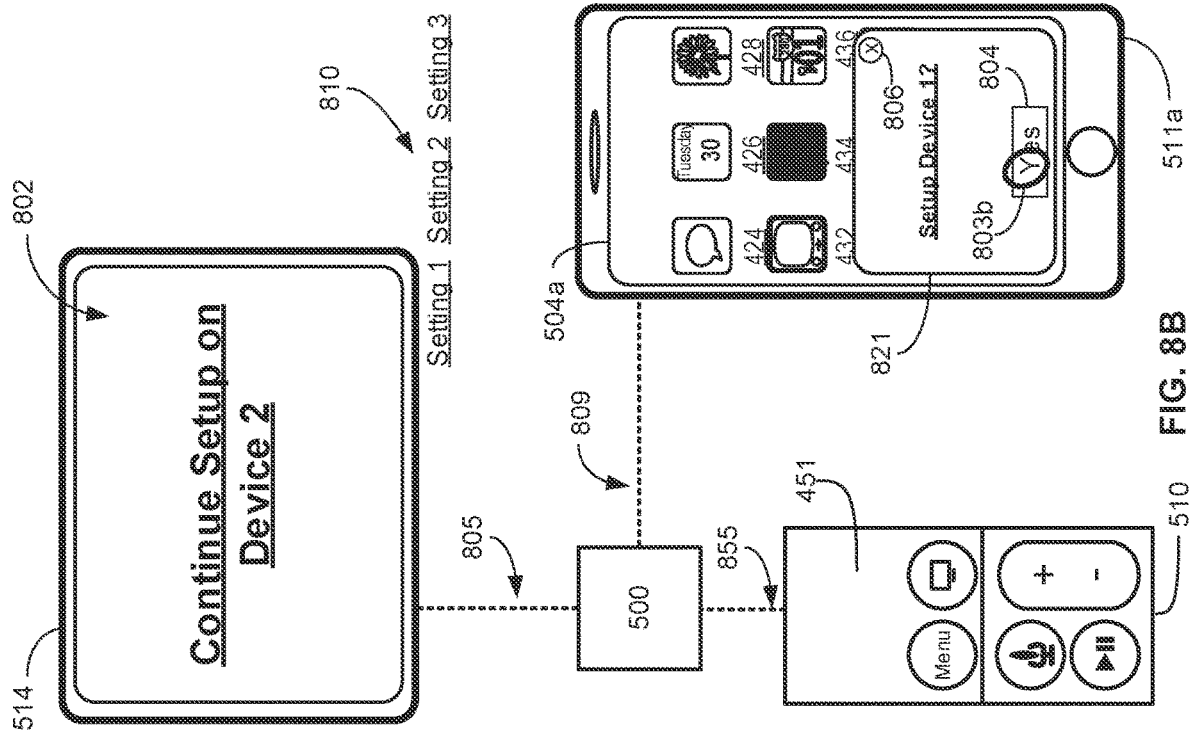
FIGS. 8A-8P illustrate exemplary ways in which a second electronic device facilitates adding an additional user to a first electronic device in accordance with some embodiments.
Figure 8A:
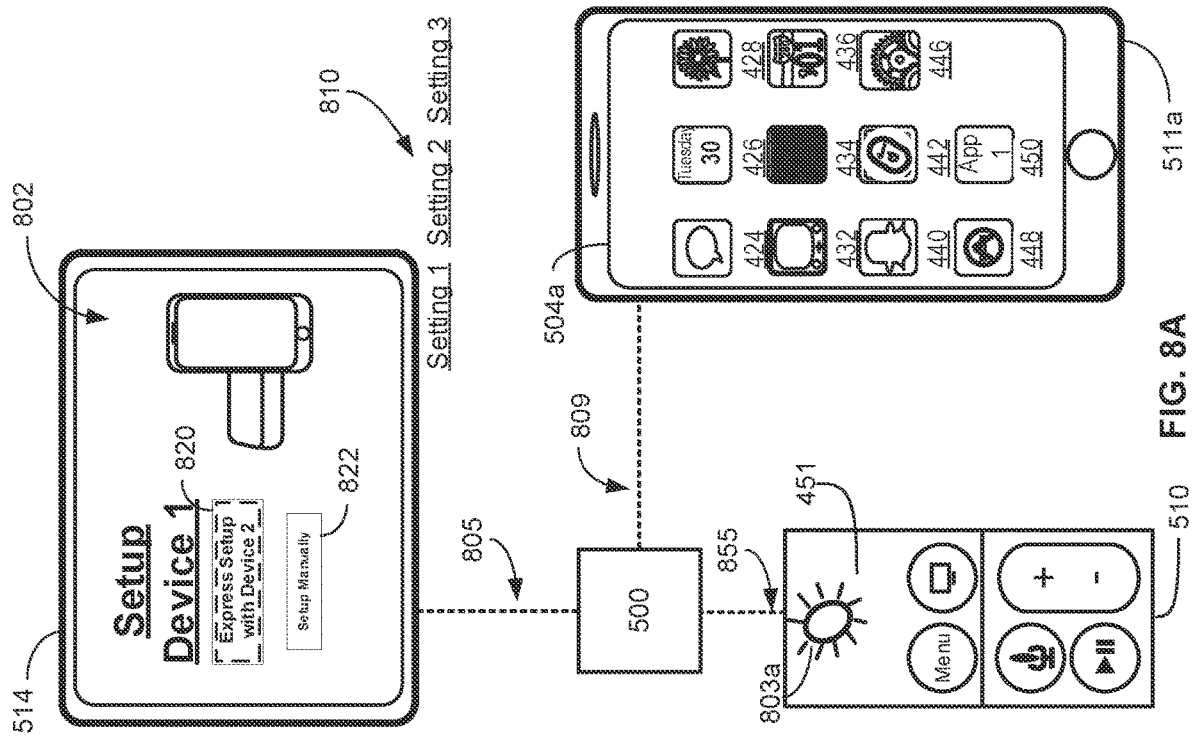
Figure 8F:
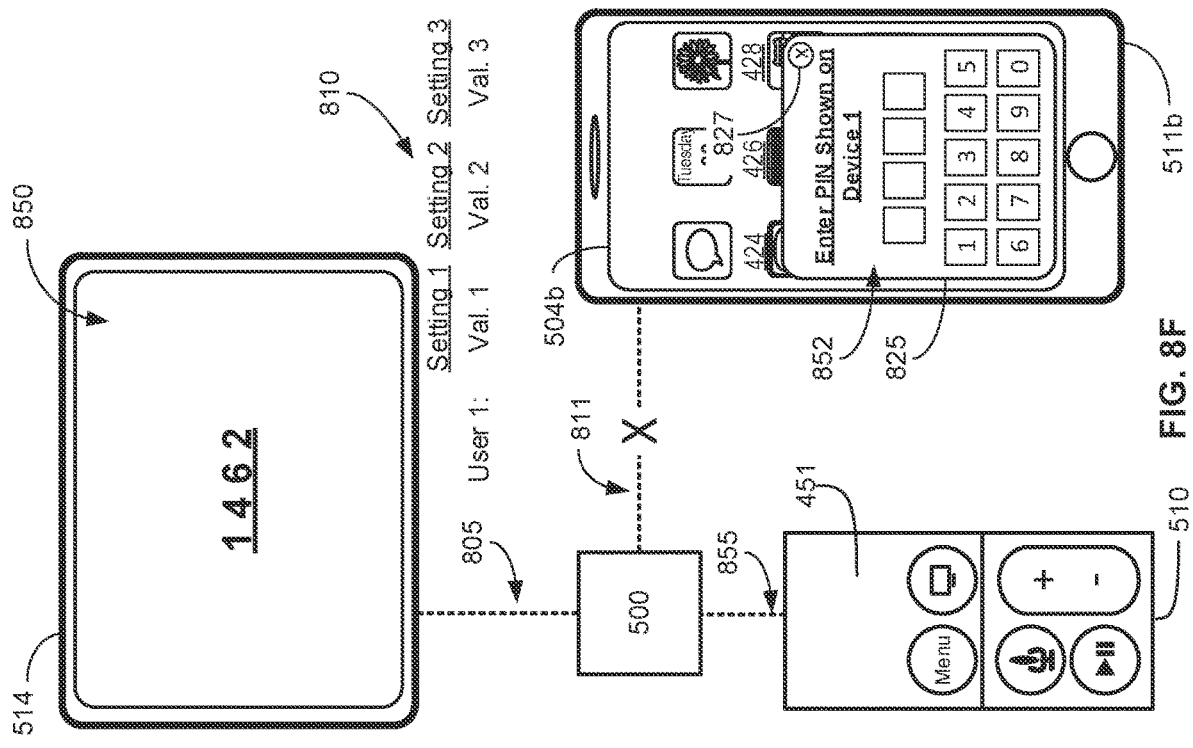
Figure 8E:
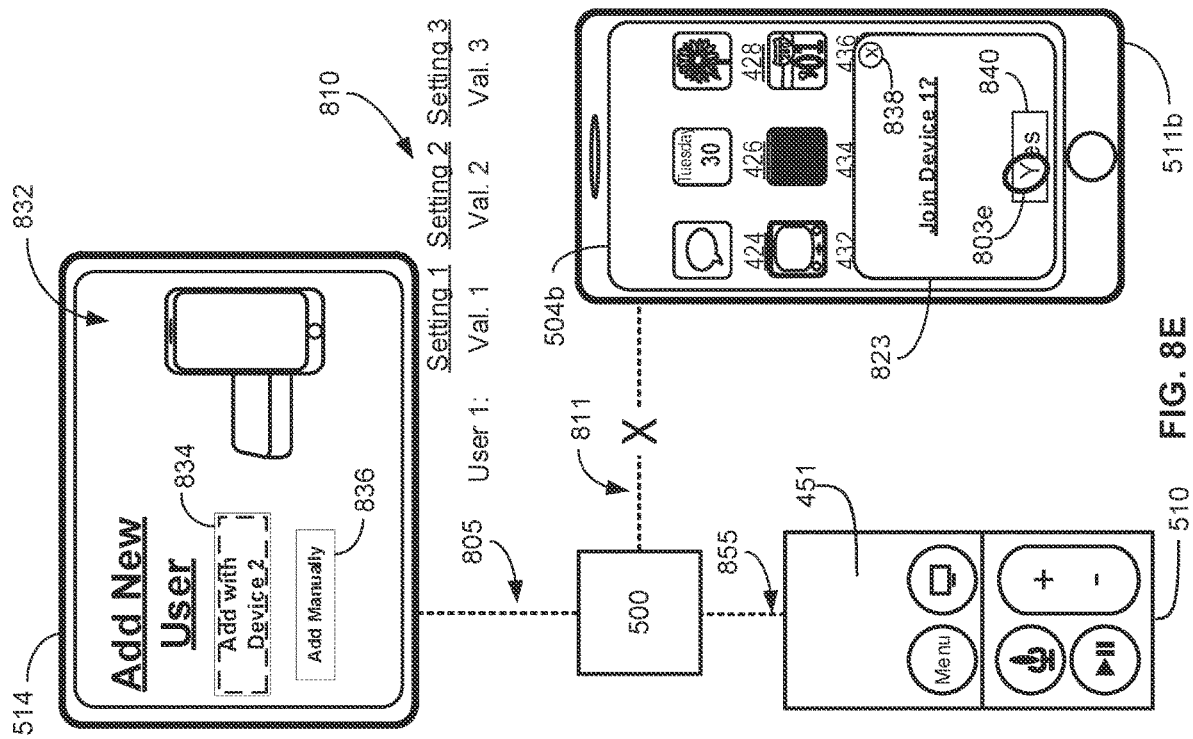
Figure 8N:
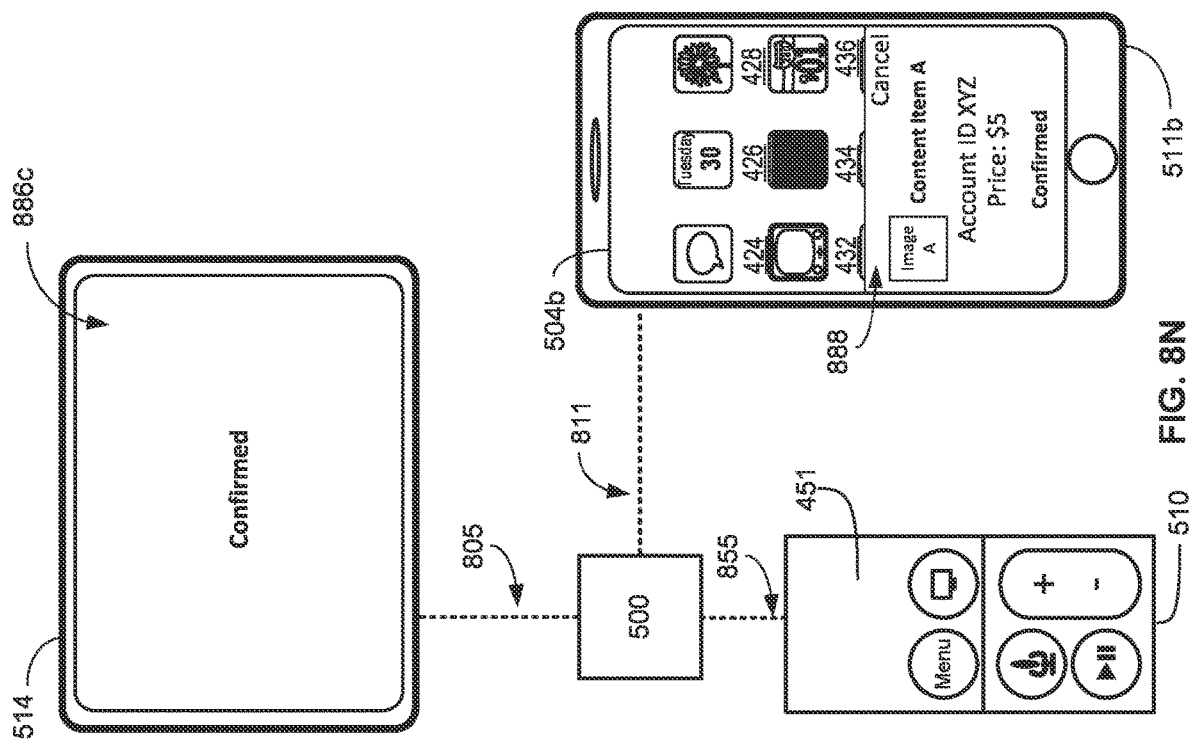
Figure 8M:
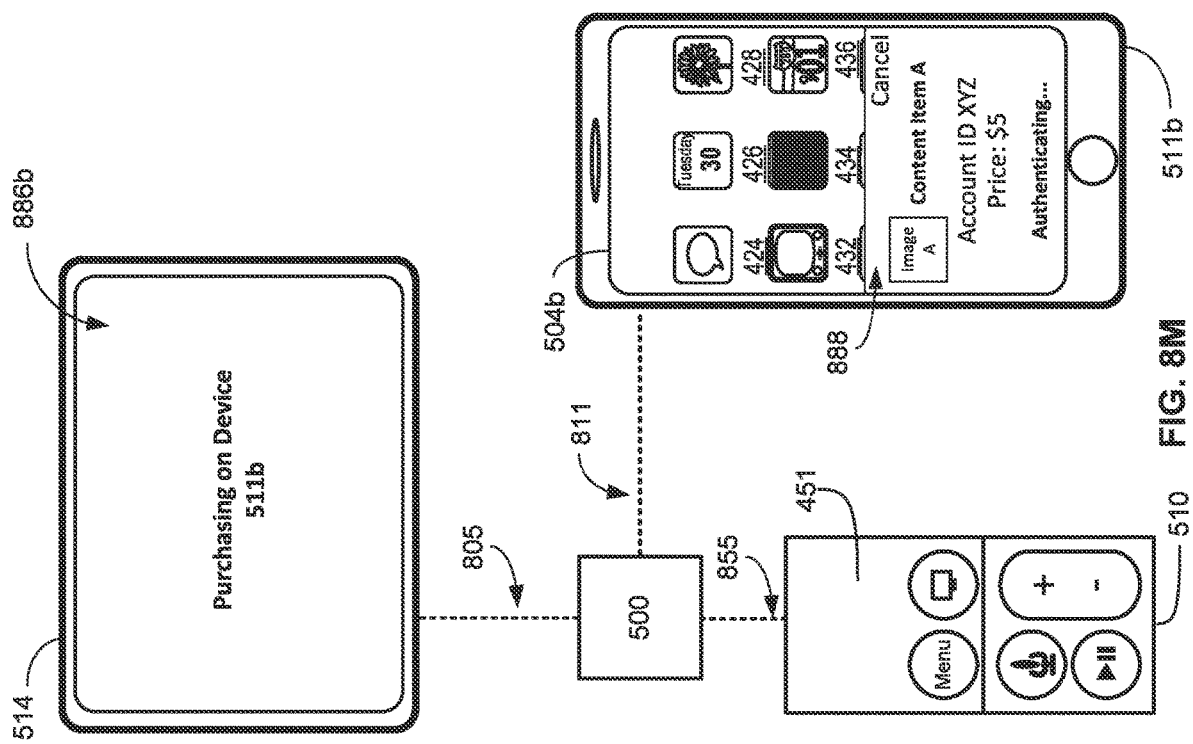
Figure 8P:
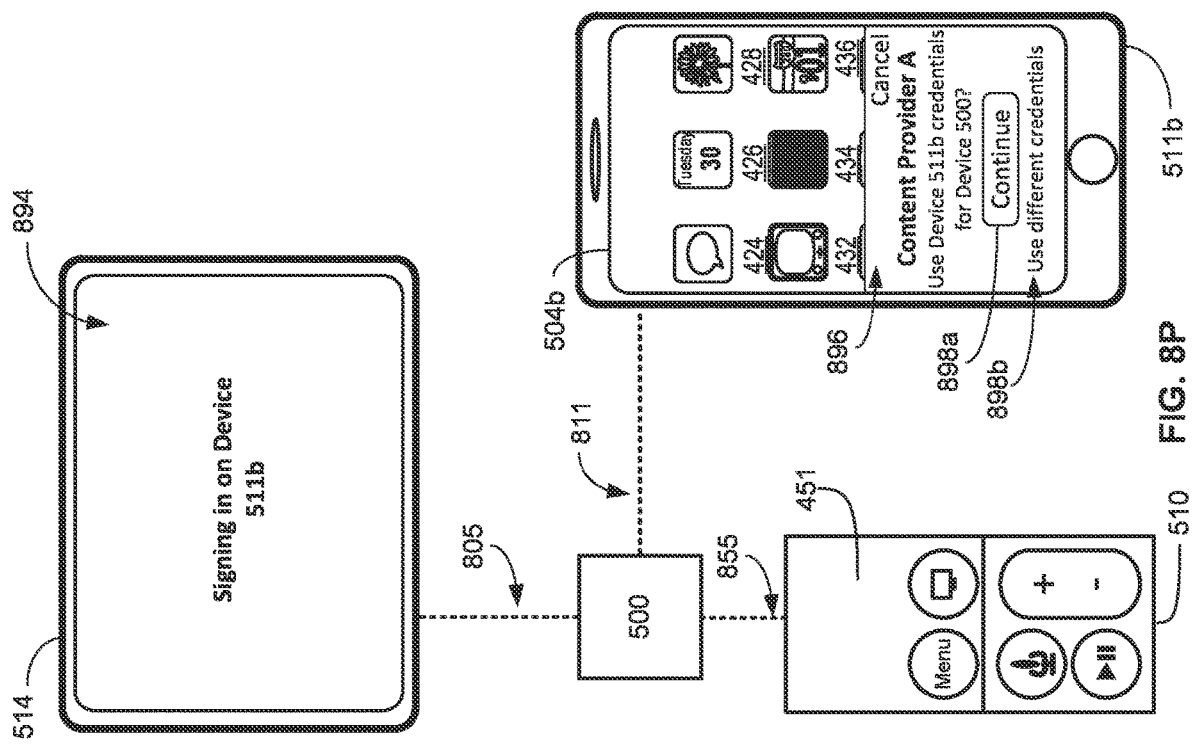

FIGS. 8A-8P illustrate exemplary ways in which a second electronic device facilitates adding an additional user to a first electronic device in accordance with some embodiments. The embodiments in these figures are used to illustrate the processes described below, including the processes described with reference to FIG. 9. Although FIGS. 8A-8P illustrate various examples of ways a first/second electronic device is able to perform the processes described below with reference to FIG. 9, it should be understood that these examples are not meant to be limiting, and the first/second electronic device is able to perform one or more processes described below with reference to FIG. 9 in ways not expressly described with reference to FIGS. 8A-8P.

As described above, in some embodiments, the first electronic device is a set-top box (e.g., device 500 in FIG. 5A) and the second electronic device is a smartphone (e.g., device 511 in FIG. 5A) in communication with the set-top box. In some embodiments, the first and second electronic devices are other types of devices, such as one or more of a wearable device (e.g., smart watch), a tablet computer, a laptop computer, a desktop computer, etc. In FIG. 8A, device 500 has not yet started a setup process and/or is in the midst of a setup process to configure device 500 (e.g., similar to as described with reference to method 700). In some embodiments, the setup process for device 500 includes populating one or more settings (e.g., user profile settings, user account settings, etc., such as described with reference to methods 700 and 900) such that device 500 is able to provide access to content, access to which is provided by those settings, for example. As shown in FIG. 8A, device 500 is in communication (e.g., wired or wireless) 805 with display 514, is in communication (e.g., wired or wireless) 809 with device 511a, and is in communication (e.g., wired or wireless) 855 with remote 510. Device 511a is optionally associated with User 1 (e.g., is configured with settings values associated with a user profile of User 1), as will be described in more detail below. In FIG. 8A, device is displaying user interface 802 on a display generation component—for example, display 514 (e.g., a television).

User interface 802 is optionally a user interface of the setup process for device 500 (e.g., as described with reference to FIGS. 6A-6Q). User interface 802 optionally includes a first selectable option 820 that initiates the setup process for device 500 during which a second device, such as device 511a, will be used to facilitate populating the one or more settings of device 500. User interface 802 optionally also includes a second selectable option 822 that initiates the setup process for device 500 during which the second device is not used to facilitate populating the one or more settings of device 500—in some embodiments, the settings are instead provided manually to device 500 (e.g., using a remote control device 510 (e.g., as described in FIG. 5B)). In FIG. 8A, the first selectable option 820 has the current focus (e.g., such that a click input detected on surface 451 of remote 510 will select selectable option 820).

In FIG. 8A, device 500 optionally has not yet been configured with a user profile. As such, settings 810 in FIG. 8A have not been populated with values corresponding to any user. In some embodiments, settings 1-3 correspond to various settings (user-associated or not) that allow for/define the functionality of device 500 (e.g., as described with reference to methods 700 and 900). For example, settings 810 optionally include one or more of television/content provider settings (e.g., information to allow device 500 to provide access to content from the content provider), online content store settings (e.g., to allow the device 500 to provide access to application purchases, content purchases, etc. from the online content store), online content storage settings (e.g., to allow the device 500 to access storage from an online content storage system), smart home configuration settings (e.g., settings that define the devices and/or rooms in which the devices are located of a smart home configuration, including device 500), Wi-Fi network information (e.g., information (e.g., SSID, WPA password, etc.) for connecting device 500 to a network or wireless network), etc. Settings 1-3 are illustrated for ease of description, but it is understood that in some embodiments, more or fewer settings are configured according to the examples of the disclosure.

Because device 500 optionally has not been configured with a user profile, the next user profile added to device 500 will optionally become the primary and/or default user profile of device 500. Therefore, the setup process initiated from FIG. 8A will optionally cause the primary and/or default user profile to be added to device 500. For example, in FIG. 8A, device 500 detects selection of option 820 (e.g., in response to a click input of contact 803a on surface 451 of remote 510 while option 820 has the current focus). In response, device initiates a process to setup device 500 using device 511a, as shown in FIG. 8B. As part of the process, device 500 optionally displays a message in user interface 802 that indicates the setup process will continue on device 511a. Device 500 optionally also transmits an indication to device 511a that causes device 511a to display user interface element 821 on touch screen 504a (e.g., overlaid on whatever user interface device 511a was displaying at the time). User interface element 821 optionally includes information requesting confirmation that device 511a (e.g., an therefore the user profile of User 1 associated with device 511a) should be used to setup device 500, a selectable option 806 to dismiss user interface element 821 (e.g., and forgo setting up device 500 using device 511a), and a selectable option 804 to proceed with setting up device 500 using device 511a.

In FIG. 8B, device 511a detects selection of option 804 (e.g., via contact 803b). In response, the setup process optionally proceeds, and device 500 is optionally configured with a user profile of the user associated with device 511a (e.g., User 1), as shown in FIG. 8C. As part of configuring device 500 with the user profile of User 1, the settings 810 of device 500 are optionally populated with values (e.g., Val. 1, Val., 2, Val. 3) corresponding to the user profile of User 1. In some embodiments, the values for the settings are transferred to device 500 from device 511a (e.g., via communication link 809). Therefore, as a result, device 500 optionally operates in accordance with the settings values associated with the user profile of User 1 (e.g., provides access to content associated with a content account of User 1, connects to a Wi-Fi network associated with User 1, etc.). In some embodiments, because User 1 is the first user profile added to device 500 (e.g., or because User 1 is the default/primary user profile on device 500), all (or a first set of) the settings available to be populated with settings associated with a user profile are populated with values corresponding to the user profile of User 1 (e.g., settings 1-3 are populated with values corresponding to the user profile of User 2).

In some embodiments, additional users can be added to device 500. For example, in FIG. 8D, after device 500 has been configured with settings values for User 1, device 500 is displaying a user management user interface 830 on display 514. The user management user interface 830 is optionally a user interface from which users can be designated as primary/default users or as additional/secondary users, users can be removed from device 500 and/or users can be added to device 500. In some embodiments, user management user interface 830 is a user interface of the operating system of device 500 (e.g., as opposed to a user interface of a particular application, such as a content application, on device 500). User interface 830 optionally includes information about which user(s) are primary users on device 500 and/or which user(s) are secondary users on device 500. User interface 830 optionally also includes a selectable option 832 that is selectable to initiate a process to add an additional user to device 500. In FIG. 8D, option 832 has the current focus.

In FIG. 8D, a communication link (e.g., wired or wireless) 811 between device 500 and device 511b is optionally not active (e.g., because device 511b has not been previously associated with or paired with device 500). Device 511b is optionally associated with User 2 (e.g., is configured with settings values associated with a user profile of User 2). In FIG. 8D, device 500 detects selection of option 832 (e.g., via click of contact 803d on surface 451 of remote 51).

In response, device 500 optionally displays user interface 832, as shown in FIG. 8E. User interface 832 optionally includes two options (e.g., analogous to options 820 and 822 in user interface 802 shown in FIG. 8A). For example, user interface 832 optionally includes a first selectable option 834 that initiates a process to add the additional user during which a second device, such as device 511b, will be used to facilitate populating the one or more settings of device 500 with values associated with the user profile of the additional user. User interface 832 optionally also includes a second selectable option 836 that initiates the process to add the additional user during which the second device is not used to facilitate populating the one or more settings of device 500—in some embodiments, the settings are instead provided manually to device 500 (e.g., using a remote control device 510). In FIG. 8E, the first selectable option 834 has the current focus (e.g., such that a click input detected on surface 451 of remote 510 will select selectable option 834).

In addition to displaying user interface 832, device 500 optionally transmits an indication to device 511b to cause device 511b to display a user interface element 823 overlaid on whatever user interface device 511b was displaying when device 500 displayed user interface 832. In some embodiments, device 511b displays user interface element 823 without and before either of options 834 or 834 is selected (e.g., with a click on remote 510). User interface element 823 is analogous to user interface element 821 described with reference to FIG. 8B, and includes an indication requesting confirmation that the user profile associated with device 511b should be added to device 500, a selectable option 838 that is selectable to dismiss user interface element 823 (e.g., without adding the user profile associated with device 511b to device 500), and a selectable option 840 that is selectable to proceed with adding the user profile associated with device 511b to device 500.

In FIG. 8E, device 511b detects selection of option 840 (e.g., via contact 803e). In response, because device 511b has not been previously associated with device 500, device 500 displays user interface 850 that includes authentication information (e.g., a string of digits or characters, such as "1462"), and device 511b displays user interface element 825 that includes a keyboard (e.g., number pad) for entering the authentication information displayed by device 500 into device 511b. User interface element 825 optionally includes selectable option 827 to cancel the process of adding the additional user to device 500. In some embodiments, if device 511b is already associated with device 500, device 500 optionally does not display user interface 850, and device 511b optionally does not display user interface element 825.

If the authentication information (if required) is entered into device 511b correctly in FIG. 8F, communication link 811 becomes active, and device 500 optionally begins the process of adding the additional user (User 2) to device 500 using device 511b, such as shown in FIG. 8G. In some embodiments, this process involves the transferring of settings values from device 511b to device 500 (e.g., to populate settings 810 with settings values corresponding to User 2). During this process, device 500 optionally displays user interface 832 on display 514 indicating that the process of adding an additional user is ongoing, and device 511b optionally displays user interface element 827 that also indicates the process of adding the additional user is ongoing, as shown in FIG. 8G. User interface element 827 optionally includes selectable option 838 to cancel the process of adding the additional user to device 500.

In FIG. 8H, the process to add the additional user to device 500 using device 511b has been completed. Device 500 is displaying the user management user interface 830, which indicates that User 1 is the primary user of device 500, and User 2 is now an additional user of device 500, and device 511b is displaying user interface element 829 that indicates that User 2 has been added to device 500. User interface element 829 optionally includes selectable option 860 that is selectable to dismiss user interface element 829. Further, setting values for User 2 have been populated in settings 810 on device 500 (e.g., by being transferred from device 511b to device 500). In some embodiments, all of the same settings that were populated during the process of adding User 1 to device 500 are populated with settings that correspond to User 2 during the process of adding User 2 to device 500. In some embodiments, certain settings are reserved to be populated by primary user settings values, and are not populated during a process to add an additional user to device 500. For example, in some embodiments, "Setting 2" (e.g., a Wi-Fi password, primary content provider account information, etc.) is reserved for primary user settings values, and thus is not populated by settings values for User 2 as a result of the process of adding User 2 to device 500. Such settings that are reserved for primary user settings values optionally do not switch values in response to an input detected at device 500 for switching between profiles—such settings optionally remain populated by settings values for the primary user of device 500, and thus device 500 optionally always operates according to those primary user settings values for those settings. In some embodiments, settings that are not reserved for primary users optionally do switch values in response to an input detected at device 500 for switching between profiles, and therefore device 500 optionally operates according to the settings values for the currently active user profile for those settings, and not necessarily the settings values for the primary user.

In some embodiments, a second electronic device (e.g., device 511b) facilitates purchase and/or login operations performed at a first electronic device (e.g., device 500). For example, in FIG. 8I, device 500 is displaying user interface 870, which is optionally a user interface associated with Content Item A. User interface 870 includes an image corresponding to Content Item A (Image A), information about Content Item A (Lorem ipsum dolor sit amet . . . ), a selectable option 872 that is selectable to initiate a process to purchase access to Content Item A at device 500, and a selectable option 872 that is selectable to initiate a process to rent or purchase limited access to (e.g., access for 1, 3, 5, 10, 20, 30 days) Content Item A at device 500. Content Item A is optionally a movie, a television show or series, a song, an album, an electronic book, etc. In FIG. 8I, device 500 detects a click of contact 803*i* on surface 451 while selectable option 872 has the current focus. It should be understood that while the following description will be provided in the context of selection of option 872, the following description optionally applies analogously in the context of selection of option 874.

In response to the input in FIG. 8I, device 500 displays user interface 876, as shown in FIG. 8J. User interface 876 is optionally a purchase user interface for Content Item A. User interface 876 includes a selectable option 878*a* that is selectable to initiate a process to purchase access to Content Item A using device 511*b* (e.g., without providing a password or other access credential to device 500), a selectable option 878*b* that is selectable to initiate a process to purchase access to Content Item A via password (and/or other access credential) input to device 500 (e.g., without using device 511*b*), and a selectable option 878*c* that is selectable to cancel the process to purchase access to Content Item A. In FIG. 8J, device 500 detects a click of contact 803*j* on surface 451 while selectable option 878*a* has the current focus.

In response to the input in FIG. 8J, device 500 displays user interface 880 that indicates that the process to purchase Content Item A should be continued at a second electronic device (e.g., a device other than device 500). In some embodiments, user interface 880 also includes an indication 882 of the user account (e.g., an account ID such as XYZ, an (redacted) email address associated with the account, etc.) with which the second electronic device should be configured to be able to continue the process to purchase Content Item A (e.g., the same user account with which device 500 is configured). In some embodiments, device 500 causes other devices that are in communication with device 500 (e.g., via Bluetooth, via Wi-Fi, etc.) and/or that are within a threshold distance (e.g., 1, 3, 5, 10, 20, 30, 50, 100, 200 feet) of device 500 to display a notification associated with the process to purchase Content Item A. In some embodiments, those other devices must be configured with the user account indicated in user interface 880 in order to display the notification. In some embodiments, those other devices display the notification irrespective of the user account with which they are configured.

In FIG. 8K, device 511*b* is configured with account XYZ. Thus, in response to the input in FIG. 8J, device 511*b* displays notification 884 (e.g., overlaid on a home screen user interface or a lock screen user interface). Notification 884 is optionally associated with the process to purchase Content Item A at device 500, and indicates the content item being purchased ("Content Item A") and the action being taken with respect to the Content Item ("Buy"). In FIG. 8K, device 511*b* detects selection of notification 884 (e.g., via contact 803*k*).

In response to the input in FIG. 8K, device 500 displays user interface 886*a* (e.g., indicating the purchase process should be completed at the second electronic device at which selection of the notification was detected, optionally including an indication that identifies that second electronic device (e.g., Device 511*b*)), as shown in FIG. 8L. Further, in response to the input in FIG. 8K, device 511*b* displays user interface 888 for facilitating completion of the process to purchase Content Item A at device 500, as shown in FIG. 8L. User interface 888 optionally includes an identification of Content Item A, an indication of account XYZ, an indication of the price of the purchase (e.g., $5), and an indication that the process to purchase Content Item A can be confirmed via authentication (e.g., password, PIN, biometric such as facial, fingerprint, etc.) at device 511*b*.

In FIG. 8M, in response to receiving authentication input at device 511*b*, device 500 displays user interface 886*b* (e.g., indicating that the purchase process is being completed at the second electronic device at which selection of the notification was detected, optionally including an indication that identifies that second electronic device (e.g., Device 511*b*)). Further in response to receiving authentication input at device 511*b*, device 511*b* updates user interface 888 to indicate that the authentication input is being authenticated, as shown in FIG. 8M. If the authentication input is not authenticated (e.g., incorrect password, PIN, biometric, etc. input is provided to device 511*b* for account XYZ), the process to purchase Content Item A is optionally canceled and/or not completed. However, if the authentication input is authenticated (e.g., correct password, PIN, biometric, etc. input is provided to device 511*b* for account XYZ), device 500 displays user interface 886*c* (e.g., indicating that the process to purchase Content Item A has been successfully completed using device 511*b*), and device 511*b* updates user interface 888 to indicate that the process to purchase Content Item A has been successfully completed using device 511*b*. Further, as a result, device 500 optionally now has access to Content Item A.

Figure 8O:
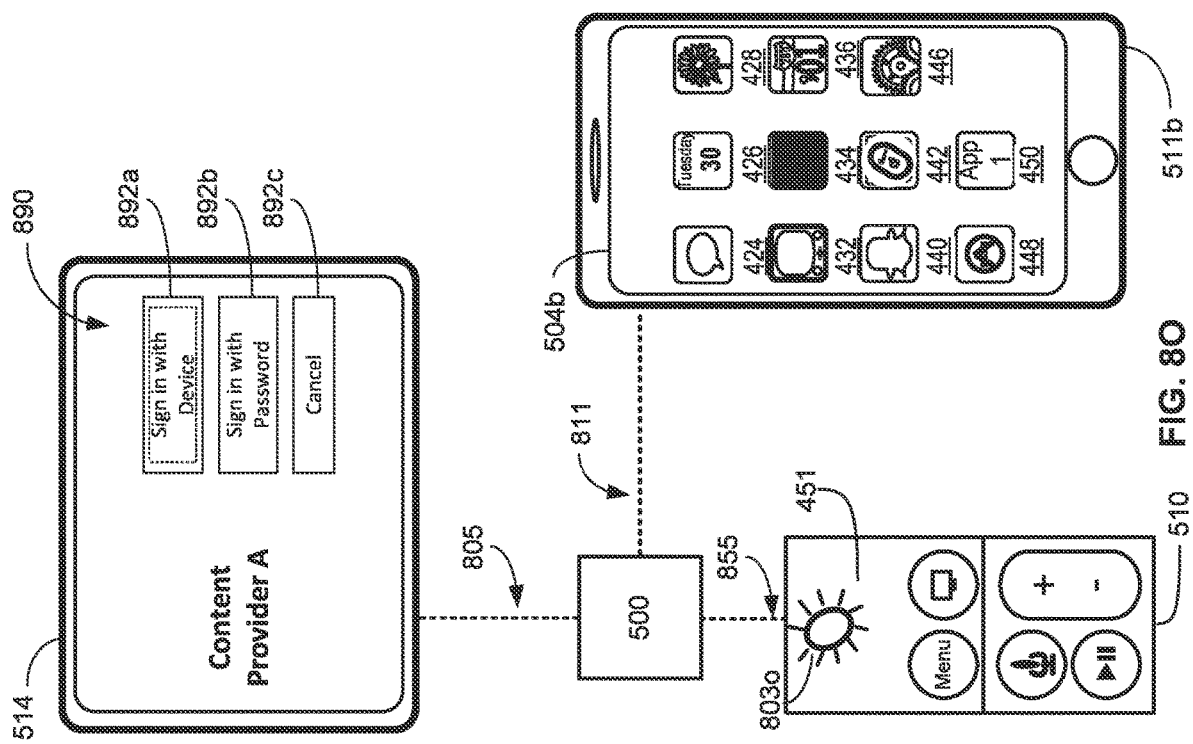

In some embodiments, the processes described with reference to FIGS. 8I-8N can analogously be used to sign into an account (e.g., a content provider account and/or application installed on device 500) using device 511*b*, without the need to enter credentials (e.g., password, username, etc.) to device 500 for the account, as will be described with reference to FIGS. 8O-8P. Details not described with reference to FIGS. 8O-8P are optionally the same as or analogous to corresponding details described with reference to FIGS. 8I-8N. For example, in FIG. 8O, device 500 is displaying user interface 890, which is optionally a user interface of an application installed on device 500 that provides access to content (e.g., movies, television shows, music, books, etc.) from Content Provider A via device 500. In some embodiments, login information for Content Provider A must be provided to device 500 before the content from Content Provider A can be provided at device 500 via the application. User interface 890 includes a selectable option 892*a* that is selectable to initiate a process to sign into Content Provider A using device 511*b* (e.g., without providing a password or other access credential to device 500), a selectable option 892*b* that is selectable to initiate a process to sign into Content Provider A via password (and/or other access credential) input to device 500 (e.g., without using device 511*b*), and a selectable option 892*c* that is selectable to cancel the process to sign into Content Provider A. In FIG. 8O, device 500 detects a click of contact 803*o* on surface 451 while selectable option 892*a* has the current focus.

In response to the input in FIG. 8O, device 500 and/or device 511*b* respond similarly to as described with reference to FIGS. 8I-8N, including with respect to user interfaces displayed by device 500, notifications displayed by second electronic devices (e.g., device 511*b*), and/or user interfaces displayed by or inputs received by device 511*b*. In some embodiments, if device 511*b* receives input for using device 511*b* to sign into Content Provider A on device 500 (e.g., via selection of a notification displayed by device 511*b*), device 500 displays user interface 894 that indicates that the process to sign into Content Provider A is being performed using device 511*b* (e.g., including identifying device 511*b*), and device 511*b* displays user interface 896 for completing the process to sign into Content Provider A on device 500

(e.g., analogous to user interface 888 described with reference to FIGS. 8L-8M), as shown in FIG. 8P. User interface 896 includes an indication of Content Provider A, a prompt asking if the user account credentials for Content Provider A associated with and/or stored on device 511*b* should be used to sign into Content Provider A on device 500, a selectable option 898*a* that is selectable to use the user account credentials for Content Provider A associated with and/or stored on device 511*b* to sign into Content Provider A on device 500 (e.g., without the need to manually input those credentials, such as username and/or password, at device 511*b*), and a selectable option 898*b* that is selectable to use user account credentials for Content Provider A other than those associated with and/or stored on device 511*b* to sign into Content Provider A on device 500 (e.g., via manual input of those credentials, such as username and/or password, at device 511*b*).

In some embodiments, in response to detecting selection of selectable option 898*a*, and optionally in accordance with successful authentication input detected at device 511*b* as previously described, device 511*b* transmits the user account credentials for Content Provider A associated with and/or stored on device 511*b* to device 500, and device 500 signs into Content Provider A using those account credentials, thus providing access to content from Content Provider A at device 500. In some embodiments, if the authentication input detected at device 511*b* is not successful, the process to sign into Content Provider A on device 500 is not completed. In some embodiments, in response to detecting selection of selectable option 898*b* and subsequent manual input of user account credentials at device 511*b*, device 511*b* transmits those account credentials to device 500 which signs into Content Provider A using those account credentials, thus providing access to content from Content Provider A at device 500 (assuming those account credentials are valid credentials for Content Provider A).

Figure 9:
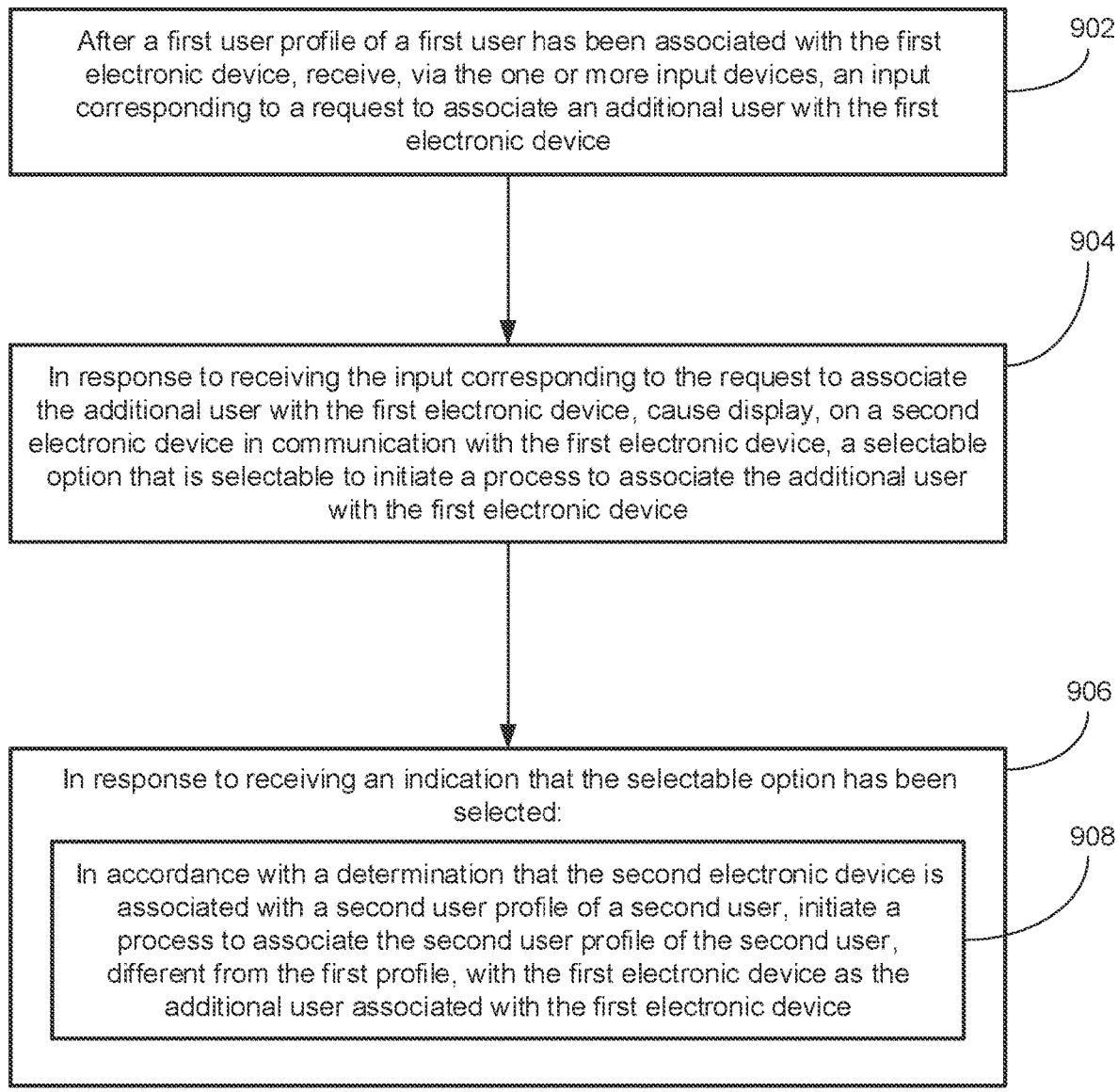
FIG. 9 is a flow diagram illustrating a method of adding an additional user to a first electronic device, facilitated by a second electronic device, in accordance with some embodiments of the disclosure.

FIG. 9 is a flow diagram illustrating a method of adding an additional user to a first electronic device, facilitated by a second electronic device, in accordance with some embodiments of the disclosure. The method 900 is optionally performed at an electronic device such as device 100, device 300, device 500, device 510, and device 511 as described above with reference to FIGS. 1A-1B, 2-3, 4A-4B and 5A-5C. Some operations in method 900 are, optionally combined and/or order of some operations is, optionally, changed.

As described below, the method 900 provides ways in which a second electronic device facilitates adding an additional user to a first electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at a first electronic device 500 in communication with a display generation component 514 and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the first electronic device is a set-top box in communication with a television and a remote control device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, after (e.g., after or while the first user profile is associated with the first electronic device) a first user profile of a first user has been associated with the first electronic device, such as in FIG. 8D (e.g., content account information, account login information, user profile information, television provider information, etc. (e.g., settings associated with users as described with reference to method 700) of the first user has been setup on the first electronic device, such that the first electronic device is able to provide access to content associated with one or more content accounts of the first user. In some embodiments, the first user is the default and/or initial and/or primary user associated with the first electronic device), the first electronic device receives (902), via the one or more input devices, an input corresponding to a request to associate an additional user with the first electronic device, such as selection of option 832 in FIG. 8D (e.g., detecting selection of a selectable option displayed by the first electronic device for addition additional (e.g., secondary) users to the first electronic device). In some embodiments, the addition of additional users to the first electronic device results in content account information, account login information, user profile information, television provider information, etc. (e.g., settings associated with users as described with reference to method 700) of the second user to be setup on the first electronic device, such that the first electronic device is also able to provide access to content associated with one or more content accounts of the second user (e.g., in addition to the content associated with the one or more content accounts of the first user).

In some embodiments, in response to receiving the input corresponding to the request to associate the additional user with the first electronic device, the first electronic device causes display (904), on a second electronic device, such as device 511*b* in FIG. 8E (e.g., smartphone, tablet, wearable device such as a smart watch, etc. that is separate from the first electronic device) in communication with the first electronic device (e.g., via Bluetooth, Wi-Fi, etc. In some embodiments, the second electronic device must be within a threshold distance of the first electronic device for the below process to occur. In some embodiment, the second electronic device must additionally or alternatively be connected to the same wireless or wired network as the first electronic device for the below process to occur.), a selectable option that is selectable to initiate a process to associate the additional user with the first electronic device, such as option 840 displayed by device 511*b* in FIG. 8E (e.g., a pop-up user interface is displayed on the second electronic device in response to the input received at the first electronic device for adding an additional user to the first electronic device). For example, the first electronic device optionally transmits an indication to another electronic device (e.g., second electronic device) to display the selectable option, and selection of the selectable option is detected by the other electronic device, which optionally transmits an indication of the selection to the first electronic device.

In some embodiments, in response to receiving an indication (e.g., from the second electronic device via Bluetooth, Wi-Fi, etc. or via a server or other device with which both the first electronic device and the second electronic are in communication) that the selectable option has been selected (906), such as in FIG. 8E: in accordance with a determination that the second electronic device is associated with a second user profile of a second user (e.g., content account information, account login information, user profile information, television provider information, etc. (e.g., settings associated with users as described with reference to method 700) of the second user has been setup on the second electronic device, such that the second electronic device is able to provide access to content associated with one or more content accounts of the second user), the first electronic device initiates (908) a process to associate the second user profile of the second user, different from the first profile, with the first electronic device as the additional user associated with the first electronic device, such as in FIGS. 8G-8H where device 511*b* is associated with User 2. For example, the process includes transferring content account information, account login information, user profile information, television provider information, etc. (e.g., settings associated with users as described with reference to method 700) of the second user from the second electronic device to the first electronic device. In some embodiments, as a result of this process, the addition of the second user to the first electronic device results in content account information, account login information, user profile information, television provider information, etc. (e.g., settings associated with users as described with reference to method 700) of the second user to be setup on the first electronic device, such that the first electronic device is also able to provide access to content associated with one or more content accounts of the second user (e.g., in addition to the content associated with the one or more content accounts of the first user). The above-described manner of adding an additional user to a first electronic device using a second electronic device provides a quick and efficient manner of adding the user, which simplifies the interaction between the user and the electronic device and enhances the operability of the electronic device and makes the user-device interface more efficient (e.g., by reducing the number of inputs needed to associate the additional user with the first electronic device, and reducing errors in doing so), which additionally reduces power usage and improves battery life of the electronic device by enabling the user to use the electronic device more quickly and efficiency while reducing errors in the usage of the device.

In some embodiments, in response to receiving the indication that the selectable option has been selected, in accordance with a determination that the second electronic device is associated with a third user profile of a third user (e.g., content account information, account login information, user profile information, television provider information, etc. (e.g., settings associated with users as described with reference to method 700) of the third user has been setup on the second electronic device, such that the second electronic device is able to provide access to content associated with one or more content accounts of the third user, different from the first user), the first electronic device initiates a process to associate the third user profile of the third user, different from the first profile and the second profile, with the first electronic device as the additional user associated with the first electronic device, such as if device 511*b* in FIGS. 8G-8H had been associated with User 3 rather than User 2. For example, the process includes transferring content account information, account login information, user profile information, television provider information, etc. (e.g., settings associated with users as described with reference to method 700) of the third user from the second electronic device to the first electronic device. In some embodiments, as a result of this process, the addition of the third user to the first electronic device results in content account information, account login information, user profile information, television provider information, etc. (e.g., settings associated with users as described with reference to method 700) of the third user to be setup on the first electronic device, such that the first electronic device is also able to provide access to content associated with one or more content accounts of the third user (e.g., in addition to the content associated with the one or more content accounts of the first user). Therefore, in some embodiments, the additional user profile that is added to the first electronic device is different depending on with which user profile the second electronic device is associated. The above-described manner of adding an additional user to a first electronic device depending on a user profile associated with a second electronic device provides a quick and efficient manner of adding particular users to the first electronic device, which simplifies the interaction between the user and the electronic device and enhances the operability of the electronic device and makes the user-device interface more efficient (e.g., by reducing the number of inputs needed to associate the additional user with the first electronic device, and reducing errors in doing so), which additionally reduces power usage and improves battery life of the electronic device by enabling the user to use the electronic device more quickly and efficiency while reducing errors in the usage of the device.

In some embodiments, in response to receiving the input corresponding to the request to associate the additional user with the first electronic device, the first electronic device displays, via the display generation component, a respective user interface, such as user interface 832 in FIG. 8E (e.g., a user interface that indicates options to add the new user manually, or using a second device. The options are optionally selectable to initiate manual (e.g., user profile settings entered manually to the first electronic device, such as using a remote control device) or device-assisted (e.g., user profile settings transferred from the second electronic device to the first electronic device), respectively, processes to add the additional user to the first electronic device), wherein, a respective input directed to the respective user interface initiates a process to define whether associating the additional user with the first electronic device occurs using the second electronic device or occurs without using the second electronic device (e.g., selection of the "manual setup" option or the "setup with device" option"), such as selecting either option 834 or option 836 in user interface 832 in FIG. 8E, and the selectable option is displayed on the second electronic device before the first electronic device detects the respective input, such as the display of option 840 by device 511*b* before option 834 or option 836 is selected in FIG. 8E. For example, one of the selectable options in the respective user interface has the current focus, but has not yet been selected. In some embodiments, even before any of the options in the respective user interface has been selected, the selectable option is displayed by the second electronic device. In some embodiments, in response to detecting selection of the "setup with device" option, the second electronic device maintains display of the selectable option to associate the additional user with the first electronic device. In some embodiments, in response to detecting selection of the "manual setup" option, the second electronic device ceases display of the selectable option to associate the additional user with the first electronic device. The above-described manner of displaying the selectable option on the second electronic device provides a quick and efficient manner of adding particular users to the first electronic device, which simplifies the interaction between the user and the electronic device and enhances the operability of the electronic device and makes the user-device interface more efficient (e.g., by reducing the number of inputs needed to associate the additional user with the first electronic device, allowing for the process to add the additional user to begin in response to selection of the option shown on the second device, without requiring selection of the "setup with device" option in the respective user interface), which additionally reduces power usage and improves battery life of the electronic device by enabling the user to use the electronic device more quickly and efficiency while reducing errors in the usage of the device.

In some embodiments, associating the first user profile with the first electronic device includes populating (e.g., transferring) a first set of settings of the first electronic device with a first set of values associated with the first user profile, such as the settings values populated for settings 1-3 810 in FIG. 8C (e.g., transferring the values for the settings from a respective electronic device, such as the second electronic device, to the first electronic device). For example, in some embodiments, the settings of the first electronic device to be populated include one or more of television/content provider settings (e.g., information to allow the first electronic device to provide access to content from the content provider), online content store settings (e.g., to allow the first electronic device to provide access to application purchases, content purchases, etc. from the online content store), online content storage settings (e.g., to allow the first electronic device to access content from an online content storage system), smart home configuration settings (e.g., settings that define the devices and/or rooms in which the devices are located of a smart home configuration), Wi-Fi network information (e.g., information for connecting to a network or wireless network), etc. In some embodiments, adding the primary (e.g., default or first) user to the first electronic device causes all or some of those settings to be populated with values corresponding to the primary user. In some embodiments, associating the second user profile with the first electronic device after the first user profile has been associated with the first electronic device (e.g., while the first user profile is associated with the first electronic device) includes populating a subset of the first set of settings with a second set of values associated with the second user profile, such as populating a subset of settings 810 in FIG. 8H. In some embodiments, the subset is the entire first set, and in some embodiments, the subset is less than the entire first set. In some embodiments, associating the second user profile with the first electronic device after the first user profile has been associated with the first electronic device includes populating a first portion of the first set of settings with a second set of values associated with the second user profile without populating a second portion of the first set of settings with values associated with the second user profile. For example, transferring the values for the settings from a respective electronic device, such as the second electronic device, to the first electronic device. In some embodiments, adding a secondary (e.g., additional) user to the first electronic device causes all or some of the settings for the first electronic device to be populated with values corresponding to the secondary user. In some embodiments, all of the settings are populated with values associated with the secondary user. In some embodiments, a subset of all of the settings (e.g., fewer than populated by adding the primary user) are populated with settings associated with the secondary user. In some embodiments, had the second user (the user added after the first) been added to the first electronic device before the first user, all (or a first set) of the settings would have been populated with values corresponding to the second user, and fewer than all (or fewer than the first set) of the settings would have been populated with values corresponding to the first user. The above-described manner of populating fewer than all of the settings of the first electronic device when adding secondary users ensures that some settings not change when switching user profiles on the first electronic device, which simplifies the interaction between the user and the electronic device and enhances the operability of the electronic device and makes the user-device interface more efficient (e.g., by reducing the possibility that settings changes when switching between user profiles on the first electronic device will cause undesirable changes in operational functionality, such as losing Wi-Fi signal), which additionally reduces power usage and improves battery life of the electronic device by enabling the user to use the electronic device more quickly and efficiency while reducing errors in the usage of the device.

In some embodiments, associating the second user profile with the first electronic device does not include providing primary content provider settings associated with the second user profile to the first electronic device (e.g., does not include transferring from the second electronic device to the first electronic device the respective settings). For example, the second portion of the first set of settings includes primary content account settings, and those are optionally not populated with values associated with multiple users. In some embodiments, primary content provider settings are optionally only populated with values for the primary user. In some embodiments, the primary content provider settings (e.g., cable provider, satellite provider, internet provider, etc. settings) optionally allow the first electronic device to provide access to content from the primary content provider and/or from secondary content providers associated the primary content provider (e.g., individual content providers/networks to whose content access is provided by virtue of the user's single account with the primary content provider). Therefore, in some embodiments, switching from the first user profile to the second user profile on the first electronic device does not cause the first electronic device to operate according to content provider settings associated with the second user-rather, the first electronic device optionally continues to operate according to the content provider settings associated with the first user. The above-described manner of not populating primary content provider settings for additional users ensures that switching user profiles on the electronic device to the second user profile from the first user profile will not cause a discontinuity in the content provider-related content accessible via the first electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, in accordance with a determination that primary content provider settings associated with the first user profile is associated with the first electronic device, associating the second user profile with the first electronic device does not include providing the primary content provider settings associated with the second user profile to the first electronic device, and in accordance with a determination that the primary content provider settings associated with the first user profile is not associated with the first electronic device, associating the second user profile with the first electronic device does not include providing the primary content provider settings associated with the second user profile to the first electronic device. In some embodiments, the primary content provider settings for the second user are not populated in the first electronic device whether or not the first user (e.g., the primary user) has primary content provider settings populated in the first electronic device. In some embodiments, if the first user does not have primary content provider settings populated in the first electronic device, then adding the second user to the first electronic device does populate those primary content provider settings with values corresponding to the second user. The above-described manner of not populating primary content provider settings for additional users ensures that switching user profiles on the electronic device to the second user profile from the first user profile will not cause a discontinuity in the content provider-related content accessible via the first electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, the first portion of the first set of settings includes online content account settings for the electronic device, and the second set of values associated with the second user profile includes online content account settings associated with the second user profile. In some embodiments, online content store and/or online content storage settings are populated with values for both the first and the second user, such that switching between the first and second user profiles on the first electronic device does cause the first electronic device to switch between accessing the online content store/storage according to the first user settings and the second user setting when the active profile is switched on the first electronic device. The above-described manner of online content store/storage settings for additional users ensures that switching user profiles on the electronic device to the second user profile from the first user profile will cause corresponding personal content (e.g., content purchases, online content storage data, etc.) access to switch, which simplifies the interaction between the user and the electronic device and enhances the security and privacy of the electronic device and makes the user-device interface more efficient, which additionally reduces power usage and improves battery life of the electronic device by enabling the user to use the electronic device more quickly and efficiency while reducing errors in the usage of the device.

In some embodiments, in response to receiving the input corresponding to the request to associate the additional user with the first electronic device, such as selection of option 834 in FIG. 8E, in accordance with a determination that the second electronic device has not been previously associated with the first electronic device, such as device 511*b* not having been previously associated with device 500 in FIG. 8E (e.g., the second electronic device has not previously been paired or registered with the first electronic device as a valid/authenticated device that can provide inputs to the first electronic device), the first electronic device displays, via the display generation component, authentication information, such as "1462" in FIG. 8F (e.g., displaying a PIN or other set of digits, letters, information in a user interface via the display generation component that is in communication with the first electronic device), and requires that the authentication information be entered at the second electronic device before proceeding with the process to associate the additional user with the first electronic device, such as described with reference to FIG. 8F (e.g., the second electronic device optionally displays a user interface into which the authentication information displayed via the display generation component can be entered by the user of the second electronic device, to ensure that the user of the second electronic device can see the information displayed by the first electronic device (e.g., and thus ensure the user of the second electronic device is in proximity to the first electronic device). In some embodiments, in accordance with a determination that the second electronic device has been previously associated with the first electronic device (e.g., has been previously paired/registered with the first electronic device), the first electronic device forgoes displaying the authentication information (e.g., and allowing the process to associate the additional user with the first electronic device to proceed without requiring authentication information to be entered into the second electronic device). The above-described manner of requiring authentication information to associate the first and second electronic devices before proceeding ensures that an electronic device not in the vicinity of the first electronic device cannot erroneously or fraudulently transfer user settings to the first electronic device, which simplifies the interaction between the user and the electronic device and enhances the security and privacy of the electronic device and makes the user-device interface more efficient, which additionally reduces power usage and improves battery life of the electronic device by enabling the user to use the electronic device more quickly and efficiency while reducing errors in the usage of the device.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with reference to FIG. 9. For example, the ways of adding an additional user to a first electronic device described above with reference to method 900 optionally have one or more of the characteristics of the ways of facilitating the association of an output device with the first electronic device, etc., described herein with reference to other methods described herein (e.g., method 700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5C) or application specific chips. Further, the operations described above with reference to FIG. 9 are, optionally, implemented by components depicted in FIGS. 1A-1B. For example, receiving operations 902 and 906, and causing operation 904 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology includes facilitating output device association with an electronic device and/or facilitating the transfer of user profile information to an electronic device. The present disclosure contemplates that in some instances, the data utilized may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, user account data can be used to facilitate adding user settings to an electronic device. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable wireless connection between multiple electronic devices. In addition to providing "opt in" and "opt out" options, the present disclosure contemplates providing notifications relating to the access or use of personal information. For instance, a user may be notified upon initiating a data transfer from one electronic device to another electronic device that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, some user profile settings values (e.g., those designated by the user), but not all, can be transferred from one device to another to facilitate adding an additional user to the other device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a first electronic device in communication with a display generation component and one or more input devices:
      receiving, via the one or more input devices, an input corresponding to a request to initiate a setup process for the first electronic device; and
      in response to receiving the input corresponding to the request to initiate the setup process for the first electronic device, initiating the setup process for the first electronic device, wherein the setup process includes:
   in accordance with a determination that a respective output device, through a first communication link, is in communication with a second electronic device that is in communication with the first electronic device:
      in accordance with a determination that one or more criteria are satisfied, the one or more criteria including a criterion that is satisfied when the first electronic device, the second electronic device, and the respective output device are associated with a same user account, causing display of a selectable option that is selectable to initiate a process to set the respective output device as an output device for the first electronic device, wherein the process includes activating a second communication link between the first electronic device and the respective output device that is different from the first communication link; and
      in accordance with a determination that the one or more criteria are not satisfied, forgoing displaying the selectable option.

2. The method of claim 1, wherein the setup process includes:
   in accordance with a determination that the respective output device is not associated with the second electronic device, forgoing displaying the selectable option.

3. The method of claim 1, wherein the one or more criteria include a criterion that is satisfied when the first electronic device and the respective output device are associated with a same location.

4. The method of claim 1, wherein before initiating the setup process, the respective output device and a second respective output device were associated with each other as a group of respective output devices, the one or more criteria include a criterion that is satisfied when the group of respective output devices and the first electronic device are associated with a same location, and setting the respective output device as the output device for the first electronic device includes setting the group of respective output devices as the output device for the first electronic device.

5. The method of claim 1, wherein before initiating the setup process, the respective output device and a second respective output device were not associated with each other, the one or more criteria include a criterion that is satisfied when the respective output device, the second respective output device and the first electronic device are associated with a same location, and setting the respective output device as the output device for the first electronic device includes:
   in accordance with a determination that one or more second criteria are satisfied, setting the respective output device as the output device for the first electronic device without setting the second respective output device as the output device for the first electronic device; and
   in accordance with a determination that one or more third criteria are satisfied, setting the second respective output device as the output device for the first electronic device without setting the first electronic device as the output device for the first electronic device.

6. The method of claim 1, wherein the setup process includes causing display, on the second electronic device, of a respective selectable option that is selectable to display, on the second electronic device, a user interface for controlling the first electronic device.

7. The method of claim 1, wherein the selectable option is selectable to:
   initiate the process to set the respective output device as the output device for the first electronic device; and
   initiate a process to transfer one or more settings associated with the same user account from the second electronic device to the first electronic device.

8. The method of claim 1, wherein the second communication link is activated based on communication information received by the first electronic device from the second electronic device.

9. A first electronic device, comprising:
   one or more processors;
   memory; and
   one or more programs, wherein the one or more programs are stored in the memory and configured to be executed by the one or more processors, the one or more programs including instructions for:
   receiving, via one or more input devices, an input corresponding to a request to initiate a setup process for the first electronic device; and
   in response to receiving the input corresponding to the request to initiate the setup process for the first electronic device, initiating the setup process for the first electronic device, wherein the setup process includes:
      in accordance with a determination that a respective output device, through a first communication link, is in communication with a second electronic device that is in communication with the first electronic device:
         in accordance with a determination that one or more criteria are satisfied, the one or more criteria including a criterion that is satisfied when the first electronic device, the second electronic device, and the respective output device are associated with a same user account, causing display of a selectable option that is selectable to initiate a process to set the respective output device as an output device for the first electronic device, wherein the process includes activating a second communication link between the first electronic device and the respective output device that is different from the first communication link; and
         in accordance with a determination that the one or more criteria are not satisfied, forgoing displaying the selectable option.

10. The first electronic device of claim 9, wherein the setup process includes:
   in accordance with a determination that the respective output device is not associated with the second electronic device, forgoing displaying the selectable option.

11. The first electronic device of claim 9, wherein the one or more criteria include a criterion that is satisfied when the first electronic device and the respective output device are associated with a same location.

12. The first electronic device of claim 9, wherein before initiating the setup process, the respective output device and a second respective output device were associated with each other as a group of respective output devices, the one or more criteria include a criterion that is satisfied when the group of respective output devices and the first electronic device are associated with a same location, and setting the respective output device as the output device for the first electronic device includes setting the group of respective output devices as the output device for the first electronic device.

13. The first electronic device of claim 9, wherein before initiating the setup process, the respective output device and a second respective output device were not associated with each other, the one or more criteria include a criterion that is satisfied when the respective output device, the second respective output device and the first electronic device are associated with a same location, and setting the respective output device as the output device for the first electronic device includes:
- in accordance with a determination that one or more second criteria are satisfied, setting the respective output device as the output device for the first electronic device without setting the second respective output device as the output device for the first electronic device; and
- in accordance with a determination that one or more third criteria are satisfied, setting the second respective output device as the output device for the first electronic device without setting the first electronic device as the output device for the first electronic device.

14. The first electronic device of claim 9, wherein the setup process includes causing display, on the second electronic device, of a respective selectable option that is selectable to display, on the second electronic device, a user interface for controlling the first electronic device.

15. The first electronic device of claim 9, wherein the selectable option is selectable to:
- initiate the process to set the respective output device as the output device for the first electronic device; and
- initiate a process to transfer one or more settings associated with the same user account from the second electronic device to the first electronic device.

16. The first electronic device of claim 9, wherein the second communication link is activated based on communication information received by the first electronic device from the second electronic device.

17. A non-transitory computer readable storage medium storing one or more programs, the one or more programs comprising instructions, which when executed by one or more processors of a first electronic device, cause the first electronic device to perform a method comprising:
- receiving, via one or more input devices, an input corresponding to a request to initiate a setup process for the first electronic device; and
- in response to receiving the input corresponding to the request to initiate the setup process for the first electronic device, initiating the setup process for the first electronic device, wherein the setup process includes:
  - in accordance with a determination that a respective output device, through a first communication link, is in communication with a second electronic device that is in communication with the first electronic device:
    - in accordance with a determination that one or more criteria are satisfied, the one or more criteria including a criterion that is satisfied when the first electronic device, the second electronic device, and the respective output device are associated with a same user account, causing display of a selectable option that is selectable to initiate a process to set the respective output device as an output device for the first electronic device, wherein the process includes activating a second communication link between the first electronic device and the respective output device that is different from the first communication link; and
    - in accordance with a determination that the one or more criteria are not satisfied, forgoing displaying the selectable option.

18. The non-transitory computer readable storage medium of claim 17, wherein the setup process includes:
- in accordance with a determination that the respective output device is not associated with the second electronic device, forgoing displaying the selectable option.

19. The non-transitory computer readable storage medium of claim 17, wherein the one or more criteria include a criterion that is satisfied when the first electronic device and the respective output device are associated with a same location.

20. The non-transitory computer readable storage medium of claim 17, wherein before initiating the setup process, the respective output device and a second respective output device were associated with each other as a group of respective output devices, the one or more criteria include a criterion that is satisfied when the group of respective output devices and the first electronic device are associated with a same location, and setting the respective output device as the output device for the first electronic device includes setting the group of respective output devices as the output device for the first electronic device.

21. The non-transitory computer readable storage medium of claim 17, wherein before initiating the setup process, the respective output device and a second respective output device were not associated with each other, the one or more criteria include a criterion that is satisfied when the respective output device, the second respective output device and the first electronic device are associated with a same location, and setting the respective output device as the output device for the first electronic device includes:
- in accordance with a determination that one or more second criteria are satisfied, setting the respective output device as the output device for the first electronic device without setting the second respective output device as the output device for the first electronic device; and
- in accordance with a determination that one or more third criteria are satisfied, setting the second respective output device as the output device for the first electronic device without setting the first electronic device as the output device for the first electronic device.

22. The non-transitory computer readable storage medium of claim 17, wherein the setup process includes causing display, on the second electronic device, of a respective selectable option that is selectable to display, on the second electronic device, a user interface for controlling the first electronic device.

23. The non-transitory computer readable storage medium of claim 17, wherein the selectable option is selectable to:
- initiate the process to set the respective output device as the output device for the first electronic device; and
- initiate a process to transfer one or more settings associated with the same user account from the second electronic device to the first electronic device.

24. The non-transitory computer readable storage medium of claim 17, wherein the second communication link is activated based on communication information received by the first electronic device from the second electronic device.

* * * * *